United States Patent
Zhu et al.

(10) Patent No.: US 12,531,629 B2
(45) Date of Patent: Jan. 20, 2026

(54) METHOD AND APPARATUS FOR BEAM FAILURE RECOVERY IN A WIRELESS COMMUNICATION SYSTEM

(71) Applicant: Samsung Electronics Co., Ltd., Suwon-si (KR)

(72) Inventors: Dalin Zhu, Allen, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/615,804

(22) Filed: Mar. 25, 2024

(65) Prior Publication Data

US 2024/0235655 A1    Jul. 11, 2024

Related U.S. Application Data

(63) Continuation of application No. 17/449,602, filed on Sep. 30, 2021, now Pat. No. 11,943,037.
(Continued)

(51) Int. Cl.
*H04W 72/04*    (2023.01)
*H04B 7/06*    (2006.01)
(Continued)

(52) U.S. Cl.
CPC ......... *H04B 7/088* (2013.01); *H04B 7/06964* (2023.05); *H04L 1/1614* (2013.01);
(Continued)

(58) Field of Classification Search
CPC ...... H04B 7/088; H04B 7/024; H04B 7/0695; H04B 7/06964; H04B 7/06968;
(Continued)

(56) References Cited

U.S. PATENT DOCUMENTS

| 2018/0302889 A1 | 10/2018 | Guo |
| 2020/0007678 A1* | 1/2020 | Zhou ............... H04B 7/088 |

(Continued)

FOREIGN PATENT DOCUMENTS

EP    4195561 A1    6/2023

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.
(Continued)

*Primary Examiner* — Mahbubul Bar Chowdhury

(57) ABSTRACT

Methods and apparatuses for beam failure recovery (BFR) in a wireless communication system. A method for operating a user equipment includes identifying configuration information for at least two beam failure detection (BFD) reference signal (RS) sets each comprising one or more BFD RSs resources and configuration information for at least two new beam identification (NBI) RS sets each comprising one or more NBI RS resources. The method further includes detecting a beam failure event for one of the at least two BFD RS sets; identifying, based on measuring the one or more NBI RS resources in a NBI RS set that is associated with the one BFD RS set, one or more NBI RS resources for a new beam recovery; and triggering, in response to detection of the beam failure event for the one BFD RS set and identification of the one or more NBI RS resources, a BFR event.

13 Claims, 31 Drawing Sheets

Related U.S. Application Data

(60) Provisional application No. 63/249,413, filed on Sep. 28, 2021, provisional application No. 63/087,588, filed on Oct. 5, 2020.

(51) Int. Cl.

| | | |
|---|---|---|
| *H04B 7/08* | (2006.01) | |
| *H04L 1/1607* | (2023.01) | |
| *H04L 5/00* | (2006.01) | |
| *H04W 24/10* | (2009.01) | |
| *H04W 76/19* | (2018.01) | |
| *H04W 80/02* | (2009.01) | |

(52) U.S. Cl.
CPC ........... *H04L 5/0051* (2013.01); *H04W 24/10* (2013.01); *H04W 76/19* (2018.02); *H04W 80/02* (2013.01)

(58) Field of Classification Search
CPC ....... H04B 17/328; H04L 1/1614; H04L 1/08; H04L 1/1822; H04L 1/1896; H04L 5/0051; H04L 5/0023; H04L 5/0048; H04L 5/0053; H04W 24/10; H04W 76/19; H04W 80/02; H04W 24/08; H04W 72/046; H04W 72/231; H04W 74/0833
See application file for complete search history.

(56) References Cited

U.S. PATENT DOCUMENTS

| | | | |
|---|---|---|---|
| 2020/0313746 A1 | 10/2020 | Bai | |
| 2021/0021320 A1* | 1/2021 | Koskela | H04B 7/0626 |
| 2021/0028848 A1 | 1/2021 | Tsai | |
| 2021/0029724 A1 | 1/2021 | Tsai | |
| 2021/0050901 A1 | 2/2021 | Chin | |
| 2021/0105176 A1* | 4/2021 | Tsai | H04L 43/16 |
| 2021/0258967 A1* | 8/2021 | Zhang | H04W 72/53 |
| 2021/0399784 A1* | 12/2021 | Deghel | H04W 80/02 |
| 2022/0039077 A1* | 2/2022 | Koskela | H04W 72/23 |
| 2022/0046438 A1* | 2/2022 | Lo | H04B 7/0695 |
| 2022/0085862 A1* | 3/2022 | Kung | H04W 76/19 |
| 2022/0103232 A1* | 3/2022 | Zhou | H04W 72/046 |
| 2022/0109489 A1* | 4/2022 | Zhu | H04L 1/1614 |
| 2022/0109547 A1* | 4/2022 | Svedman | H04B 7/0626 |
| 2022/0173788 A1* | 6/2022 | Kang | H04L 1/1864 |
| 2022/0200687 A1 | 6/2022 | Guo | |
| 2022/0337363 A1 | 10/2022 | Guo | |
| 2023/0006727 A1* | 1/2023 | Jang | H04L 5/0051 |
| 2023/0144010 A1* | 5/2023 | Kwak | H04L 5/0051 370/329 |
| 2023/0276278 A1* | 8/2023 | Loehr | H04W 74/0833 370/329 |
| 2023/0276519 A1* | 8/2023 | Gao | H04B 7/0695 370/252 |

OTHER PUBLICATIONS

"3rd Generation Partnership Project; Technical Specification Group Radio Access Network; NR; Multiplexing and channel coding (Release 16)", 3GPP TS 38.212 V16.1.0, Mar. 2020, 146 pages.
"3rd Generation Partnership Project; Technical Specification Group Radio Access Network; NR; Physical layer procedures for control (Release 16)" 3GPP TS 38.213 V16.1.0, Mar. 2020, 156 pages.
"3rd Generation Partnership Project; Technical Specification Group Radio Access Network; NR; Physical layer procedures for data (Release 16)", 3GPP TS 38.214 V16.1.0, Mar. 2020, 151 pages.
"5G; NR; Medium Access Control (MAC) protocol specification (3GPP TS 38.321 version 16.1.0 Release 16)", ETSI TS 138 321 V16.1.0, Jul. 2020, 153 pages.
"5G; NR; Radio Resource Control (RRC); Protocol specification (3GPP TS 38.331 version 16.1.0 Release 16)", ETSI TS 138 331 V16.1.0, Jul. 2020, 886 pages.
International Search Report and Written Opinion dated Jan. 7, 2022 regarding International Application No. PCT/KR2021/013618, 9 pages.
Samsung, "Enhancements on multi-beam operations," 3GPP TSG RAN WG1 #96, R1-1902306, Feb. 2019, 9 pages.
Intel Corporation, "Summary 2 on L1-SINR and SCell BFR," 3GPP TSG RAN WG1 #97, R1-1907892, May 2019, 22 pages.
Asia Pacific Telecom, "Discussion on Multi-beam Operations," 3GPP TSG RAN, WG1 #98b, R1-1910847, Oct. 2019, 6 pages.
Qualcomm Incorporated, "Enhancements on Multi-beam Operation", R1-1912968, 3GPP TSG RAN WG1 #99, Nov. 2019, 19 pages.
Extended European Search Report issued Feb. 19, 2024 regarding Application No. 21877950.2, 11 pages.
CMCC, "Enhancements on beam management tor multi-TRP", 3GPP TSG RAN WG1 #102-e, R1-2006203, Aug. 2020, 2 pages.
Spreadtrum Communications, "Discussion on multi-beam operation", 3GPP TSG RAN WG1 Meeting #95, R1-1813067, Nov. 2018, 5 pages.
Samsung, "Enhancements on beam management for multi-TRP", 3GPP TSG RAN WG1 #104-e, R1-2101189, Jan. 2021, 7 pages.

\* cited by examiner

| | TRP-1 | TRP-2 |
|---|---|---|
| BFD RS beam set | q0-1 | q0-2 |
| NBI RS beam set | q1-1 | q1-2 |
| Maximum number of BFI count | maxBFIcount-1 | maxBFIcount-2 |
| BFD timer | BFDtimer-1 | BFDtimer-2 |
| BFR timer | BFRtimer-1 | BFRtimer-2 |
| BFD thresholds | Qout-1 | Qout-2 |
| BFR thresholds | Qin-1 | Qin-2 |

|  | TRP-1 (PCell) | TRP-1 (SCell) |
|---|---|---|
| BFD RS beam set | q0p | q0s |
| NBI RS beam set | q1p | q1s |
| Maximum number of BFI count | maxBFIcount-p | maxBFIcount-s |
| BFD timer | BFDtimer-p | BFDtimer-s |
| BFR timer | BFRtimer-p | BFRtimer-s |
| BFD thresholds | Qout-p | Qout-s |
| BFR thresholds | Qin-p | Qin-s |

METHOD AND APPARATUS FOR BEAM FAILURE RECOVERY IN A WIRELESS COMMUNICATION SYSTEM

CROSS-REFERENCE TO RELATED APPLICATIONS AND CLAIM OF PRIORITY

This application is a continuation of U.S. patent application Ser. No. 17/449,602, filed on Sep. 30, 2021, which claims priority to U.S. Provisional Patent Application No. 63/087,588, filed on Oct. 5, 2020 and U.S. Provisional Patent Application No. 63/249,413, filed on Sep. 28, 2021. The content of the above-identified patent document is incorporated herein by reference.

TECHNICAL FIELD

The present disclosure relates generally to wireless communication systems and, more specifically, the present disclosure relates to beam failure recovery in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to beam failure recovery in a wireless communication system.

In one embodiment, a user equipment (UE) is provided. The UE includes a transceiver and a processor operably coupled to the transceiver. The processor is configured to identify first configuration information for at least two beam failure detection (BFD) reference signal (RS) sets each comprising one or more BFD RS resources and second configuration information for at least two new beam identification (NBI) RS sets each comprising one or more NBI RS resources. The at least two NBI RS sets are one-to-one associated with the at least two BFD RS sets, respectively. The processor is further configured to measure, based on the first configuration information, the one or more BFD RS resources in each of the at least two BFD RS sets; detect, based on the measured one or more BFD RS resources, a beam failure event for one of the at least two BFD RS sets; measure, based on the second configuration information, the one or more NBI RS resources in a NBI RS set that is associated with the one BFD RS set; identify, based on the measured one or more NBI RS resources, one or more NBI RS resources for a new beam recovery; and trigger, in response to detection of the beam failure event for the one BFD RS set and identification of the one or more NBI RS resources, a beam failure recovery (BFR) event.

In another embodiment, a base station (BS) is provided. The BS includes a transceiver configured to transmit, to a UE, first configuration information for at least two BFD RS sets each comprising one or more BFD RSs resources and second configuration information for at least two NBI RS sets each comprising one or more NBI RS resources. The at least two NBI RS sets are one-to-one associated with the at least two BFD RS sets, respectively. The BS further includes a processor operably coupled to the transceiver. The processor is configured to perform a BFR procedure with the UE after a beam failure event for one of the at least two BFD RS sets and identification of one or more NBI RS resources of the at least two new NBI RS sets for a new beam recovery.

In yet another embodiment, a method for operating a UE is provided. The method includes identifying first configuration information for at least two BFD RS sets each comprising one or more BFD RSs resources and second configuration information for at least two NBI RS sets each comprising one or more NBI RS resources. The at least two NBI RS sets one-to-one associated with the at least two BFD RS sets, respectively. The method further includes measuring, based on the first configuration information, the one or more BFD RS resources in each of the at least two BFD RS sets; detecting, based on the measured one or more BFD RS resources, a beam failure event for one of the at least two BFD RS sets; measuring, based on the second configuration information, the one or more NBI RS resources in a NBI RS set that is associated with the one BFD RS set; identifying, based on the measured one or more NBI RS resources, one or more NBI RS resources for a new beam recovery; and triggering, in response to detection of the beam failure event for the one BFD RS set and identification of the one or more NBI RS resources, a BFR event.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

Figure 1:
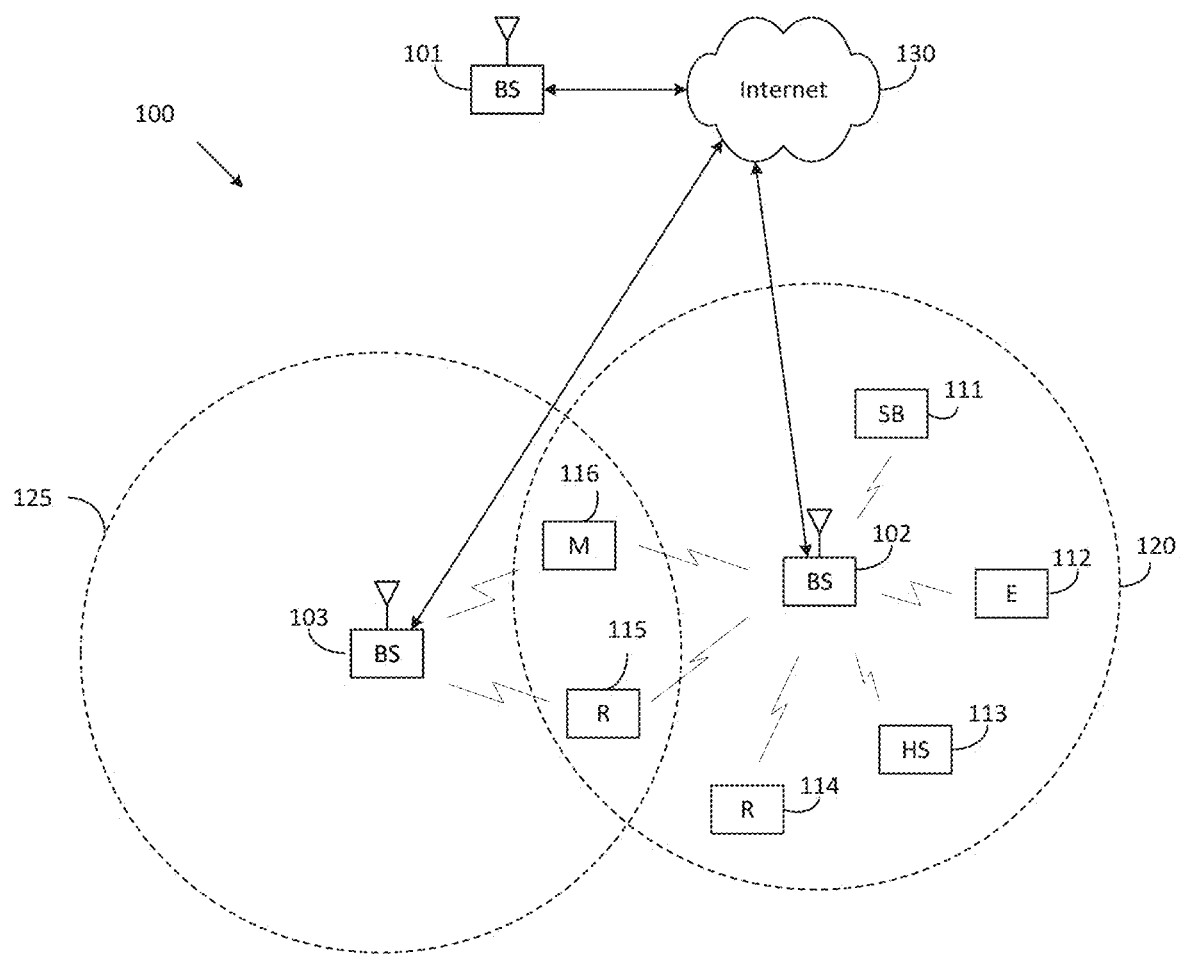
FIG. 1 illustrates an example wireless network according to embodiments of the present disclosure.
Figure 2:
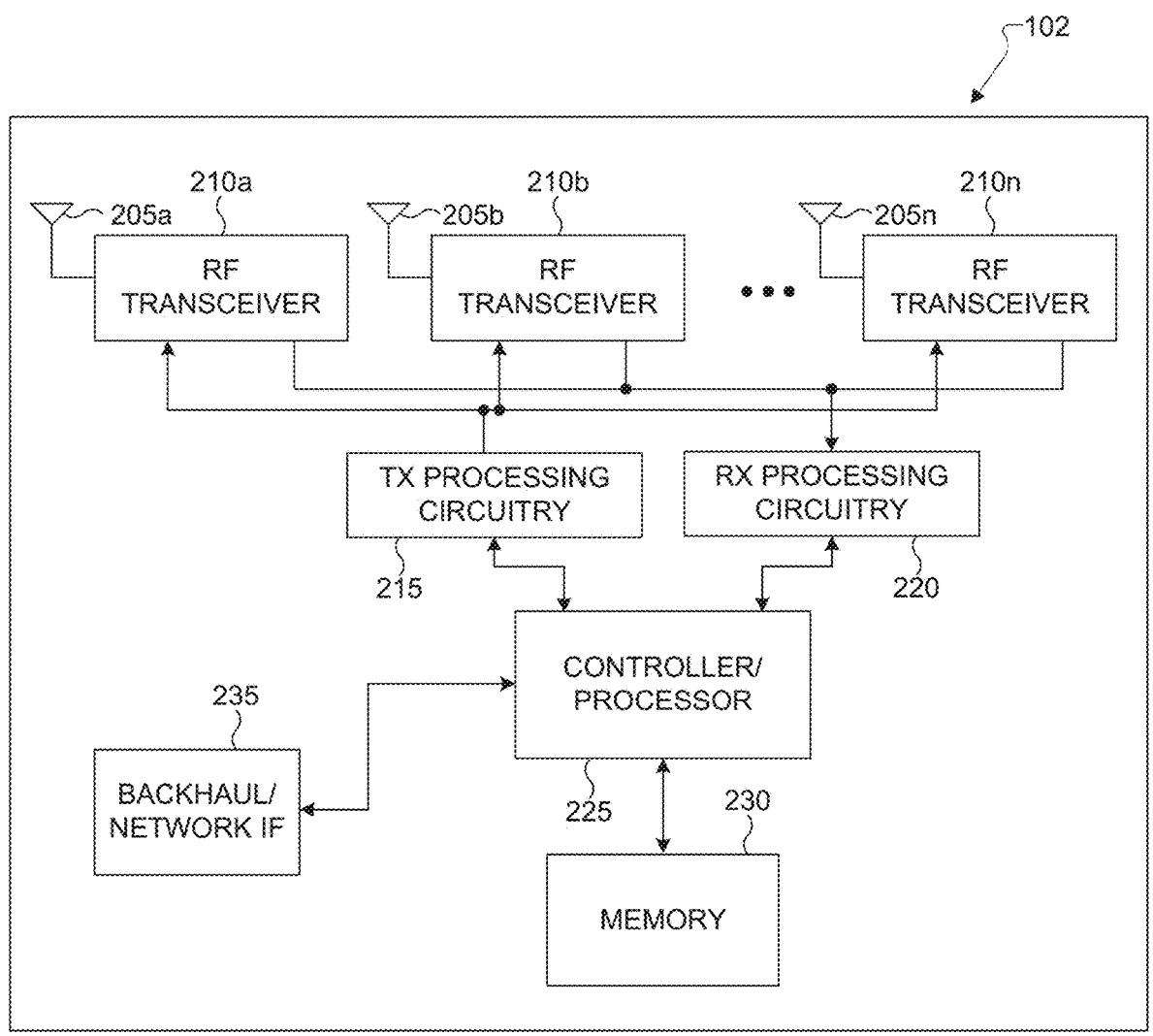
FIG. 2 illustrates an example gNB according to embodiments of the present disclosure.
Figure 3:
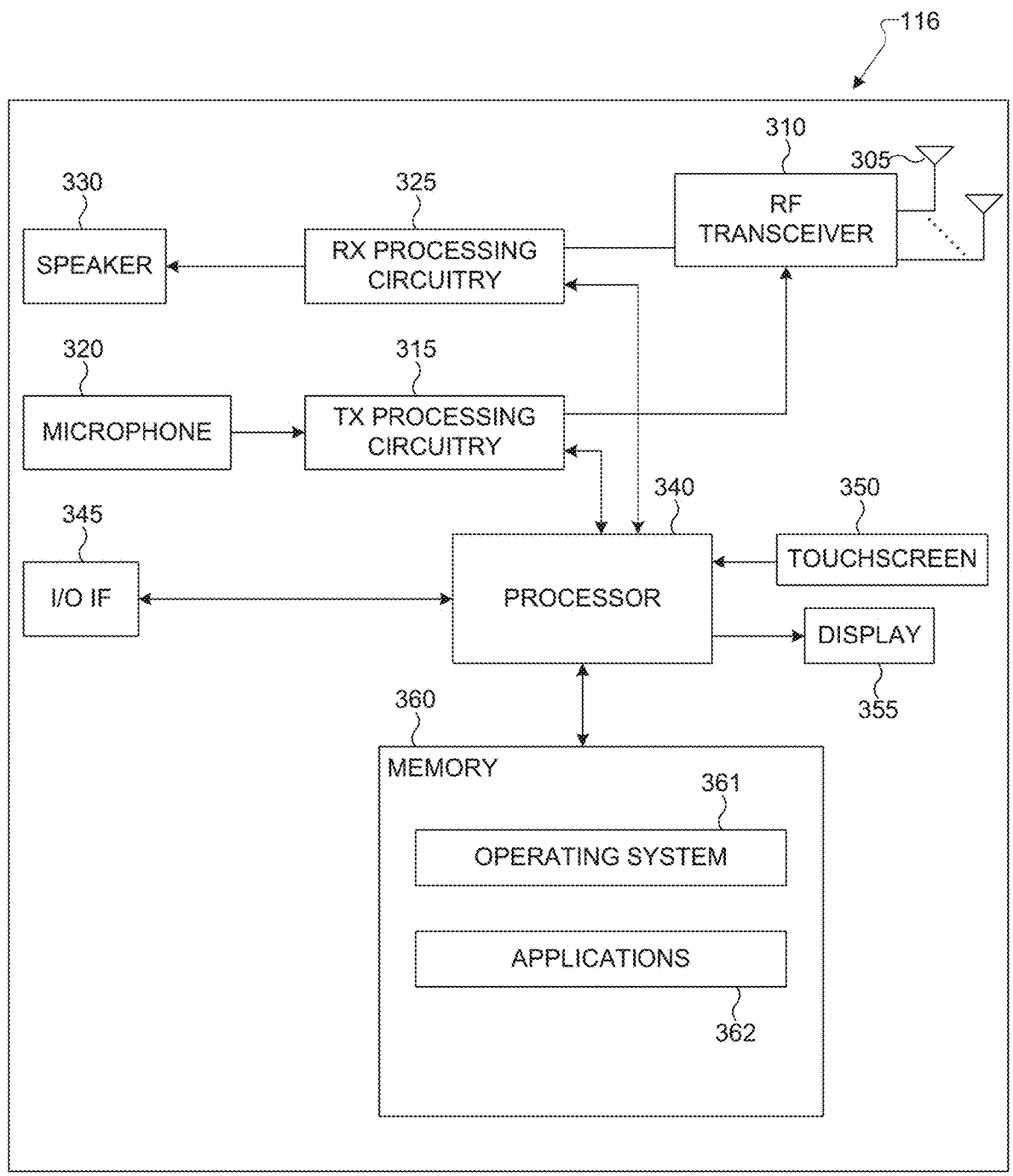
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), TRP, an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for handling beam failure recovery operations. In certain embodiments, and one or more of the gNBs 101-103 includes circuitry, programing, or a combination thereof, for handling beam failure recovery operations.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam failure recovery operation. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (COMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 30 KHz or 15 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
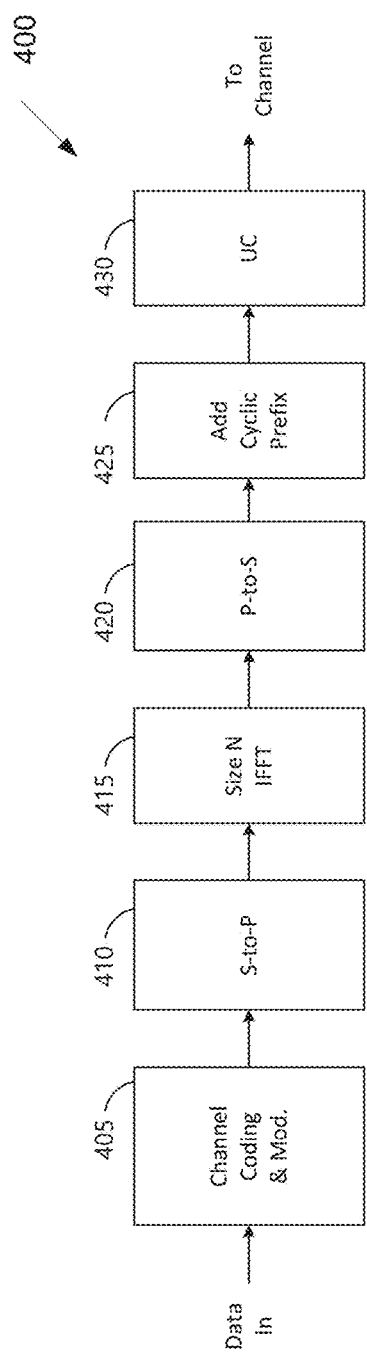
FIGS. 4 and 5 illustrate example wireless transmit and receive paths according to this disclosure.
Figure 5:
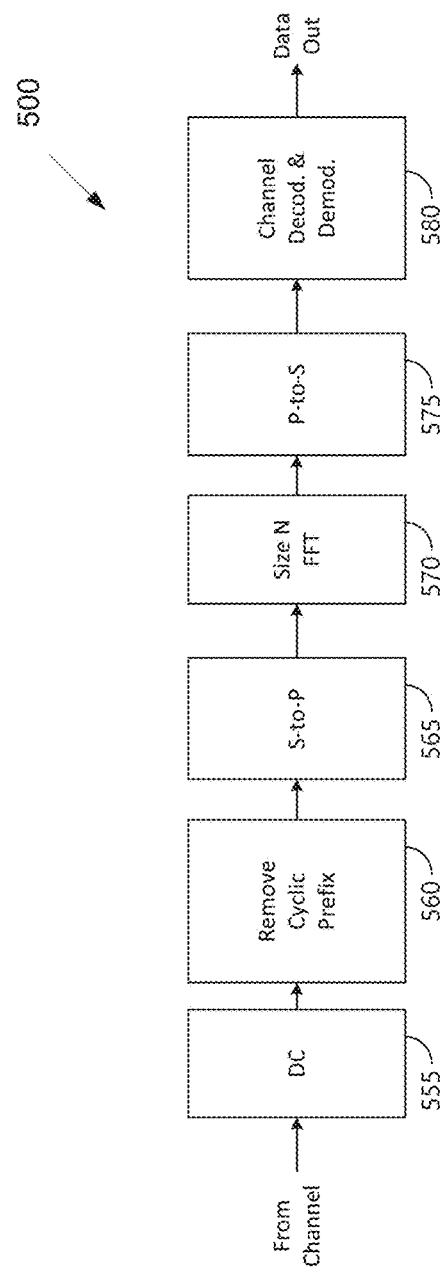

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the beam indication channel in a multi-beam system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In a wireless communications system, a radio link failure (RLF) could occur if a significant/sudden link quality drop is observed at the UE side. If a RLF occurs, fast RLF recovery mechanisms, therefore, become essential to promptly re-establish the communication link(s) and avoid severe service interruption. At higher frequencies, e.g., millimeter-wave (mmWave) frequencies or FR2 in the 3GPP NR, both the transmitter and receiver could use directional (analog) beams to transmit and receive various RSs/channels such as SSBs, CSI-RSs, PDCCHs or PDSCHs. Hence, prior to declaring a full RLF, the UE could first detect and recover a potential beam failure if the signal qualities/strengths of certain beam pair links (BPLs) are below a certain threshold for a certain period of time.

Figure 6A:
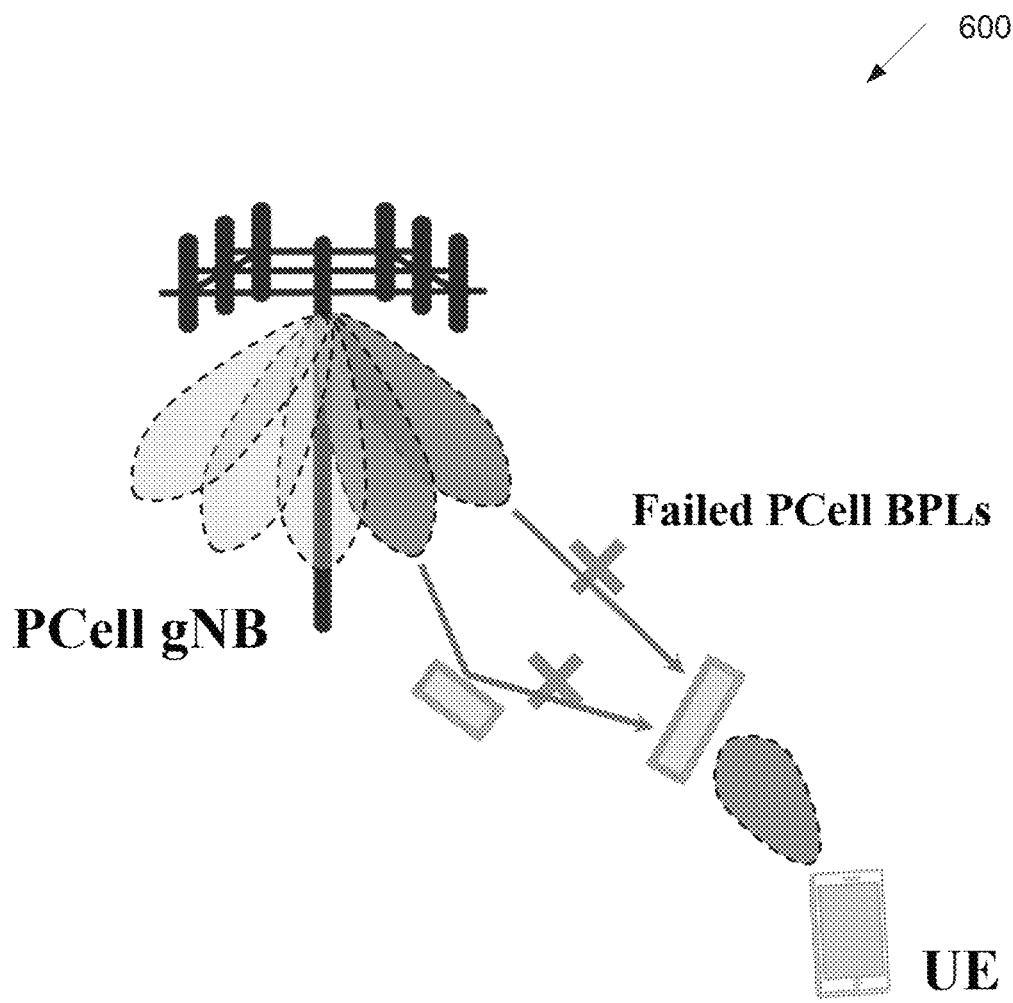
FIG. 6A illustrates an example of a beam failure event according to embodiments of the present disclosure.

FIG. 6A illustrates an example of a beam failure event 600 according to embodiments of the present disclosure. An embodiment of the beam failure event 600 shown in FIG. 6A is for illustration only.

Figure 6B:
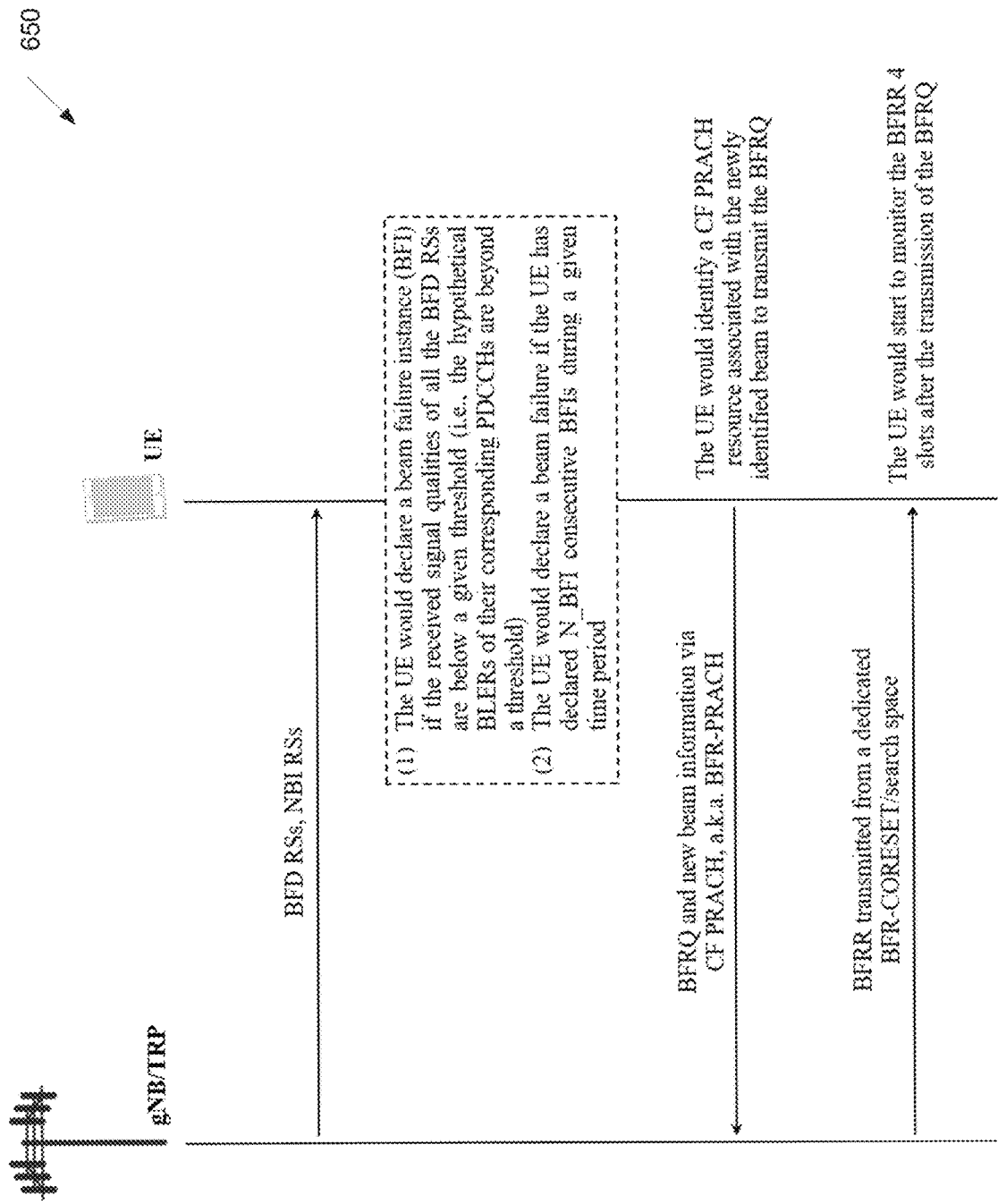
FIG. 6B illustrates an example of a beam failure recovery procedure according to embodiments of the present disclosure.

FIG. 6B illustrates an example of a beam failure recovery procedure 650 according to embodiments of the present disclosure. An embodiment of the beam failure recovery procedure 650 shown in FIG. 6B is for illustration only.

The 3GPP Rel. 15 beam failure recovery (BFR) procedure mainly targets for a primary cell (PCell or PSCell) under the carrier aggregation (CA) framework as shown in FIG. 6A. The BFR procedure in the 3GPP Rel. 15 comprises the following key components, which are also depicted in FIG. 6B: (1) beam failure detection (BFD); (2) new beam identification (NBI); (3) BFR request (BFRQ); and (4) BFRQ response (BFRR).

As can be seen from FIG. 6B, the UE is first configured by the gNB a set of BFD RS resources to monitor the link qualities between the gNB and the UE. One BFD RS resource could correspond to one (periodic) CSI-RS/SSB RS resource, which could be a quasi-co-located (QCL) source RS with typed in a TCI state for a CORESET. If the received signal qualities of all the BFD RS resources are below a given threshold (implying that the hypothetical BLERs of the corresponding CORESETs/PDCCHs are above a given threshold), the UE could declare a beam failure instance (BFI). Further, if the UE has declared N_BFI consecutive BFIs within a given time period, the UE would declare a beam failure.

After declaring/detecting the beam failure, the UE would transmit the BFRQ to the gNB via a contention-free (CF) PRACH (CF BFR-PRACH) resource, whose index is associated with a new beam identified by the UE. Specifically, to determine a potential new beam, the UE could be first configured by the network a set of SSB and/or CSI-RS resources (NBI RS resources) via a higher layer parameter candidateBeamRSList. The UE would then measure the NBI RSs and calculate their L1-RSRPs. If at least one of the measured L1-RSRPs of the NBI RSs is beyond a given threshold, the UE would select the beam that corresponds to the NBI RS with the highest L1-RSRP as the new beam.

To determine a CF BFR-PRACH resource to convey the BFRQ, the UE could be first configured by the network a set of PRACH resources, each associated with a NBI RS resource. The UE could then select the PRACH resource that has the one-to-one correspondence to the selected NBI RS resource (the new beam) to send the BFRQ to the gNB. From the index of the selected CF PRACH resource, the gNB could also know which beam is selected by the UE as the new beam.

Four slots after the UE has transmitted the BFRQ, the UE could start to monitor a dedicated CORESET/search space for BFRQ response. The dedicated CORESET is addressed to the UE-specific C-RNTI and would be transmitted by the gNB using the newly identified beam. If the UE detects a valid UE-specific DCI in the dedicated CORESET for BFRR, the UE assumes that the beam failure recovery request has been successfully received by the network, and the UE would complete the BFR process. Otherwise, if the UE does not receive the BFRR within a configured time window, the UE would initiate a contention-based (CB) random access (RA) process to reconnect to the network.

Figure 7A:
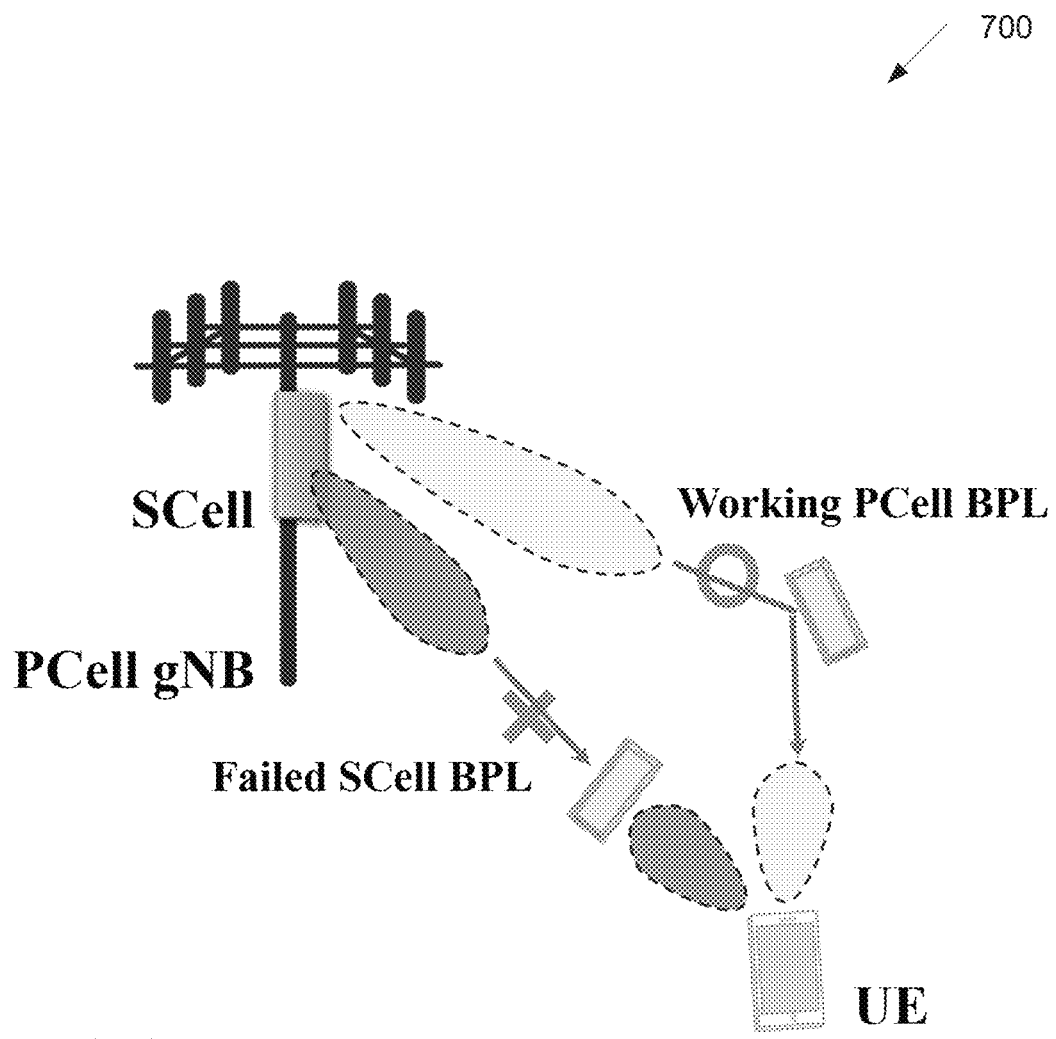
FIG. 7A illustrates another example of a beam failure event according to embodiments of the present disclosure.

FIG. 7A illustrates another example of a beam failure event 700 according to embodiments of the present disclosure. An embodiment of the beam failure event 700 shown in FIG. 7A is for illustration only.

Figure 7B:
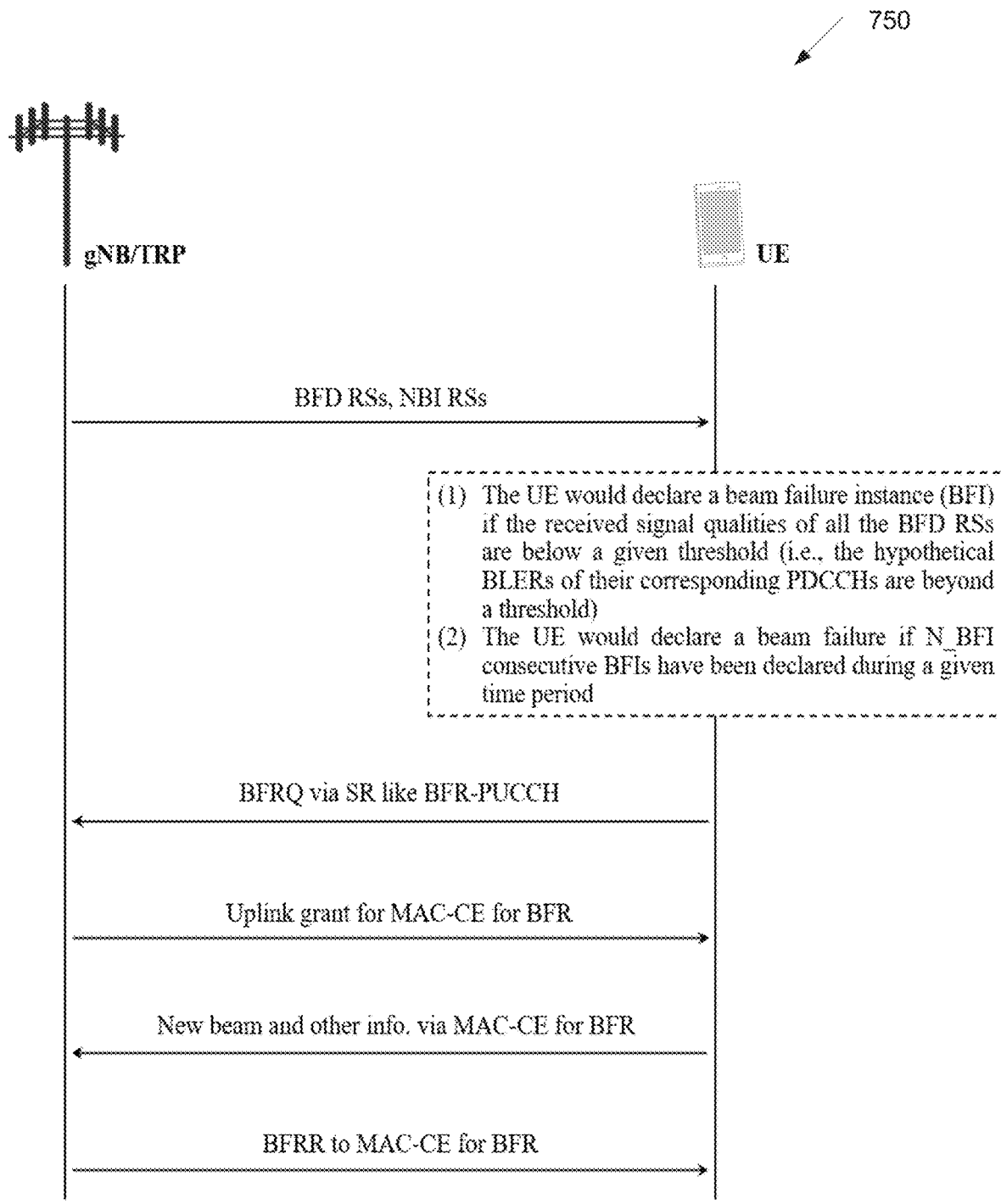
FIG. 7B illustrates another example of a beam failure recovery procedure according to embodiments of the present disclosure.

FIG. 7B illustrates another example of a beam failure recovery procedure 750 according to embodiments of the present disclosure. An embodiment of the beam failure recovery procedure 750 shown in FIG. 7B is for illustration only.

In the 3GPP Rel. 16, the BFR procedures were customized for the secondary cell (SCell) under the CA framework, in which the BPL(s) between the PCell and the UE is assumed to be always working. An illustrative example of the SCell beam failure is given in FIG. 7A. In FIG. 7B, the key components of the Rel. 16 SCell BFR are presented. It is evident from FIG. 7B that prior to sending the BFRQ, the Rel. 15 and Rel. 16 BFR procedures have similar BFD designs.

After declaring/detecting the beam failure for the SCell, the UE would transmit the BFRQ in form of a scheduling request (SR) over a PUCCH for the working PCell. Furthermore, the UE could only transmit the BFRQ at this stage without indicating any new beam index, failed SCell index or other information to the network. This is different from the Rel. 15 PCell/PSCell procedure, in which the UE would indicate both the BFRQ and the identified new beam index to the network at the same time. Allowing the gNB to quickly know the beam failure status of the SCell without waiting for the UE to identify a new beam could be beneficial. For instance, the gNB could deactivate the failed SCell and allocate the resources to other working SCells.

The UE could be indicated by the network an uplink grant in response to the BFRQ SR, which would allocate necessary resources for the MAC CE to carry new beam index (if identified), failed SCell index and etc. over the PUSCH for the working PCell. After transmitting the MAC CE for BFR to the working PCell, the UE would start to monitor the BFRR. The BFRR could be a TCI state indication for a CORESET for the corresponding SCell. The BFRR to the MAC CE for BFR could also be a normal uplink grant for scheduling a new transmission for the same HARQ process as the PUSCH carrying the MAC CE for BFR. If the UE could not receive the BFRR within a configured time window, the UE could transmit BFR-PUCCH again, or fall back to contention-based random access (CBRA) process.

In a multi-TRP system, in which different TRPs could be geographically non-co-located, one or more BFLs between the UE and the TRP(s) could fail. In this disclosure, a TRP can represent a collection of measurement antenna ports, measurement RS resources and/or control resource sets (CORESETs).

For example, a TRP could be associated with one or more of: a plurality of CSI-RS resources, a plurality of CRIs (CSI-RS resource indices/indicators), a measurement RS resource set, for example, a CSI-RS resource set along with its indicator, a plurality of CORESETs associated with a CORESETPoolIndex, and a plurality of CORESETs associated with a TRP-specific index/indicator/identity.

Furthermore, different TRPs could broadcast/be associated with different physical cell identities (PCIs) and one or more TRPs in the system could broadcast/be associated with different PCIs from that of serving cell/TRP.

Figure 8:
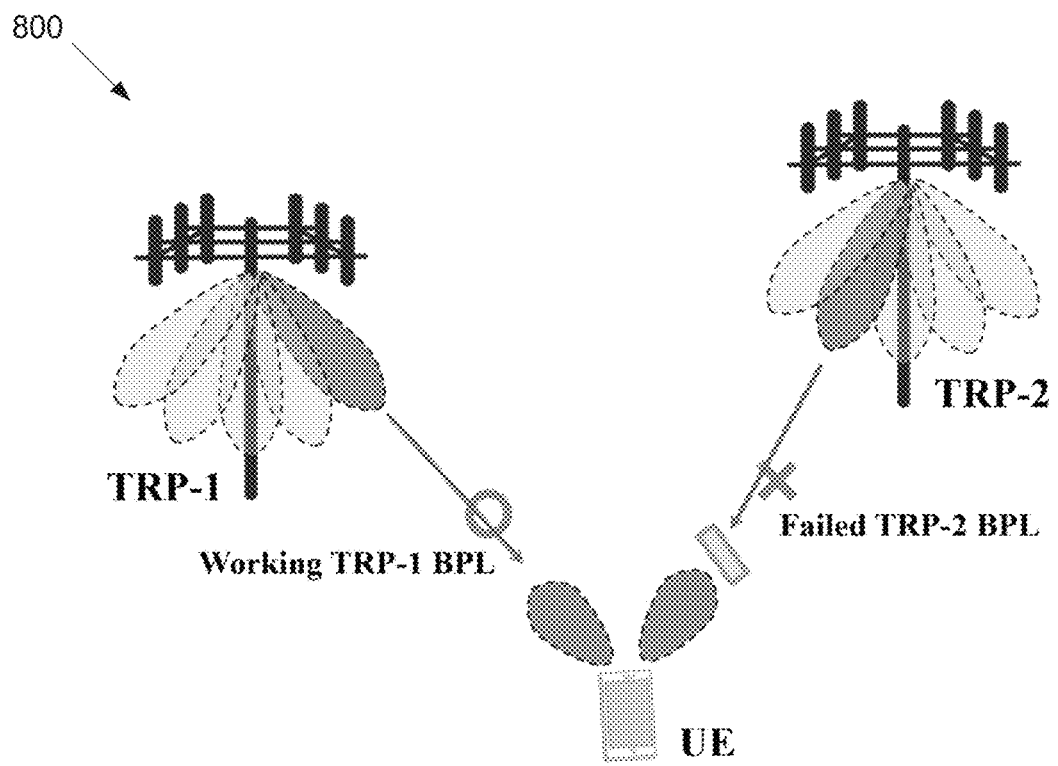
FIG. 8 illustrates an example of a beam failure event in a multi-TRP system according to embodiments of the present disclosure.

FIG. 8 illustrates an example of a beam failure event in a multi-TRP system 800 according to embodiments of the present disclosure. An embodiment of the beam failure event in a multi-TRP system 800 shown in FIG. 8 is for illustration only.

In FIG. 8, a conceptual example of BPL failure in a multi-TRP system is presented. As can be seen from FIG. 8, two TRPs, TRP-1 and TRP-2, could simultaneously transmit to the UE various RSs/channels in either a coherent or a non-coherent manner. As the two TRPs are not physically co-located, their channel conditions between the UE could be largely different from each other. For instance, the BPL between one coordinating TRP (TRP-2 in FIG. 8) and the UE could fail due to blockage, while the BPL between the other coordinating TRP (TRP-1 in FIG. 8) and the UE could still work.

According to the BFR procedures defined in the 3GPP Rel. 15 and Rel. 16, the UE would trigger or initiate the BFR only when all the BFD RSs, and therefore, the corresponding BPLs are failed. Hence, there is a need to customize the BFR procedures for the multi-TRP system (TRP-specific BFR and/or partial BFR) such that the UE could initiate or trigger the BFR when the BFD RS(s) for at least one TRP, and therefore, the corresponding BPL(s) are failed, while the BPL(s) between the other TRP(s) in the multi-TRP system and UE are still working.

Figure 9:
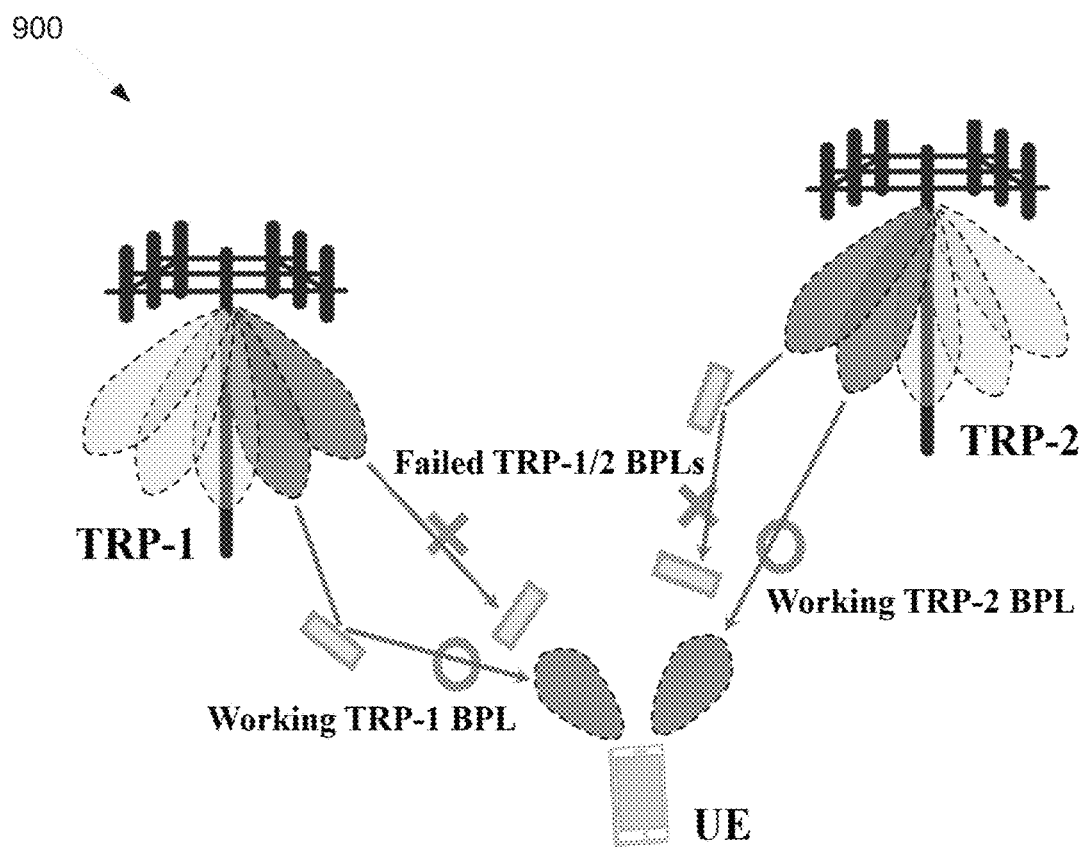
FIG. 9 illustrates another example of a beam failure event in a multi-TRP system according to embodiments of the present disclosure.

FIG. 9 illustrates another example of a beam failure event in a multi-TRP system 900 according to embodiments of the present disclosure. An embodiment of the beam failure event in a multi-TRP system 900 shown in FIG. 9 is for illustration only.

In FIG. 9, another example of BPL failure in a multi-TRP system is presented. Different from the example shown in FIG. 8, the failed BFD RSs, and therefore, the corresponding failed BPLs could be associated with more than one TRPs, and there are still working BPLs between the two TRPs and the UE. Based on the Rel. 15 and Rel. 16 BFR firing/triggering conditions, the UE would not trigger or initiate a BFR for the example shown in FIG. 9 because not all the BFD RSs are failed.

To avoid a potential RLF, the UE could still initiate or trigger the BFR even though only a subset of the BFD RSs are failed, resulting in the so-called partial BFR design. Detailed partial BFR mechanisms and signaling support need to be specified for a multi-TRP system, which are not characterized in the prior arts. It is evident from FIG. 8 and FIG. 9 that the TRP-specific BFR could be a special case of the partial BFR.

This disclosure considers various design aspects for the TRP-specific BFR or the partial BFR in a multi-TRP system. Both multi-DCI and single-DCI based multi-TRP operations are considered, wherein the higher layer signaling index CORESETPoolIndex is configured in the multi-DCI based multi-TRP system.

In the present disclosure, various TRP-specific or per TRP BFR designs are first presented for the multi-DCI based multi-TRP system, followed by various TRP-specific or per TRP BFR designs for the single-DCI based multi-TRP system. Various partial BFR strategies are also discussed in this disclosure for either the single-DCI based or the multi-DCI based multi-TRP operation.

The UE could be indicated by the network that the UE could perform/conduct the TRP-specific BFR or per TRP BFR or multi-TRP BFR when other necessary conditions are met/satisfied; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

For example, a higher layer parameter, denoted by enableMtrpBfr, could be defined/used to turn on/off the TRP-specific BFR or per TRP BFR or multi-TRP BFR. The higher layer parameter enableMtrpBfr could be included/indicated in a transmission configuration indication (TCI) state (e.g., via the higher layer parameter TCI-State) or CSI resource setting (e.g., via the higher layer parameter CSI-ResourceConfig) or CSI reporting setting (e.g., via the higher layer parameter CSI-ReportConfig) or aperiodic CSI trigger/trigger state. For instance, if the UE is configured with the higher layer parameter enableMtrpBfr set to 'enabled', the UE could perform the TRP-specific BFR or per TRP BFR or multi-TRP BFR discussed below in the present disclosure when other necessary BFR conditions are met/satisfied.

In one embodiment, TRP-specific/per TRP BFR for multi-PDCCH or multi-DCI based multi-TRP is provided.

Figure 10:
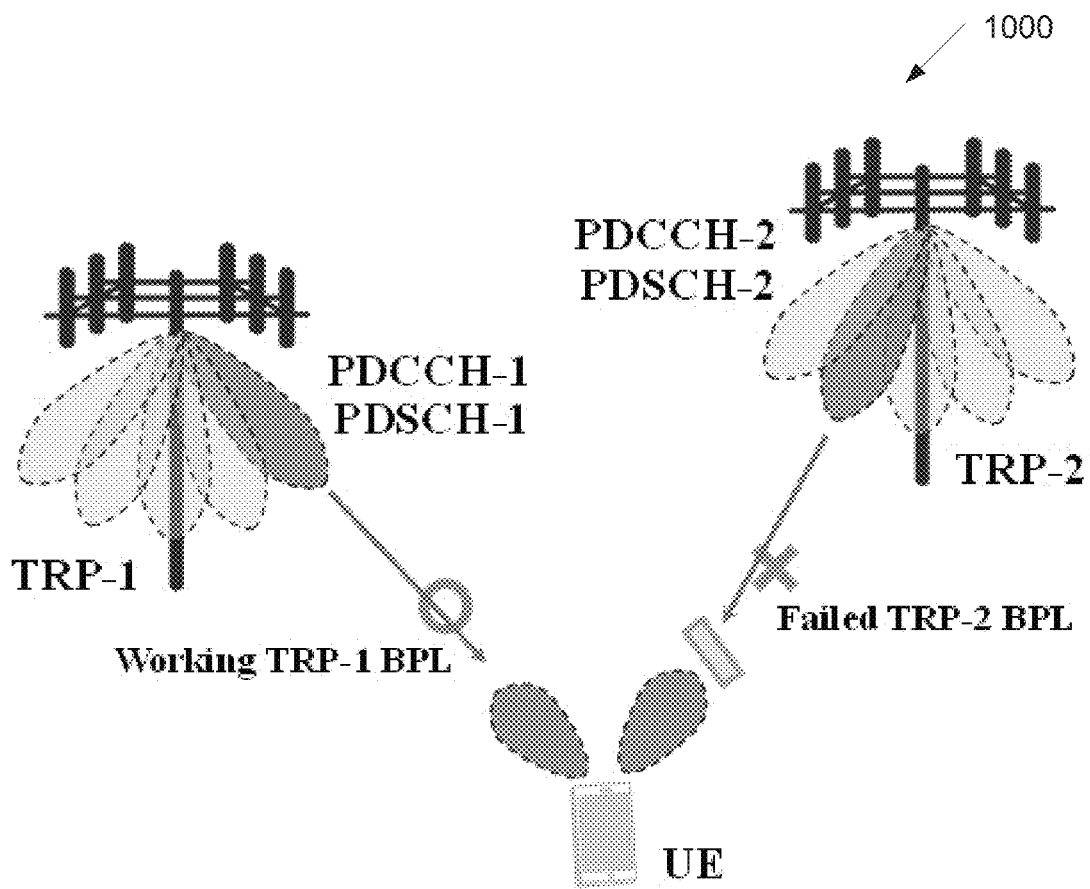
FIG. 10 illustrates an example TRP-specific or per TRP or partial beam failure in a multi-PDCCH or multi-DCI based multi-TRP system according to embodiments of the present disclosure.

FIG. 10 illustrates an example TRP-specific or per TRP or partial beam failure in a multi-PDCCH or multi-DCI based multi-TRP system 1000 according to embodiments of the present disclosure. An embodiment of the TRP-specific or per TRP or partial beam failure in a multi-PDCCH or multi-DCI based multi-TRP system 1000 shown in FIG. 10 is for illustration only.

In a multi-DCI or multi-PDCCH based multi-TRP system, the UE could receive from the network one or more PDCCHs/DCIs associated with different TRP-specific index/ID values such as CORESETPoolIndex values, PCI values and etc. Furthermore, at least two (M≥2) BFD RS (beam) sets each associated with a different TRP-specific index/ID value such as CORESETPoolIndex value or PCI could be configured.

For the example shown in FIG. 10, the BFD RS beam set denoted by q0-1 could be associated with TRP-1 (e.g., CORESETPoolIndex value '0'), and another BFD RS beam set denoted by q0-2 could be associated with TRP-2 (e.g., CORESETPoolIndex value '1'). Each configured BFD RS beam set could contain/comprise N≥1 BFD RS resources/beams.

The UE could implicitly determine/configure the BFD RS beam sets (and therefore, the corresponding BFD RS resources/beams configured therein). Specifically, the BFD RS resource(s)/beam(s) configured in a BFD RS beam set, e.g., q0-1 or q0-2 in FIG. 10, shall be configured as the QCL-typeD source RS(s) in one or more active TCI states for one or more PDCCHs transmitted from one or more CORESETs associated with a CORESETPoolIndex value—the BFD RS beam set is therefore said to be associated with the CORESETPoolIndex value. Furthermore, different BFD RS beam sets could be associated with different CORESETPoolIndex values.

For the above discussed implicit configuration of the BFD RS beam sets (and therefore, the corresponding BFD RS resources/beams configured therein), various means of associating the configured BFD RS beam sets and the TRPs, e.g., via the higher layer signaling index values such as CORESETPoolIndex values are presented as follows.

For example, the first BFD RS beam set in the list/pool of configured M=2 BFD RS beam sets is associated with/corresponds to CORESETPoolIndex value '0', and the second BFD RS beam set in the list/pool of configured M=2 BFD RS beam sets is associated with/corresponds to CORESETPoolIndex value '1'. Or equivalently, the BFD RS beam set m or the m-th BFD RS beam set in the list/pool of configured M=2 BFD RS beam sets shall be associated with/correspond to CORESETPoolIndex value m, where m=1, 2.

That is, the BFD RS resource(s)/beam(s) configured in the BFD RS beam set m or the m-th BFD RS beam set in the list/pool of configured M=2 BFD RS beam sets shall be configured as the QCL-typeD source RS(s) in one or more active TCI states for one or more PDCCHs transmitted from one or more CORESETs associated with the CORESETPoolIndex value m−1, where m=1, 2.

For another example, the BFD RS beam set with the lowest BFD RS beam set index/ID value in the list/pool of configured M=2 BFD RS beam sets is associated with/corresponds to CORESETPoolIndex value '0', and the BFD RS beam set with the highest BFD RS beam set index/ID value in the list/pool of configured M=2 BFD RS beam sets is associated with/corresponds to CORESETPoolIndex value '1'.

That is, the BFD RS resource(s)/beam(s) configured in the BFD RS beam set with the m-th lowest (or highest) BFD RS beam set ID value in the list/pool of configured M=2 BFD RS beam sets shall be configured as the QCL-typeD source RS(s) in one or more active TCI states for one or more PDCCHs transmitted from one or more CORESETs associated with the CORESETPoolIndex value m−1, where m=1, 2.

Yet for another example, the UE could be explicitly indicated by the network the exact mapping between the M=2 BFD RS beam sets and the CORESPETPoolIndex values '0' and '1'; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

The above discussed design examples can be extended to M>2, wherein more than two BFD RS beam sets and more than two higher layer signaling index values such as CORESETPoolIndex values can be configured.

For example, the BFD RS beam set m or the m-th BFD RS beam set in the list/pool of configured M>2 BFD RS beam sets shall be associated with/correspond to the higher layer signaling index value m (such as CORESETPoolIndex value m−1), where m=1, 2, . . . , M. That is, the BFD RS resource(s)/beam(s) configured in the BFD RS beam set m or the m-th BFD RS beam set in the list/pool of configured M>2 BFD RS beam sets shall be configured as the QCL-typeD source RS(s) in one or more active TCI states for one or more PDCCHs transmitted from one or more CORESETs associated with the higher layer signaling index value m (such as CORESETPoolIndex value m−1), where m=1, 2, . . . , M.

For another example, the BFD RS beam set with the lowest BFD RS beam set index/ID value in the list/pool of configured M>2 BFD RS beam sets is associated with/corresponds to the higher layer signaling index value '0' (such as CORESETPoolIndex value '0'), the BFD RS beam set with the second lowest BFD RS beam set index/ID value in the list/pool of configured M>2 BFD RS beam sets is associated with/corresponds to the higher layer signaling index value '1' (such as CORESETPoolIndex value '1'), and so on, and the BFD RS beam set with the highest BFD RS beam set index/ID value in the list/pool of configured M>2 BFD RS beam sets is associated with/corresponds to the higher layer signaling index value 'M−1' (such as CORESETPoolIndex value 'M−1').

That is, the BFD RS resource(s)/beam(s) configured in the BFD RS beam set with the m-th lowest (or highest) BFD RS beam set ID value in the list/pool of configured M>2 BFD RS beam sets shall be configured as the QCL-typeD source RS(s) in one or more active TCI states for one or more PDCCHs transmitted from one or more CORESETs associated with the higher layer signaling index value m (such as CORESETPoolIndex value m−1), where m=1, 2.

Yet for another example, the UE could be explicitly indicated by the network the exact mapping between the M>2 BFD RS beam sets and the M>2 higher layer signaling index values such as CORESPETPoolIndex values; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

Alternatively, the UE could be explicitly indicated by the network the M≥2 BFD RS beam sets (and therefore, the BFD RS resource(s)/beam(s) configured therein); this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

For the above discussed explicit configuration of the BFD RS beam sets (and therefore, the corresponding BFD RS resources/beams configured therein), various means of associating the network configured BFD RS beam sets and the TRPs, e.g., via the TRP-specific index/ID values such as CORESETPoolIndex values or PCIs are presented as follows.

For example, the first BFD RS beam set or the BFD RS beam set with the lowest BFD RS beam set index/ID value in the list/pool of network configured M≥2 BFD RS beam sets is associated with/corresponds to the first TRP-specific index/ID value in a list/set/pool of higher layer configured TRP-specific index/ID values such as CORESETPoolIndex values or PCI values, the second BFD RS beam set or the BFD RS beam set with the second lowest BFD RS beam set index/ID value in the list/pool of network configured M≥2 BFD RS beam sets is associated with/corresponds to the second TRP-specific index/ID value in the list/set/pool of higher layer configured TRP-specific index/ID values such as CORESETPoolIndex values or PCI values, and so on, and the last (M-th) BFD RS beam set or the BFD RS beam set with the highest BFD RS beam set index/ID value in the list/pool of higher layer configured M≥2 BFD RS beam sets is associated with/corresponds to the last TRP-specific index/ID value in the list/set/pool of higher layer configured TRP-specific index/ID values such as CORESETPoolIndex values or PCI values.

That is, the BFD RS beam set m or the m-th BFD RS beam set or the BFD RS beam set with the m-th lowest (or highest) BFD RS beam set ID value in the list/pool of configured M>2 BFD RS beam sets shall be associated with/correspond to the m-th entry/TRP-specific index/ID value in the list/set/pool of higher layer configured TRP-specific index/ID values such as CORESETPoolIndex values or PCI values, where m=1, 2, . . . , M.

For another example, the first BFD RS beam set or the BFD RS beam set with the lowest BFD RS beam set index/ID value in the list/pool of network configured M≥2 BFD RS beam sets is associated with/corresponds to the lowest TRP-specific index/ID value such as the lowest CORESETPoolIndex value or PCI value in the list/set/pool of higher layer configured TRP-specific index/ID values such as CORESETPoolIndex values or PCI values, the second BFD RS beam set or the BFD RS beam set with the second lowest BFD RS beam set index/ID value in the list/pool of higher layer configured M≥2 BFD RS beam sets is associated with/corresponds to the second lowest TRP-specific index/ID value such as the second lowest CORESETPoolIndex value or PCI value in the list/set/pool of higher layer configured TRP-specific index/ID values such as CORESETPoolIndex values or PCI values, and so on, and the last (M-th) BFD RS beam set or the BFD RS beam set with the highest BFD RS beam set index/ID value in the list/pool of higher layer configured M≥2 BFD RS beam sets is associated with/corresponds to the highest TRP-specific index/ID value such as the highest CORESETPoolIndex value or PCI value in the list/set/pool of higher layer configured TRP-specific index/ID values such as CORESETPoolIndex values or PCI values.

That is, the BFD RS beam set m or the m-th BFD RS beam set or the BFD RS beam set with the m-th lowest (or highest) BFD RS beam set ID value in the list/pool of configured M≥2 BFD RS beam sets shall be associated with/correspond to the m-th lowest (or highest) TRP-specific index/ID value in the list/set/pool of higher layer configured TRP-specific index/ID values such as CORESETPoolIndex values or PCI values, where m=1, 2, . . . , M.

Yet for another example, the UE could be explicitly indicated by the network the exact mapping between the M≥2 BFD RS beam sets and the TRP-specific index/ID values such as CORESETPoolIndex values or PCI values; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

Optionally, the UE could be first higher layer configured by the network (e.g., via higher layer RRC signaling) a list/pool of M_tot≥2 candidate BFD RS beam sets each containing/comprising at least one candidate BFD RS resource/beam. The UE could then receive from the network at least one MAC CE activation command/bitmap to activate M≥2 BFD RS beam sets from the higher layer configured list/pool of M_tot≥2 candidate BFD RS beam sets.

In one example, the UE could receive from the network a single MAC CE activation command/bitmap to activate M≥2 BFD RS beam sets from the higher layer configured list/pool of M_tot≥2 candidate BFD RS beam sets. For instance, the bitmap could contain/comprise M_tot entries/bit positions with each entry/bit position in the bitmap corresponding to an entry in the RRC configured list/pool of M_tot candidate BFD RS beam sets.

If an entry/bit position in the bitmap is enabled, e.g., set to '1', the corresponding entry in the RRC configured list/pool of M_tot candidate BFD RS beam sets is activated as a BFD RS beam set. The bitmap could have M≥2 entries/bit positions set to '1's, hence activating a list/pool of M≥2 BFD RS beam sets from the RRC configured list/pool of M_tot candidate BFD RS beam sets.

In another example, the UE could receive from the network M≥2 MAC CE activation commands/bitmaps. Each MAC CE activation command/bitmap could activate at least one BFD RS beam set from the RRC configured list/pool of M_tot candidate BFD RS beam sets. For instance, the UE could receive from the network M≥2 bitmaps. Each of the M≥2 bitmaps could contain/comprise M_tot entries/bit positions with each entry/bit position in the bitmap corresponding to an entry in the RRC configured list/pool of M_tot candidate BFD RS beam sets.

If an entry/bit position in a bitmap is enabled, e.g., set to '1', the corresponding entry in the RRC configured list/pool of M_tot candidate BFD RS beam sets is activated as a BFD RS beam set. Each bitmap could contain/comprise at least one entry/bit position set to '1'. Hence, the M≥2 MAC CE activation commands/bitmaps could contain/comprise M≥2 entries/bit positions set to '1's, activating a list/pool of M≥2 BFD RS beam sets from the RRC configured list/pool of M_tot candidate BFD RS beam sets.

In yet another example, the UE could receive from the network M≥2 MAC CE activation commands/bitmaps. Each MAC CE activation command/bitmap could activate at least one BFD RS beam set from the RRC configured list/pool of M_tot candidate BFD RS beam sets. Furthermore, each MAC CE activation command/bitmap could contain/comprise/indicate at least one TRP-specific index/ID value such as CORESETPoolIndex value or PCI. Alternatively, each MAC CE activation command/bitmap could contain/comprise index of at least one TRP-specific index/ID value such as CORESETPoolIndex value or PCI in the higher layer configured list/set/pool of TRP-specific index/ID values such as CORESETPoolIndex values or PCIs.

TABLE 1

| MAC CE activation command/bitmap for BFD RS beam sets | | | | |
|---|---|---|---|---|
| Entity index/ID value | #1 | #2 | ... | #M |

A conceptual example of such a MAC CE activation command/bitmap is presented in TABLE 1. As illustrated in TABLE 1, the entity index/ID value could correspond to the TRP-specific index/ID value such as CORESETPoolIndex value or PCI, or the index of at least one TRP-specific index/ID value such as CORESETPoolIndex value or PCI in the higher layer configured list/set/pool of TRP-specific index/ID values such as CORESETPoolIndex values or PCIs.

For instance, the UE could receive from the network M≥2 bitmaps each containing/comprising/indicating a TRP-specific index/ID value such as CORESETPoolIndex value or PCI. In addition, each of the M≥2 bitmaps could contain/comprise M_tot entries/bit positions with each entry/bit position in the bitmap corresponding to an entry in the RRC configured list/pool of M_tot candidate BFD RS beam sets.

If an entry/bit position in a bitmap is enabled, e.g., set to '1', the corresponding entry in the RRC configured list/pool of M_tot candidate BFD RS beam sets is activated as a BFD RS beam set. Each bitmap could contain/comprise at least one entry/bit position set to '1'. Hence, the M≥2 MAC CE activation commands/bitmaps could contain/comprise M≥2 entries/bit positions set to '1's, activating a list/pool of M≥2 BFD RS beam sets from the RRC configured list/pool of M_tot candidate BFD RS beam sets.

For the above discussed explicit configuration/activation of the BFD RS beam sets (and therefore, the corresponding BFD RS resources/beams configured therein), various means of associating the RRC configured and MAC CE(s)/bitmap(s) activated BFD RS beam sets and the TRPs, e.g., via the TRP-specific index/ID values such as CORESETPoolIndex values or PCIs are presented as follows.

For example, the first BFD RS beam set or the BFD RS beam set with the lowest BFD RS beam set index/ID value in the list/pool of RRC configured and MAC CE(s)/bitmap(s) activated M≥2 BFD RS beam sets is associated with/corresponds to the first TRP-specific index/ID value in a list/set/pool of higher layer configured TRP-specific index/ID values such as CORESETPoolIndex values or PCI values, the second BFD RS beam set or the BFD RS beam set with the second lowest BFD RS beam set index/ID value in the list/pool of RRC configured and MAC CE(s)/bitmap(s) activated M≥2 BFD RS beam sets is associated with/corresponds to the second TRP-specific index/ID value in a list/set/pool of higher layer configured TRP-specific index/ID values such as CORESETPoolIndex values or PCI values, and so on, and the last (M-th) BFD RS beam set or the BFD RS beam set with the highest BFD RS beam set index/ID value in the list/pool of RRC configured and MAC CE(s)/bitmap(s) activated M≥2 BFD RS beam sets is associated with/corresponds to the last TRP-specific index/ID value in a list/set/pool of higher layer configured TRP-specific index/ID values such as CORESETPoolIndex values or PCI values.

That is, the BFD RS beam set m or the m-th BFD RS beam set or the BFD RS beam set with the m-th lowest (or highest) BFD RS beam set ID value in the list/pool of RRC configured and MAC CE(s)/bitmap(s) activated M≥2 BFD RS beam sets shall be associated with/correspond to the m-th entry/TRP-specific index/ID value in the list/set/pool of higher layer configured TRP-specific index/ID values such as CORESETPoolIndex values or PCI values, where m=1, 2, . . . , M. For instance, for M=2, the BFD RS beam set m or the m-th BFD RS beam set or the BFD RS beam set with the m-th lowest (or highest) BFD RS beam set ID value in the list/pool of RRC configured and MAC CE(s)/bitmap(s) activated M=2 BFD RS beam sets shall be associated with/correspond to CORESETPoolIndex value m−1, where m=1, 2.

For another example, the first BFD RS beam set or the BFD RS beam set with the lowest BFD RS beam set index/ID value in the list/pool of RRC configured and MAC CE(s)/bitmap(s) activated M≥2 BFD RS beam sets is associated with/corresponds to the lowest TRP-specific index/ID value such as the lowest CORESETPoolIndex value or PCI value in the list/set/pool of higher layer configured TRP-specific index/ID values such as CORESETPoolIndex values or PCI values, the second BFD RS beam set or the BFD RS beam set with the second lowest BFD RS beam set index/ID value in the list/pool of network configured and MAC CE(s)/bitmap(s) activated M≥2 BFD RS beam sets is associated with/corresponds to the second lowest TRP-specific index/ID value such as the second lowest CORESETPoolIndex value or PCI value in the list/set/pool of higher layer configured TRP-specific index/ID values such as CORESETPoolIndex values or PCI values, and so on, and the last (M-th) BFD RS beam set or the BFD RS beam set with the highest BFD RS beam set index/ID value in the list/pool of network configured and MAC CE(s)/bitmap(s) activated M≥2 BFD RS beam sets is associated with/corresponds to the highest TRP-specific index/ID value such as the highest CORESETPoolIndex value or PCI value in the list/set/pool of higher layer configured TRP-specific index/ID values such as CORESETPoolIndex values or PCI values.

That is, the BFD RS beam set m or the m-th BFD RS beam set or the BFD RS beam set with the m-th lowest (or highest) BFD RS beam set ID value in the list/pool of RRC configured and MAC CE(s)/bitmap(s) activated M≥2 BFD RS beam sets shall be associated with/correspond to the m-th lowest (or highest) TRP-specific index/ID value in the list/set/pool of higher layer configured TRP-specific index/ID values such as CORESETPoolIndex values or PCI values, where m=1, 2, . . . , M. For instance, for M=2, the BFD RS beam set m or the m-th BFD RS beam set or the BFD RS beam set with the m-th lowest (or highest) BFD RS beam set ID value in the list/pool of RRC configured and MAC CE(s)/bitmap(s) activated M=2 BFD RS beam sets shall be associated with/correspond to CORESETPoolIndex value m−1, where m=1, 2.

Yet for another example, the UE could be explicitly indicated by the network the exact mapping between the M≥2 network configured and MAC CE(s)/bitmap(s) activated BFD RS beam sets and the TRP-specific index/ID values such as CORESETPoolIndex values or PCI values; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

Yet for another example, if the MAC CE activation command/bitmap contains/comprises/indicates a TRP-specific index/ID value such as CORESETPoolIndex value or PCI (as illustrated in FIG. 8A), the BFD RS beam set activated by the MAC CE activation command/bitmap shall be associated with/correspond to the TRP-specific index/ID value such as CORESETPoolIndex value or PCI.

For instance, for M=2, if the MAC CE activation command/bitmap contains/comprises/indicates CORESETPoolIndex value '0', the corresponding activated BFD RS beam set (and therefore, the BFD RS resources/beams configured therein) is associated with CORETPoolIndex value '0', and if the MAC CE activation command/bitmap contains/comprises/indicates CORESETPoolIndex value '1', the corresponding activated BFD RS beam set (and therefore, the BFD RS resources/beams configured therein) is associated with CORETPoolIndex value '1'.

If the received signal qualities of the BFD RSs in a (TRP-specific) BFD RS beam set are below a configured threshold for a given period of time, indicating that the hypothetical BLERs of the corresponding PDCCHs could be beyond an out-of-sync BLER threshold, the UE could perform/conduct the TRP-specific BFR or per TRP BFR or multi-TRP BFR.

To evaluate the received signal qualities of the BFD RS resources/beams from a configured (TRP-specific) BFD RS beam set, the UE could be indicated/configured by the network M≥2 beam failure detection (BFD) thresholds; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

For the example shown in FIG. 10, the UE could be configured by the network M=2 BFD thresholds Qout-1 and Qout-2 for comparing with the received signal qualities of the BFD RSs from the BFD RS beam sets q0-1 and q0-2, respectively. Note that Qout-1 could be the same as Qout-2. The UE could measure L1 beam metrics of the BFD RSs in q0-1 every X_1 ms, where X_1=max {minimal periodicity of the BFD RS resources/beams configured in q0-1, 2 ms}, and the BFD RSs in q0-2 every X_2 ms, where X_2=max {minimal periodicity of the BFD RS resources/beams configured in q0-2, 2 ms}. The L1 beam metric could be L1-RSRP, L1-RSRQ or L1-SINR.

The UE could then compare the L1 measurements with the configured BFD thresholds. For instance, the UE could compare the measured L1-RSRPs of one or more BFD RS resources/beams in q0-1 with Qout-1, and the measured L1-RSRPs of one or more BFD RS resources/beams in q0-2 with Qout-2. The UE could also maintain M≥2 separate BFI counters, each corresponding to a configured BFD RS beam set (e.g., q0-1 or q0-2 in FIG. 10). For example, if the measured L1-RSRPs of one or more BFD RSs in q0-1 are below Qout-1, the UE would increment the BFI count for the BFD RS beam set q0-1. Similarly, if the measured L1-RSRPs of one or more BFD RS resources/beams in q0-2 are below Qout-2, the UE would increment the BFI count for the BFD RS beam set q0-2.

The UE could also be indicated/configured by the network M≥2 (TRP-specific) maximum numbers of BFI count each corresponding to a configured BFD RS beam set, and M≥2 (TRP-specific) BFD timers each corresponding to a configured BFD RS beam set. For the example shown in FIG. 10, denote the M=2 maximum numbers of BFI count for the BFD RS beam sets q0-1 (TRP-1) and q0-2 (TRP-2) by maxBFIcount-1 and maxBFIcount-2, and the M=2 BFD timers for the BFD RS beam sets q0-1 (TRP-1) and q0-2 (TRP-2) by BFDtimer-1 and BFDtimer-2. The UE could declare a beam failure for the BFD RS beam set q0-2 (and therefore TRP-2) and indicate to the higher layers the BFD RS beam set index of q0-2, if the BFI count for the BFD RS beam set q0-2 (TRP-2) reaches maxBFIcount-2 before the expiration of BFDtimer-2. Otherwise, if BFDtimer-2 expires before the BFI count for the BFD RS beam set q0-2 satisfies maxBFIcount-2, the UE would not declare any beam failure for the BFD-RS beam set q0-2 (and therefore, TRP-2), and reset the BFI count for the BFD RS beam set q0-2.

The aforementioned beam failure detection criteria for the BFD RS beam set m (m=1, 2, . . . , M) can be summarized as follows: the physical layer in the UE could assess the radio link quality of the BFD RS beam set m and indicates the BFD RS beam set index m to the higher layers in the UE every X_m ms, if the hypothetical PDCCH BLER of all the BFD RS resources/beams in the BFD RS beam set m is higher than a threshold, where X_m is max {minimal periodicity of the BFD RS resources/beams in the BFD RS beam set m, 2 ms}.

If the UE has detected/declared beam failure for at least one BFD RS beam set in the list/pool of M≥2 BFD RS beam sets (i.e., the above discussed beam failure detection criteria for at least one BFD RS beam set in the list/pool of M≥2 BFD RS beam sets is achieved/met/satisfied), the UE could initiate/trigger the TRP-specific BFR or partial BFR or multi-TRP BFR by transmitting to the network a beam failure recovery request (BFRQ) along with any other necessary indications.

For example, after the UE has detected beam failure for a BFD RS beam set, e.g., the BFD RS beam set q0-2 (TRP-2) in FIG. 10, the UE could transmit a beam failure recovery indication (BFRI) to the working TRP, e.g., TRP-1 in FIG. 10, through dedicated uplink resource(s) associated with the working TRP. The BFRI indicates the working TRP that the beam failure has been detected for at least one configured BFD RS beam set other than the BFD RS beam set associated with the working TRP. Along with the BFRI, the UE could also transmit to the working TRP the failed TRP ID, e.g., in form of the failed BFD RS beam set index/ID value or CORESETPoolIndex value, and other necessary indications/measurements.

Figure 11A:
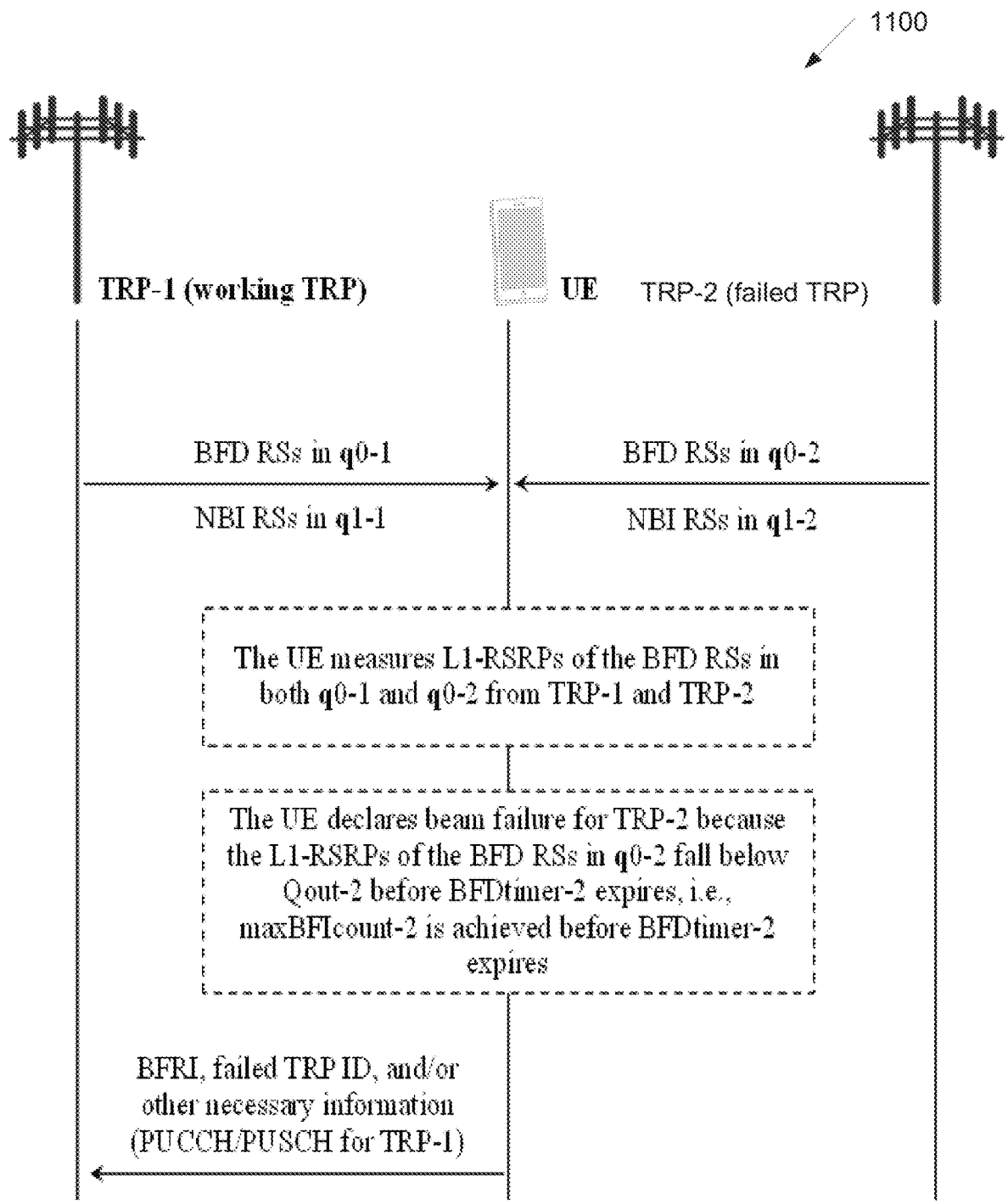
FIGS. 11A and 11B illustrate an example TRP-specific or per TRP or partial beam failure recovery procedure in a multi-TRP system according to embodiments of the present disclosure.
Figure 11B:
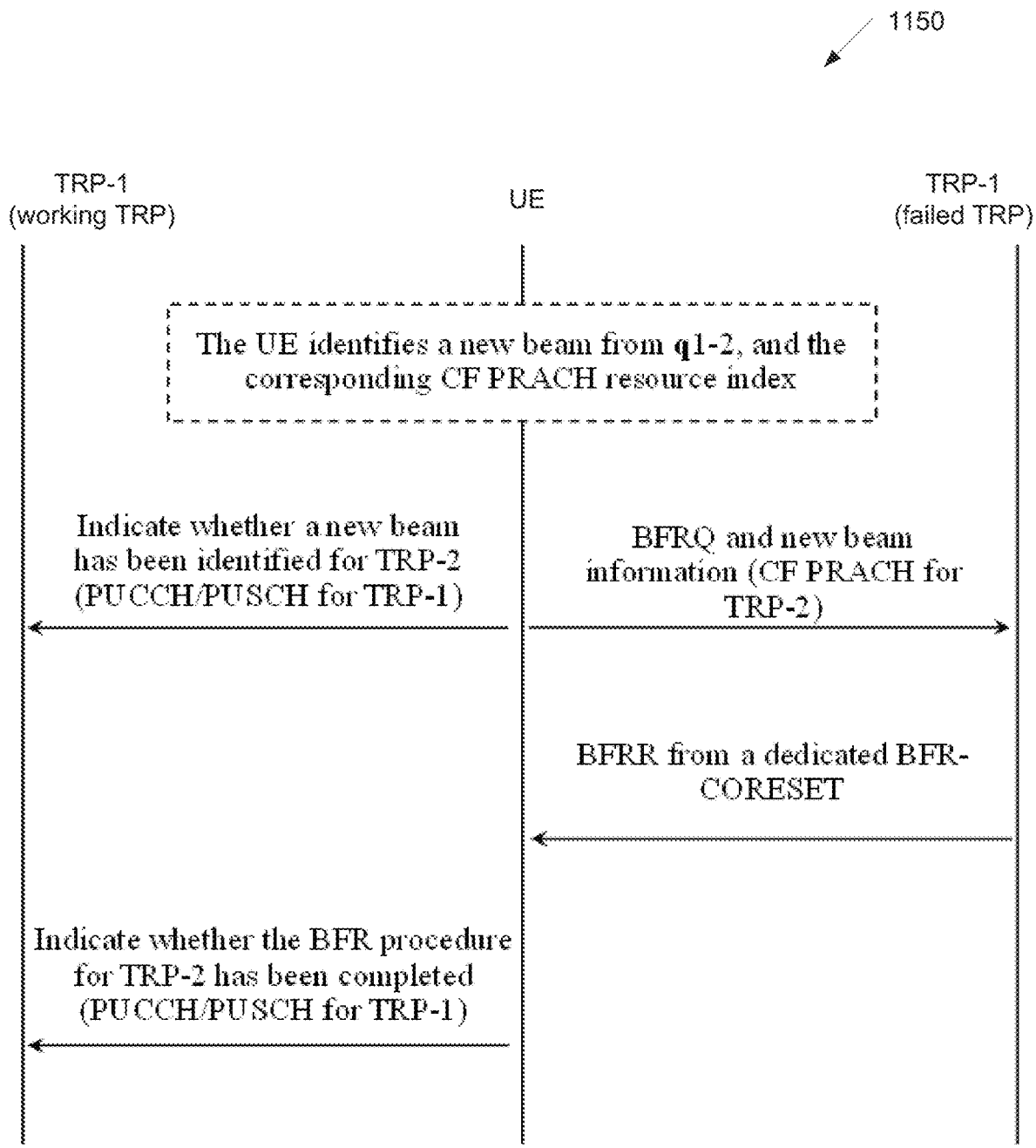

FIGS. 11A and 11B illustrate an example TRP-specific or per TRP or partial beam failure recovery procedure 1100 and 1150 in a multi-TRP system according to embodiments of the present disclosure. FIG. 11B is an example that is continued from FIG. 11A. Embodiments of the TRP-specific or per TRP or partial beam failure recovery procedure 1100 and 1150 shown in FIGS. 11A and 11B are for illustration only.

In the example shown in FIGS. 11A and 11B, the UE could multiplex the BFRI, failed TRP ID and other necessary information with the CSI report, HARQ/ACK, and/or other UCIs on the PUCCH(s) associated with the working TRP-1. The UE could also transmit the BFRI, failed TRP ID and other necessary information through one or more MAC CEs on the PUSCH(s) to the working TRP-1 assuming that there are available scheduled PUSCH resources.

As discussed above, the UE could also transmit to the network the BFRQ for the failed BFD RS beam set(s), or equivalently the failed TRP(s) (e.g., TRP-2 in FIG. 10). The transmission of BFRI to the working TRP(s) is an independent process to that of BFRQ/new beam information. Furthermore, the UE could transmit the BFRQ/new beam information to either the working TRP(s) or the failed TRP(s) through the dedicated uplink resource(s) associated with the working TRP(s) or the failed TRP(s) respectively.

To detect one or more new beams for the failed TRP/BFD RS beam set, the UE could be indicated by the network M≥2 NBI RS beam sets each containing/comprising at least one NBI RS resource/beam; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

Furthermore, the NBI RS resource(s)/beam(s) in a NBI RS beam set could be a set of SSB and/or CSI-RS resource(s)/beam(s). The M≥2 NBI RS beam sets could have one-to-one correspondence to the M≥2 BFD RS beam sets or the M≥2 TRPs in the multi-TRP system. For the example shown in FIG. 10, the NBI RS beam set denoted by q1-1 could be associated with TRP-1 (or the BFD RS beam set q0-1), and another NBI RS beam set denoted by q1-2 could be associated with TRP-2 (or the BFD RS beam set q0-2). Various means of associating the network configured NBI RS beam sets and the BFD RS beam sets are presented as follows.

For example, the first NBI RS beam set or the NBI RS beam set with the lowest NBI RS beam set index/ID value in the list/pool of network configured M≥2 NBI RS beam sets is associated with/corresponds to the first BFD RS beam set or the BFD RS beam set with the lowest BFD RS beam set index/ID value in the list/pool of network configured M≥2 BFD RS beam sets, the second NBI RS beam set or the NBI RS beam set with the second lowest NBI RS beam set index/ID value in the list/pool of network configured M≥2 NBI RS beam sets is associated with/corresponds to the second BFD RS beam set or the BFD RS beam set with the second lowest BFD RS beam set index/ID value in the list/pool of network configured M≥2 BFD RS beam sets, and so on, and the last (M-th) NBI RS beam set or the NBI RS beam set with the highest NBI RS beam set index/ID value in the list/pool of higher layer configured M≥2 NBI RS beam sets is associated with/corresponds to the last (M-th) BFD RS beam set or the BFD RS beam set with the highest BFD RS beam set index/ID value in the list/pool of network configured M≥2 BFD RS beam sets.

That is, the NBI RS beam set m or the m-th NBI RS beam set or the NBI RS beam set with the m-th lowest (or highest) NBI RS beam set ID value in the list/pool of configured M≥2 NBI RS beam sets shall be associated with/correspond to the BFD RS beam set m or the m-th BFD RS beam set or the BFD RS beam set with the m-th lowest (or highest) BFD RS beam set ID value in the list/pool of configured M≥2 BFD RS beam sets, where m=1, 2, ..., M.

For another example, the UE could be explicitly indicated by the network the exact mapping between the M≥2 NBI RS beam sets and the M≥2 BFD RS beam sets; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

Optionally, the UE could be first higher layer configured by the network (e.g., via higher layer RRC signaling) a list/pool of M_tot≥2 candidate NBI RS beam sets each containing/comprising at least one candidate NBI RS resource/beam. The UE could then receive from the network at least one MAC CE activation command/bitmap to activate M≥2 NBI RS beam sets from the higher layer configured list/pool of M_tot≥2 candidate NBI RS beam sets. This MAC CE activation command/bitmap could be the same as that (as shown in TABLE 1) used for activating the M≥2 BFD RS beam sets from the higher layer configured list/pool of M_tot≥2 candidate BFD RS beam sets.

In one example, the UE could receive from the network a single MAC CE activation command/bitmap to activate M≥2 NBI RS beam sets from the higher layer configured list/pool of M_tot≥2 candidate NBI RS beam sets. For instance, the bitmap could contain/comprise M_tot entries/bit positions with each entry/bit position in the bitmap corresponding to an entry in the RRC configured list/pool of M_tot candidate NBI RS beam sets.

If an entry/bit position in the bitmap is enabled, e.g., set to '1', the corresponding entry in the RRC configured list/pool of M_tot candidate NBI RS beam sets is activated as a NBI RS beam set. The bitmap could have M≥2 entries/bit positions set to '1's, hence activating a list/pool of M≥2 NBI RS beam sets from the RRC configured list/pool of M_tot candidate NBI RS beam sets.

In another example, the UE could receive from the network M≥2 MAC CE activation commands/bitmaps. Each MAC CE activation command/bitmap could activate at least one NBI RS beam set from the RRC configured list/pool of M_tot candidate NBI RS beam sets. For instance, the UE could receive from the network M≥2 bitmaps. Each of the M≥2 bitmaps could contain/comprise M_tot entries/bit positions with each entry/bit position in the bitmap corresponding to an entry in the RRC configured list/pool of M_tot candidate NBI RS beam sets.

If an entry/bit position in a bitmap is enabled, e.g., set to '1', the corresponding entry in the RRC configured list/pool of M_tot candidate NBI RS beam sets is activated as a NBI RS beam set. Each bitmap could contain/comprise at least one entry/bit position set to '1'. Hence, the M≥2 MAC CE activation commands/bitmaps could contain/comprise M≥2 entries/bit positions set to '1's, activating a list/pool of M≥2 NBI RS beam sets from the RRC configured list/pool of M_tot candidate NBI RS beam sets.

In yet another example, the UE could receive from the network M≥2 MAC CE activation commands/bitmaps. Each MAC CE activation command/bitmap could activate at least one NBI RS beam set from the RRC configured list/pool of M_tot candidate NBI RS beam sets. Furthermore, each MAC CE activation command/bitmap could contain/comprise/indicate at least one TRP-specific index/ID value such as CORESETPoolIndex value or PCI. Alternatively, each MAC CE activation command/bitmap could contain/comprise index of at least one TRP-specific index/ID value such as CORESETPoolIndex value or PCI in the higher layer configured list/set/pool of TRP-specific index/ID values such as CORESETPoolIndex values or PCIs. Optionally, each MAC CE activation command/bitmap could also contain/comprise at least one BFD RS beam set index/ID value.

As discussed above, the format of the MAC CE activation command/bitmap could be the same as that presented in TABLE 1. Here, the entity index/ID value shown in TABLE 1 could correspond to the TRP-specific index/ID value such as CORESETPoolIndex value or PCI, the index of at least one TRP-specific index/ID value such as CORESETPoolIndex value or PCI in the higher layer configured list/set/pool of TRP-specific index/ID values such as CORESETPoolIndex values or PCIs, or the BFD RS beam set index/ID value.

For instance, the UE could receive from the network M≥2 bitmaps each containing/comprising/indicating a BFD RS beam set index/ID value. In addition, each of the M≥2 bitmaps could contain/comprise M_tot entries/bit positions with each entry/bit position in the bitmap corresponding to an entry in the RRC configured list/pool of M_tot candidate NBI RS beam sets. If an entry/bit position in a bitmap is enabled, e.g., set to '1', the corresponding entry in the RRC configured list/pool of M_tot candidate NBI RS beam sets is activated as a NBI RS beam set. Each bitmap could contain/comprise at least one entry/bit position set to '1'. Hence, the M≥2 MAC CE activation commands/bitmaps could contain/ comprise M≥2 entries/bit positions set to '1's, activating a list/pool of M≥2 NBI RS beam sets from the RRC configured list/pool of M_tot candidate NBI RS beam sets.

For the above discussed explicit configuration/activation of the NBI RS beam sets (and therefore, the corresponding NBI RS resources/beams configured therein), various means of associating the RRC configured and MAC CE(s)/bitmap(s) activated NBI RS beam sets and the BFD RS beam sets are presented as follows.

For example, the first NBI RS beam set or the NBI RS beam set with the lowest NBI RS beam set index/ID value in the list/pool of RRC configured and MAC CE(s)/bitmap(s) activated M≥2 NBI RS beam sets is associated with/corresponds to the first BFD RS beam set or the BFD RS beam set with the lowest BFD RS beam set index/ID value in the list/pool of M≥2 BFD RS beam sets, the second NBI RS beam set or the NBI RS beam set with the second lowest NBI RS beam set index/ID value in the list/pool of RRC configured and MAC CE(s)/bitmap(s) activated M≥2 NBI RS beam sets is associated with/corresponds to the second BFD RS beam set or the BFD RS beam set with the second lowest BFD RS beam set index/ID value in the list/pool of M≥2 BFD RS beam sets, and so on, and the last (M-th) NBI RS beam set or the NBI RS beam set with the highest NBI RS beam set index/ID value in the list/pool of RRC configured and MAC CE(s)/bitmap(s) activated M≥2 NBI RS beam sets is associated with/corresponds to the last (M-th) BFD RS beam set or the BFD RS beam set with the highest BFD RS beam set index/ID value in the list/pool of M≥2 BFD RS beam sets.

That is, the NBI RS beam set m or the m-th NBI RS beam set or the NBI RS beam set with the m-th lowest (or highest) NBI RS beam set ID value in the list/pool of RRC configured and MAC CE(s)/bitmap(s) activated M≥2 NBI RS beam sets shall be associated with/correspond to the BFD RS beam set m or the m-th BFD RS beam set or the BFD RS beam set with the m-th lowest (or highest) BFD RS beam set ID value in the M≥2 BFD RS beam sets, where m=1, 2, ..., M.

For another example, the UE could be explicitly indicated by the network the exact mapping between the M≥2 network configured and MAC CE(s)/bitmap(s) activated NBI RS beam sets and the M≥2 BFD RS beam sets; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

Yet for another example, if the MAC CE activation command/bitmap contains/comprises/indicates a BFD RS beam set index/ID value, the NBI RS beam set activated by the MAC CE activation command/bitmap shall be associated with/correspond to the BFD RS beam set with the indicated BFD RS beam set index/ID value.

To facilitate the detection of the new beam(s), the UE could also be indicated by the network M≥2 (TRP-specific) beam failure recovery (BFR) thresholds. For the example shown in FIG. 10, the UE could be configured by the network M=2 BFR thresholds Qin-1 and Qin-2 for detecting potential new beam(s) for TRP-1 and/or TRP-2 (or the BFD RS beam sets q0-1 and/or q0-2), respectively. The UE could measure L1 beam metrics of the NBI RSs configured in q1-1 or q1-2 or both, depending on the failed TRP(s)/BFD RS beam set(s). The L1 beam metric could be L1-RSRP, L1-RSRQ or L1-SINR.

The UE could then compare the L1 measurements of one or more of the NBI RSs with the configured BFR threshold(s). For the example shown in FIG. 10 (the BFD RS beam set q0-2 or TRP-2 is failed), the UE could compare the measured L1-RSRPs of one or more NBI RSs in q1-2 with Qin-2. If the measured L1-RSRP of a NBI RS in q1-2 is beyond Qin-2, and is the largest among all the measured L1-RSRPs of the one or more NBI RSs in q1-2, the UE could identify/determine the resource/beam associated with the NBI RS as the new beam for the failed BFD RS beam set q0-2. Various means of computing/calculating the index of the selected NBI RS/beam are presented as follows.

In one example N.1, the (resource) index of the selected NBI RS or the new beam is determined based on/according to all the NBI RS resources/beams configured in the corresponding NBI RS beam set, from which the NBI RS or the new beam is selected. For instance, if the selected NBI RS or the new beam corresponds to the k-th entry/RS resource in NBI RS beam set m (m∈{1, 2, ..., M}) comprising a total of K(m) entries/RS resources, the (resource) index of the selected NBI RS or the new beam could then be computed/calculated as k∈{1, ..., K(m)}.

In another example N.2, the (resource) index of the selected NBI RS or the new beam is determined based on/according to all the NBI RS resources/beams configured in all M≥2 NBI RS beam sets. For instance, if the selected NBI RS or the new beam corresponds to the k-th entry/RS resource in NBI RS beam set m (m∈{1, 2, ..., M}) comprising a total of K(m) entries/resources, the (resource) index of the selected NBI RS or the new beam could then be computed/calculated as $\Sigma_{i=1}^{m-1} K(i)+k$ with k∈{1, ..., K(m)}.

The use of example N.1 or example N.2 to compute/calculate/determine the index of the selected NBI RS/beam could be: (1) fixed in the system specifications, e.g., using example N.1, (2) indicated/configured by the network, or (3) autonomously determined by the UE.

After identifying the new beam for the failed TRP/BFD RS beam set, the UE could transmit to the network the BFRQ or the new beam information for the failed TRP/BFD RS beam set. As illustrated in FIG. 11, the UE could transmit to the failed TRP-2 the BFRQ through a CF PRACH resource, whose resource index is associated with the newly identified beam. In addition, the UE could also indicate the working TRP-1 that "a new beam has been identified for the failed TRP-2/BFD RS beam set q0-2" through UCI multiplexing on the PUCCH and/or MAC CE on the PUSCH associated with TRP-1.

Four slots after the UE has transmitted the BFRQ to TRP-2, the UE could start to monitor a dedicated CORESET/search space transmitted from the failed TRP-2 for BFRQ response (BFRR). The dedicated CORESET is addressed to the UE-specific C-RNTI, and is transmitted with the newly identified beam. If the UE could detect a valid UE-specific DCI in the dedicated CORESET for BFRR, the UE would assume that the beam failure recovery request has been successfully received by the failed TRP, and the UE would complete the BFR process for TRP-2.

The UE could also be indicated by the network M≥2 (TRP-specific) BFR timers. For the example shown in FIG. 10, denote BFRtimer-1 and BFRtimer-2 as the M=2 BFR timers for TRP-1/BFD RS beam set q0-1 and TRP-2/BFD RS beam set q0-2, respectively. If the UE could not receive the BFRR or successfully identify a new beam before BFRtimer-2 expires, the UE would initiate a contention based (CB) random access (RA) process to reconnect to the network. As shown in FIG. 11, the UE could also indicate the working TRP-1 whether the UE has completed the BFR process with the failed TRP-2.

Alternatively, the UE could transmit the BFRQ to the network in form of a scheduling request (SR) over the PUCCH associated with either the working TRP(s) or the failed TRP(s). The UE could be indicated by the network an uplink grant in response to the BFRQ SR, which would allocate necessary resources for at least one MAC CE for BFR. The BFR MAC CE(s) from the UE could include/contain/comprise at least one of the following.

The new beam information/index for the failed TRP(s)/BFD RS beam set(s) (if identified); for instance, if identified, the new beam index could be the index of the selected NBI RS resource/beam in the NBI RS beam set associated with the failed BFD RS beam set; the index of the selected NBI RS resource/beam could be computed/calculated/determined according to the aforementioned design example N.1 or example N.2; furthermore, the index of the selected NBI RS resource/beam could be a resource indicator such as a SSB RI or a CRI depending on the resource type(s) in the NBI RS beam set associated with the failed BFD RS beam set.

The failed TRP ID; for instance, the failed TRP ID could be in form of the corresponding BFD RS beam set index/ID value; alternatively, the failed TRP ID could be the corresponding CORESETPoolIndex or PCI value.

An indicator to indicate whether at least a new beam has been identified for the failed TRP(s)/BFD RS beam set(s); for instance, a one-bit indicator could be used with '1' indicating that at least one new beam has been identified for the failed TRP(s)/BFD RS beam set(s) and '0' indicating otherwise.

If the index of the selected NBI RS resource/beam is computed/calculated/determined according to the aforementioned design example N.2, the BFR MAC CE(s) from the UE could also include/contain/comprise the index/ID value of the NBI RS beam set, from which the NBI RS resource or the new beam is selected. For instance, if the NBI RS or the new beam is selected from NBI RS beam set m∈{1, 2, . . . , M}, the NBI RS beam set index/ID m is reported in the BFR MAC CE(s). If the index of the selected NBI RS resource/beam is computed/calculated/determined according to the aforementioned design example N.2 and the index/ID value of the NBI RS beam set, from which the NBI RS or the new beam is selected, is not reported or absent in the BFR MAC CE(s), the UE could indicate to the network the association/mapping between the reported indices of the selected NBI RS(s)/new beam(s) and the reported failed TRP IDs (e.g., in form of failed BFD RS beam set indices or CORESETPoolIndex values).

Furthermore, if the number of reported indices of the selected NBI RS(s)/new beams and the number of reported failed TRP IDs (e.g., in form of failed BFD RS beam set indices or CORESETPoolIndex values) are not equal, the UE could also indicate to the network the association/mapping between the reported indices of the selected NBI RS(s)/new beam(s) and the reported failed TRP IDs (e.g., in form of failed BFD RS beam set indices or CORESETPoolIndex values).

Optionally, the UE could be configured by the network more than one MAC CEs for BFR (e.g., M≥2 BFR MAC CEs). Various means of associating the M≥2 BFD RS beam sets and the M≥2 BFR MAC CEs are presented as follows. Each BFR MAC CE could contain/include/comprise an entity ID.

In one example, the first configured BFR MAC CE or the BFR MAC CE with the lowest entity ID value could correspond to the first BFD RS beam set in the list/pool of M≥2 BFD RS beam sets, the second configured BFR MAC CE or the BFR MAC CE with the second lowest entity ID value could correspond to the second BFD RS beam set in the list/pool of M≥2 BFD RS beam sets, and so on, and the last (M-th) configured BFR MAC CE or the BFR MAC CE with the highest entity ID value could correspond to the last (M-th) BFD RS beam set in the list/pool of M≥2 BFD RS beam sets.

That is, the m-th configured MAC CE for BFR, or the BFR MAC CE with the m-th lowest (or highest) entity ID value could correspond to the m-th BFD RS beam set or BFD RS beam set m in the list/pool of M≥2 BFD RS beam sets.

In another example, the first configured BFR MAC CE or the BFR MAC CE with the lowest entity ID value could correspond to the BFD RS beam set with the lowest BFD RS beam set ID value in the list/pool of M≥2 BFD RS beam sets, the second configured BFR MAC CE or the BFR MAC CE with the second lowest entity ID value could correspond to the BFD RS beam set with the second lowest BFD RS beam set ID value in the list/pool of M≥2 BFD RS beam sets, and so on, and the last (M-th) configured BFR MAC CE or the BFR MAC CE with the highest entity ID value could correspond to the BFD RS beam set with the highest BFD RS beam set ID value in the list/pool of M≥2 BFD RS beam sets.

That is, the m-th BFR MAC CE, or the BFR MAC CE with the m-th lowest (or highest) entity ID value could correspond to the BFD RS beam set with the m-th lowest (or highest) BFD RS beam set ID value in the list/pool of M≥2 BFD RS beam sets.

In yet another example, the UE could be explicitly indicated by the network the exact mapping between the M≥2 BFD RS beam sets and the M≥2 BFR MAC CEs; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

In yet another example, the entity ID contained/comprised in a BFR MAC CE could correspond to a TRP-specific index/ID value such as CORESETPoolIndex value or PCI. Alternatively, the entity ID contained/comprised in a BFR MAC CE could correspond to a BFD RS beam set index/ID value. That is, a BFR MAC CE is associated with a BFD RS beam set if they are associated with the same TRP-specific index/ID value such as CORESETPoolIndex value or PCI or the same BFD RS beam set index/ID value.

In addition, the UE could also indicate to the working TRP(s)—e.g., via MAC CE over one or more PUSCHs scheduled for the working TRP(s)—at least one of the following: the new beam information/index for the failed TRP/BFD RS beam set, the failed TRP ID in form of the failed BFD RS beam set index/ID value or other necessary information. After transmitting the MAC CE for BFR to the network, the UE could start to monitor the BFRR. The BFRR could be a TCI state indication for a PDCCH transmitted from a CORESET associated with the failed BFD RS beam set. As discussed above, a CORESET and a BFD RS beam set could be associated via the CORESETPoolIndex value. The BFRR to the MAC CE for BFR could also be a normal uplink grant for scheduling a new transmission for the same HARQ process as the PUSCH carrying the MAC CE for BFR.

As discussed above, the UE could send to the network multiple (more than one) BFR MAC CEs each corresponding to a failed BFD RS beam set. In addition, for the multi-TRP BFR, the UE could also indicate to the network multiple (more than one) new beam indices or multiple (more than one) failed BFD RS beam set indices/IDs. Hence, the UE could receive from the network a single BFRR for all the (failed) BFD RS beam sets.

For example, the BFRR could be a dedicated CORESET/search space addressed to the UE-specific C-RNTI, and transmitted using the newly identified beam. For another example, the BFRR could be a TCI state indication for a PDCCH transmitted from a CORESET associated with a failed BFD RS beam set. For another example, the BFRR could be an uplink grant for scheduling a new transmission for the same HARQ process (e.g., with the same HARQ process ID) as the PUSCH carrying the MAC CE for the multi-TRP BFR.

Alternatively, the UE could receive from the network multiple (more than one) BFRRs each for a (failed) BFD RS beam set. For example, the BFRR for the (failed) BFD RS beam set m could be a dedicated CORESET/search space associated with the BFD RS beam set m (e.g., via the association between the CORESETPoolIndex values and the BFD RS beam sets discussed above) addressed to the UE-specific C-RNTI, and transmitted using the newly identified beam, where m∈{1, 2, ..., M}. For another example, the BFRR for the (failed) BFD RS beam set m could be a TCI state indication for a PDCCH transmitted from a CORESET associated with the BFD RS beam set m (e.g., via the association between the CORESETPoolIndex values and the BFD RS beam sets discussed above), where m∈{1, 2, ..., M}. Yet for another example, the BFRR for the (failed) BFD RS beam set m could be an uplink grant for scheduling a new transmission for the same HARQ process (e.g., with the same HARQ process ID) as the PUSCH associated with the BFD RS beam set m carrying the MAC CE for the BFD RS beam set m, where m∈{1, 2, ..., M}. The association between a PUSCH and a BFD RS beam set could be via the association between the CORESET/PDCCH scheduling the PUSCH and the BFD RS beam set (e.g., via the association between the CORESETPoolIndex values and the BFD RS beam sets discussed above).

The use of a single BFRR for all the (failed) BFD RS beam sets or multiple (more than one) BFRRs each for a (failed) BFD RS beam set could be: (1) fixed in the system specifications, e.g., using a single BFRR for all the (failed) BFD RS beam sets, (2) indicated/configured by the network, or (3) autonomously determined by the UE.

If the UE could receive the BFRR(s) before BFR timer expires, the UE could consider the BFR procedure for the failed TRP(s) is successfully completed. Otherwise, if the UE could not receive the BFRR(s) before the corresponding BFR timer expires, the UE could transmit the BFRQ again via the PUCCH associated with either the failed TRP(s) or the working TRP(s), or fall back to the CBRA process. In addition to not receiving the BFRR(s) before the corresponding BFR timer expires, the CBRA could also be triggered according to at least one of the following.

In one example, the CBRA is triggered/initiated if at least two BFD RS beam sets are failed within a time window, i.e., the maximum number of BFI count is achieved for each of the at least two BFD RS beam sets within a time window. The time window could be: (1) fixed in the system specifications, (2) configured/indicated by the network, or (3) autonomously determined by the UE.

In another example, the CBRA is triggered/initiated if at least one BFD RS beam set is failed, i.e., the maximum number of BFI count is achieved for the at least one BFD RS beam set, and the UE is not configured by the network any SR-PUCCH for/to transmit the BFRQ for the failed BFD RS beam set.

In yet another example, the CBRA is triggered/initiated if at least one BFD RS beam set is failed, i.e., the maximum number of BFI count is achieved for the at least one BFD RS beam set, and the UE does not receive from the network any uplink grant to the SR-PUCCH for BFRQ before the corresponding BFR timer associated with the failed BFD RS beam set expires.

In yet another example, the CBRA is triggered/initiated if at least one specific/predefined BFD RS beam set is failed, i.e., the maximum number of BFI count is achieved for the at least one specific/predefined BFD RS beam set. For example, the specified/predefined BFD RS beam set(s) or the index(s)/ID(s) of the specific/predefined BFD RS beam set(s) is fixed in the system specifications. E.g., the index/ID of the specific/predefined BFD RS beam set shall be 1. For another example, the specified/predefined BFD RS beam set(s) or the index(s)/ID(s) of the specific/predefined BFD RS beam set(s) shall be indicated by the network; this indication could be via higher layer (RRC) or/and MAC CE or/and DCI based signaling or/and any combination of at least two of RRC, MAC CE and DCI based signaling; this indication could be via a separate (dedicated) parameter or joint with another parameter. Yet for another example, the UE could autonomously determine the specified/predefined BFD RS beam set(s) or the index(s)/ID(s) of the specific/predefined BFD RS beam set(s).

The UE could be indicated by the network a list/set/pool of M≥2 BFR parameters, with the m-th entry/BFR parameter in the list/set/pool of BFR parameters denoted as BFR parameter-m with m=1, 2, ..., M. In the present disclosure, the BFR parameter-m could correspond to Qout-m (BFD threshold), BFDtimer-m (BFD timer), Qin-m (BFR threshold), BFRtimer-m (BFR timer), maxBFIcount-m (maximum number of BFI count) or NBI RS beam set m. There could be various means to associate the M≥2 BFD RS beam sets and the M≥2 BFR parameters parameter-m's, and the M≥2 BFD RS beam sets and the M≥2 BFR parameters could have one-to-one correspondence. Here, the M≥2 BFD RS beam sets could be configured by RRC or configured by RRC and activated by MAC CE(s)/bitmap(s).

In one example, the first entry/BFR parameter or the BFR parameter with the lowest BFR parameter index/ID value in the list/set/pool of BFR parameters could correspond to the first BFD RS beam set in the list/pool of M≥2 BFD RS beam sets, the second entry/BFR parameter or the BFR parameter with the second lowest BFR parameter index/ID value in the list/set/pool of BFR parameters could correspond to the second BFD RS beam set in the list/pool of M≥2 BFD RS beam sets, and so on, and the last (M-th) entry/BFR parameter or the BFR parameter with the highest BFR parameter index/ID value in the list/set/pool of BFR parameters could correspond to the last (M-th) BFD RS beam set in the list/pool of M≥2 BFD RS beam sets.

That is, the m-th entry/BFR parameter, i.e., BFR parameter-m, or the BFR parameter with the m-th lowest (or highest) BFR parameter index/ID value in the list/set/pool of M≥2 BFR parameters could correspond to the m-th BFD RS beam set or BFD RS beam set m in the list/pool of M≥2 BFD RS beam sets.

In another example, the first entry/BFR parameter or the BFR parameter with the lowest BFR parameter index/ID value in the list/set/pool of BFR parameters could correspond to the BFD RS beam set with the lowest BFD RS beam set ID value in the list/pool of M≥2 BFD RS beam sets, the second entry/BFR parameter or the BFR parameter with the second lowest BFR parameter index/ID value in the list/set/pool of BFR parameters could correspond to the BFD RS beam set with the second lowest BFD RS beam set ID value in the list/pool of M≥2 BFD RS beam sets, and so on, and the last (M-th) entry/BFR parameter or the BFR parameter with the highest BFR parameter index/ID value in the list/set/pool of BFR parameters could correspond to the BFD RS beam set with the highest BFD RS beam set ID value in the list/pool of M≥2 BFD RS beam sets.

That is, the m-th entry/BFR parameter, i.e., BFR parameter-m, or the BFR parameter with the m-th lowest (or highest) BFR parameter index/ID value in the list/set/pool of M≥2 BFR parameters could correspond to the BFD RS beam set with the m-th lowest (or highest) BFD RS beam set ID value in the list/pool of M≥2 BFD RS beam sets.

In yet another example, the UE could be explicitly indicated by the network the exact mapping between the M≥2 BFD RS beam sets and the M≥2 BFR parameters; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

Alternatively, the UE could be first configured by the network (e.g., via higher layer RRC signaling) a list/set/pool of M_tot candidate BFR parameters. The UE could then receive from the network at least one MAC CE activation command/bitmap to activate M≥2 BFR parameters from the higher layer configured list/pool of M_tot≥2 candidate BFR parameters.

In one example, the UE could receive from the network a single MAC CE activation command/bitmap to activate M≥2 BFR parameters from the higher layer configured list/pool of M_tot≥2 candidate BFR parameters. For instance, the bitmap could contain/comprise M_tot entries/bit positions with each entry/bit position in the bitmap corresponding to an entry in the RRC configured list/pool of M_tot candidate BFR parameters.

If an entry/bit position in the bitmap is enabled, e.g., set to '1', the corresponding entry in the RRC configured list/pool of M_tot candidate BFR parameters is activated as a BFR parameter. The bitmap could have M≥2 entries/bit positions set to '1's, hence activating a list/pool of M≥2 BFR parameters from the RRC configured list/pool of M_tot candidate BFR parameters.

In another example, the UE could receive from the network M≥2 MAC CE activation commands/bitmaps. Each MAC CE activation command/bitmap could activate at least one BFR parameter from the RRC configured list/pool of M_tot candidate BFR parameters. For instance, the UE could receive from the network M≥2 bitmaps. Each of the M≥2 bitmaps could contain/comprise M_tot entries/bit positions with each entry/bit position in the bitmap corresponding to an entry in the RRC configured list/pool of M_tot candidate BFR parameters.

If an entry/bit position in a bitmap is enabled, e.g., set to '1', the corresponding entry in the RRC configured list/pool of M_tot candidate BFR parameters is activated as a BFR parameter. Each bitmap could contain/comprise at least one entry/bit position set to '1'. Hence, the M≥2 MAC CE activation commands/bitmaps could contain/comprise M≥2 entries/bit positions set to '1's, activating a list/pool of M≥2 BFR parameters from the RRC configured list/pool of M_tot candidate BFR parameters.

In yet another example, the UE could receive from the network M≥2 MAC CE activation commands/bitmaps. Each MAC CE activation command/bitmap could activate at least one BFR parameter from the RRC configured list/pool of M_tot candidate BFR parameters. Furthermore, each MAC CE activation command/bitmap could contain/comprise/indicate at least one TRP-specific index/ID value such as CORESETPoolIndex value or PCI. Alternatively, each MAC CE activation command/bitmap could contain/comprise index of at least one TRP-specific index/ID value such as CORESETPoolIndex value or PCI in the higher layer configured list/set/pool of TRP-specific index/ID values such as CORESETPoolIndex values or PCIs. Optionally, each MAC CE activation command/bitmap could contain/comprise a BFD RS beam set index/ID value.

A conceptual example of such a MAC CE activation command/bitmap is presented in TABLE 1. As illustrated in TABLE 1, the entity index/ID value could correspond to the TRP-specific index/ID value such as CORESETPoolIndex value or PCI, the index of at least one TRP-specific index/ID value such as CORESETPoolIndex value or PCI in the higher layer configured list/set/pool of TRP-specific index/ID values such as CORESETPoolIndex values or PCIs, or the BFD RS beam set index/ID value.

There could be various means to associate the M≥2 BFD RS beam sets and the M≥2 RRC configured and MAC CE(s)/bitmap(s) activated BFR parameters parameter-m's, and the M≥2 BFD RS beam sets and the M≥2 RRC configured and MAC CE(s)/bitmap(s) activated BFR parameters have one-to-one correspondence. Here, the M≥2 BFD RS beam sets could be configured by RRC or configured by RRC and activated by MAC CE(s)/bitmap(s).

In one example, the first entry/BFR parameter or the BFR parameter with the lowest BFR parameter index/ID value in the list/set/pool of RRC configured and MAC CE(s)/bitmap(s) activated BRF parameters could correspond to the first BFD RS beam set in the list/pool of M≥2 BFD RS beam sets, the second entry/BFR parameter or the BFR parameter with the second lowest parameter index/ID value in the list/set/pool of RRC configured and MAC CE(s)/bitmap(s) activated BFR parameters could correspond to the second BFD RS beam set in the list/pool of M≥2 BFD RS beam sets, and so on, and the last (M-th) entry/BFR parameter or the BFR parameter with the highest BFR parameter index/ID value in the list/set/pool of RRC configured and MAC CE(s)/bitmap(s) activated BFR parameters could correspond to the last (M-th) BFD RS beam set in the list/pool of M≥2 BFD RS beam sets.

That is, the m-th entry/BFR parameter, i.e., BFR parameter-m, or the BFR parameter with the m-th lowest (or highest) parameter index/ID value in the list/set/pool of M≥2 RRC configured and MAC CE(s)/bitmap(s) activated BFR parameters could correspond to the m-th BFD RS beam set or BFD RS beam set m in the list/pool of M≥2 BFD RS beam sets.

In another example, the first entry/BFR parameter or the BFR parameter with the lowest BFR parameter index/ID value in the list/set/pool of RRC configured and MAC CE(s)/bitmap(s) activated BFR parameters could correspond to the BFD RS beam set with the lowest BFD RS beam set ID value in the list/pool of M≥2 BFD RS beam sets, the second entry/BFR parameter or the BFR parameter with the second lowest BFR parameter index/ID value in the list/set/pool of RRC configured and MAC CE(s)/bitmap(s) activated BFR parameters could correspond to the BFD RS beam set with the second lowest BFD RS beam set ID value in the list/pool of M≥2 BFD RS beam sets, and so on, and the last (M-th) entry/BFR parameter or the BFR parameter with the highest BFR parameter index/ID value in the list/set/pool of RRC configured and MAC CE(s)/bitmap(s) activated BFR parameters could correspond to the BFD RS beam set with the highest BFD RS beam set ID value in the list/pool of M≥2 BFD RS beam sets.

That is, the m-th entry/BFR parameter, i.e., BFR parameter-m, or the BFR parameter with the m-th lowest (or highest) BFR parameter index/ID value in the list/set/pool of M≥2 RRC configured and MAC CE(s)/bitmap(s) activated BFR parameters could correspond to the BFD RS beam set with the m-th lowest (or highest) BFD RS beam set ID value in the list/pool of M≥2 BFD RS beam sets.

In yet another example, the UE could be explicitly indicated by the network the exact mapping between the M≥2 BFD RS beam sets and the M≥2 RRC configured and MAC CE(s)/bitmap(s) activated BFR parameters; this indication could be via higher layer (RRC) or/and MAC CE or/and DCI based signaling or/and any combination of at least two of RRC, MAC CE and DCI based signaling; this indication could be via a separate (dedicated) parameter or joint with another parameter.

Figure 12:
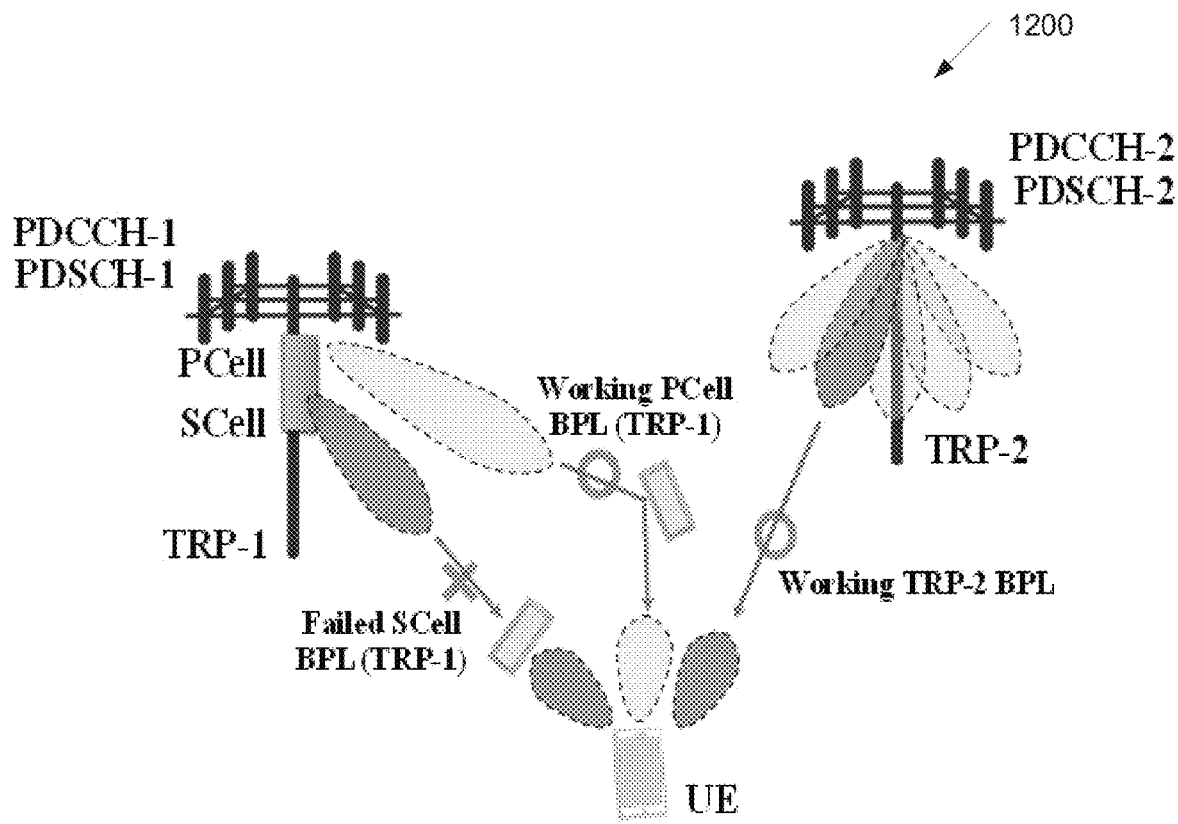
FIG. 12 illustrates another example TRP-specific or per TRP or partial beam failure in a multi-PDCCH or multi-DCI based multi-TRP system according to embodiments of the present disclosure.

FIG. 12 illustrates another example TRP-specific or per TRP or partial beam failure in a multi-PDCCH or multi-DCI based multi-TRP system 1200 according to embodiments of the present disclosure. An embodiment of the TRP-specific or per TRP or partial beam failure in a multi-PDCCH or multi-DCI based multi-TRP system 1200 shown in FIG. 12 is for illustration only.

In FIG. 12, an illustrative example of a multi-DCI/PDCCH based multi-TRP system is presented under a carrier aggregation (CA) framework. As can be seen from FIG. 12, both PCell and SCell are deployed at TRP-1, and the UE could declare beam failure for TRP-1 SCell. Different from the examples shown in FIG. 10 and FIG. 11, the UE in FIG. 12 could still communicate with TRP-1 through its PCell, and initiate/complete the BFR procedure for TRP-1 SCell.

Furthermore, as shown in FIG. 12, the UE could still communicate with TRP-2, and indicate TRP-2 necessary beam failure recovery status/information of TRP-1 SCell. Similar to those provided in FIG. 10, the TRP-specific configurations are also given in FIG. 12 for both TRP-1 and TRP-2. Different from those given in FIG. 10, TRP-1 in FIG. 12 has two sets of TRP-specific configurations. One corresponds to TRP-1 PCell and the other corresponds to TRP-1 SCell.

Figure 13A:
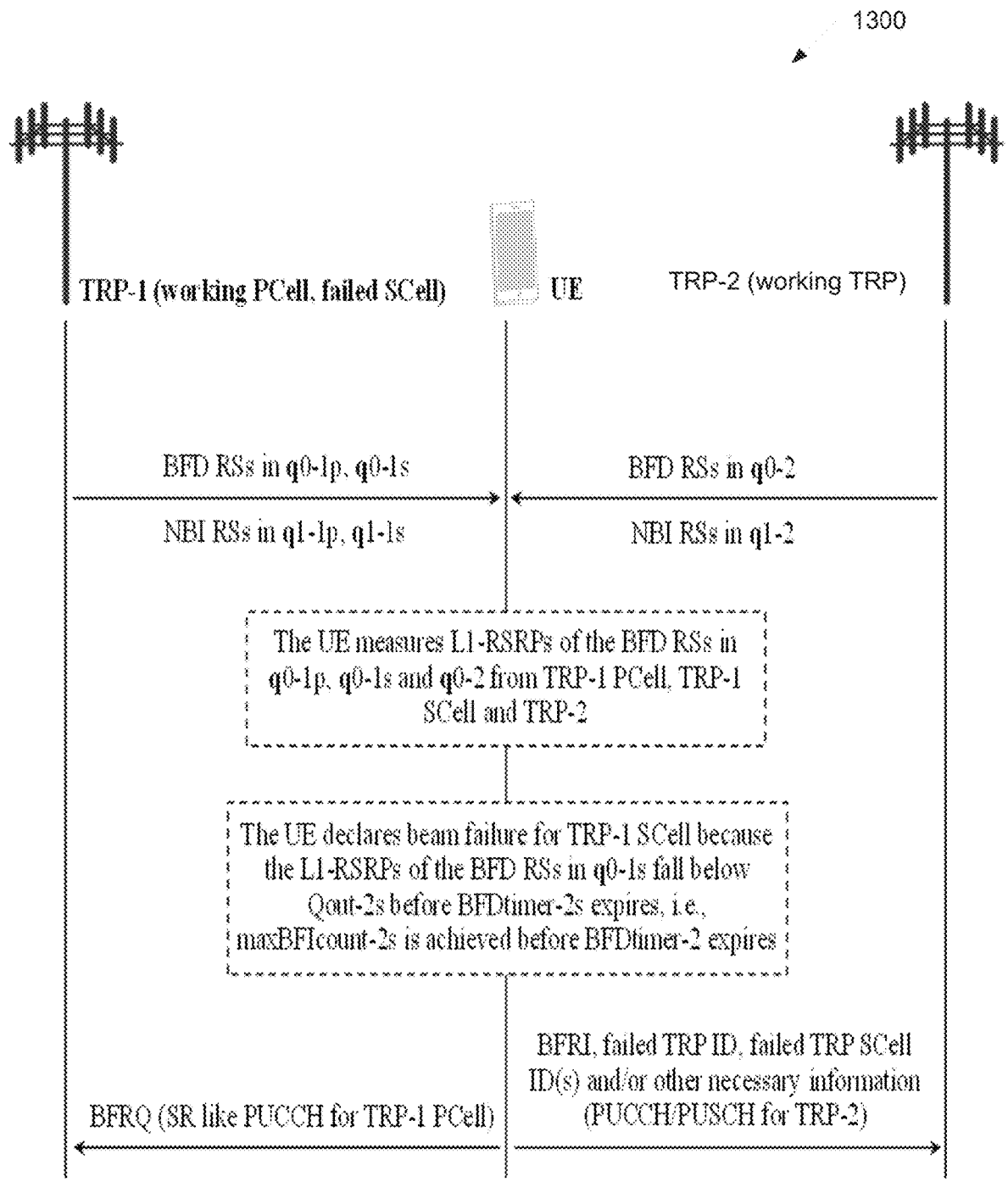
FIGS. 13A and 13B illustrate an example TRP-specific or per TRP or partial beam failure recovery procedure in a multi-TRP system according to embodiments of the present disclosure.
Figure 13B:
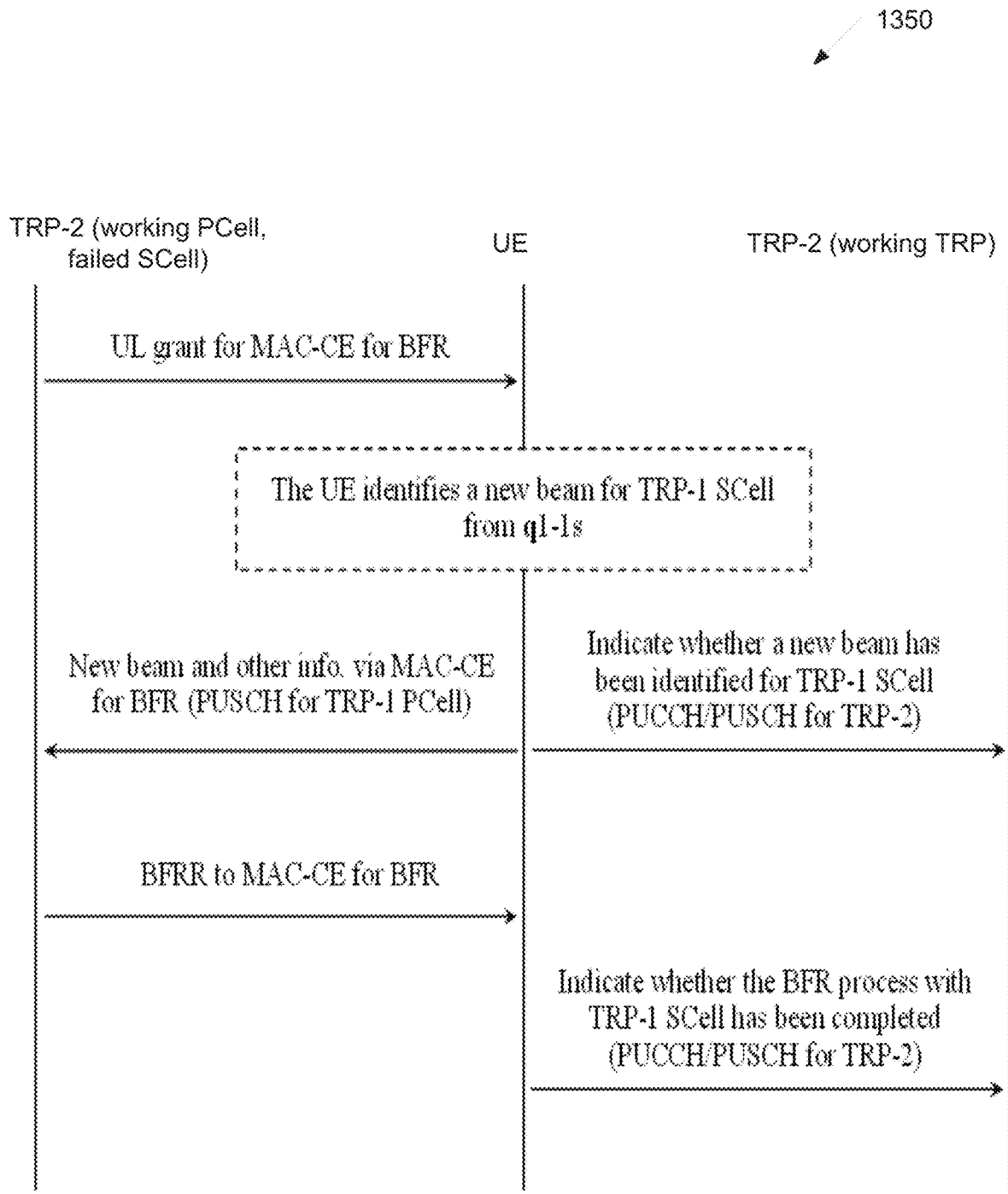

FIGS. 13A and 13B illustrate an example TRP-specific or per TRP or partial beam failure recovery procedure 1300 and 1350 in a multi-TRP system according to embodiments of the present disclosure. FIG. 13B is an example that is continued from FIG. 13A. An embodiment of the TRP-specific or per TRP or partial beam failure recovery procedure 1300 and 1350 shown in FIGS. 13A and 13B are for illustration only.

In FIGS. 13A and 13B, the BFR procedure for TRP-1 SCell in the multi-DCI/PDCCH based multi-TRP system in FIG. 12 is illustrated. Similar to the BFR procedure illustrated in FIGS. 11A and 11B, the UE in FIGS. 13A and 13B could also indicate to the working TRP, i.e., TRP-2 in this example, the necessary BFR status/information of the failed TRP-1 SCell so that the working TRP-1 could adjust its DL transmissions to the UE accordingly. In contrast to the BFR procedure for the failed TRP shown in FIGS. 13A and 13B, the UE in FIGS. 11A and 11B would use different signaling mediums to initiate and complete a different BFR procedure for the failed TRP SCell through the same TRP PCell.

As can be seen from FIGS. 13A and 13B, after declaring/detecting the beam failure for the TRP-1 SCell, the UE would transmit the BFRQ as a SR over the PUCCH associated with the working TRP-1 PCell. At this stage, the UE would only transmit the BFRQ without incorporating any new beam information and/or failed SCell index. This is different from the design example shown in FIGS. 11A and 11B, in which the UE would send both the BFRQ and the new beam information to the failed TRP through the CF BFR-PRACH.

The UE could be indicated by TRP-1 PCell an uplink grant in response to the BFRQ SR, which would allocate necessary resources for the MAC CE to carry the new beam index for the failed TRP-1 SCell (if identified), failed SCell index (or index of the component carrier (CC) that contains the failed TRP/BFD RS beam set) and other necessary information. To identify one or more new beams for the failed TRP-1 SCell, the UE would compare the L1-RSRPs of all the NBI RSs in q1-1s with Qin-1s. If the L1-RSRP of a particular NBI RS in q1-1s is beyond Qin-1s and is the largest among those of all the NBI RSs in q1-1s, the UE would identify the beam associated with the particular NBI RS as the new beam for the failed TRP-1 SCell. The UE could then indicate to TRP-1 PCell about the newly identified beam, the failed SCell index and other necessary information through the MAC CE signaling over the scheduled PUSCH for TRP-1 PCell.

After transmitting the MAC CE for BFR to TRP-1 PCell, the UE would start to monitor the BFRR. The BFRR could be a TCI state indication for a CORESET for TRP-1 SCell. The BFRR to the MAC CE for BFR could also be a normal uplink grant for scheduling a new transmission for the same HARQ process as the PUSCH carrying the MAC CE for BFR. If the UE could receive the BFRR before BFRtimer-1s expires, the UE would consider the BFR procedure for the failed TRP-1 SCell is successfully completed. Otherwise, if the UE could not receive the BFRR before the timer BFRtimer-1s expires, the UE could transmit the BFRQ again via the PUCCH for TRP-1 PCell or fall back to the CBRA process.

During the entire BFR procedure for the failed TRP-1 SCell, the UE could also indicate to the working TRP-2 the status and/or configurations of the BFR for the failed TRP-1 SCell. As can be seen from FIGS. 13A and 13B, the UE could indicate to the working TRP-2 (via the BFRI) that the UE has declared beam failure for the TRP-1 SCell. The UE could also send the failed TRP ID in form of the failed BFD RS beam set index/ID value and failed TRP SCell index in form of the index of the CC containing the failed TRP SCell to the working TRP through its associated PUCCH and/or PUSCH. Further, the UE could also indicate to the working TRP-2 whether the UE has identified a new beam for the failed TRP-1 SCell and/or whether the UE has successfully completed the BFR procedure for the failed TRP-1 SCell.

According to the above information, the working TRP-2 could adjust/optimize the resource allocations for the UE to compensate for the gain loss during their BFR procedure for the failed TRP-1 SCell. Note that the UE could send additional indications to those described in FIGURE S 13A and 13B to the working TRP-2 through its associated PUCCH and/or PUSCH if necessary.

Various other beam failure events for the multi-DCI/PDCCH based multi-TRP system than those exhibited in FIG. 10, FIGS. 11A and 11B, FIG. 12, and FIGS. 13A and 13B are also possible. In the following, four additional beam failure events for the multi-DCI/PDCCH based multi-TRP system are discussed.

In one example of non-CA framework (the same TRPs setting as that in FIG. 10), it may be assumed that the UE has declared beam failure for both TRP-1 and TRP-2, the UE would independently perform the BFR procedures for both TRP-1 and TRP-2 following the BFR procedure for TRP-2 in FIGS. 11A and 11B, different from FIGS. 11A and 11B, the UE would not share the BFR status for one coordinating TRP, e.g., TRP-1, with the other coordinating TRP, e.g., TRP-2, because now both of them are failed TRPs.

In one example of CA framework (the same TRPs setting as that in FIG. 10), it may be assumed that the UE has declared beam failure for both TRP-1 SCell and TRP-2, the UE would perform the same BFR procedure for TRP-1 SCell as that for TRP-1 SCell in FIGS. 13A and 13B; the UE would perform the same BFR procedure for TRP-2 as that for TRP-2 in FIGS. 11A and 11B; in addition, the UE could also indicate to TRP-1 PCell about the BFR status for TRP-2 such as whether the UE has identified a new beam for TRP-2 and etc.; different from FIGS. 13A and 13B, the UE would not indicate to TRP-2 about the BFR status for TRP-1 SCell because now, TRP-2 is also a failed TRP.

In one example of CA framework (the same TRPs setting as that in FIG. 12), it may be assumed that the UE has declared beam failure for both TRP-1 PCell and TRP-2; the UE would independently perform the BFR procedures for both TRP-1 PCell and TRP-2 following the BFR procedure for TRP-2 in FIGS. 11A and 11B; different from FIGS. 11A and 11B, the UE would not share the BFR status for one coordinating TRP, e.g., TRP-1 PCell, with the other coordinating TRP, e.g., TRP-2, because now both of them are failed TRPs.

In one example of CA framework (the same TRPs setting as that in FIG. 12), it may be assumed that the UE has declared beam failure for TRP-1 PCell; the UE would perform the same BFR procedure for TRP-1 PCell as that for TRP-2 in FIG. 9; further, the UE could indicate to the working TRP-2 about the BFR status for TRP-1 PCell such as whether the UE has identified a new beam for TRP-1 PCell and etc.

It is noted that the provided design approaches in this disclosure could be applied to many other deployment scenarios with moderate modifications.

If ideal backhaul or close-to-ideal backhaul is assumed between the coordinating TRPs in the multi-DCI/PDCCH based multi-TRP system, the UE could initiate and complete the BFR procedure for the failed TRP with the working TRP. This is different from the design examples shown in FIGS. 11A and 11B, and FIGS. 13A and 13B (assuming non-ideal backhaul), in which the UE could only transmit certain limited BFR status/condition information for the failed TRP to the working TRP; the UE would still need to initiate and complete the BFR procedure with the failed TRP.

Figure 14:
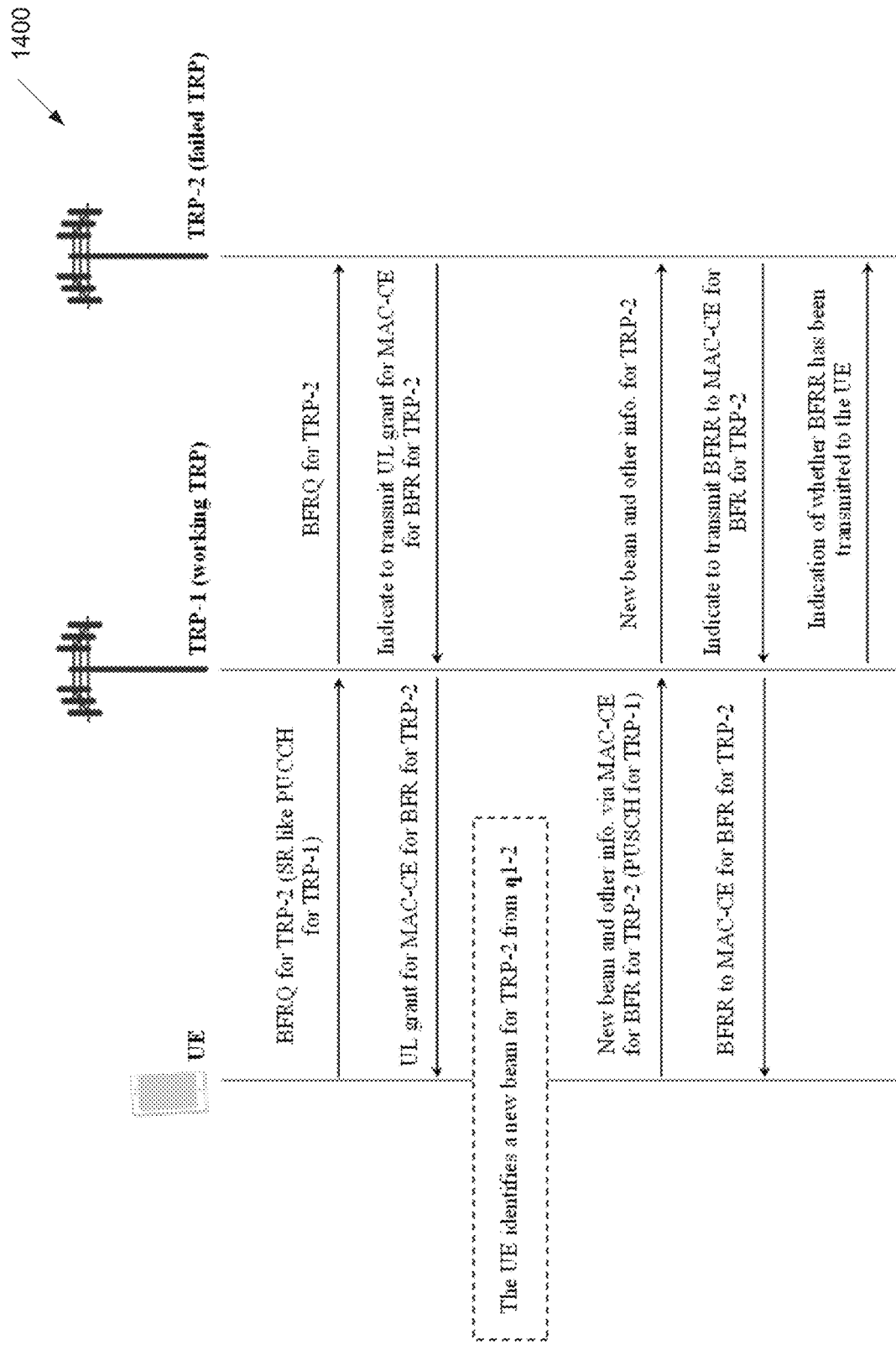
FIG. 14 illustrates yet an example TRP-specific or per TRP or partial beam failure recovery procedure in a multi-TRP system according to embodiments of the present disclosure.

FIG. 14 illustrates yet an example TRP-specific or per TRP or partial beam failure recovery procedure 1400 in a multi-TRP system according to embodiments of the present disclosure. An embodiment of the TRP-specific or per TRP or partial beam failure recovery procedure 1400 shown in FIG. 14 is for illustration only.

In FIG. 14, an example of the BFR procedure design for the failed TRP-2 in FIG. 10 is provided assuming that TRP-1 is still working, and TRP-1 and TRP-2 are connected via ideal or close-to-ideal backhaul. The procedures presented in FIG. 14 are after the UE has declared/detected beam failure for TRP-2. It can be observed from FIG. 14 that the working TRP-1 would act like a PCell and the failed TRP-2 would act like an SCell in the BFR procedure shown in FIGS. 13A and 13B.

Further, the working TRP-1 could send the BFRQ, new beam index and other information received from the UE to the failed TRP-2 through backhaul. The failed TRP-2 could also indicate to the working TRP-1 through backhaul about whether the UL grant for MAC CE for BFR and/or BFRR may be transmitted to the UE. In the example shown FIG. 14, the UE would receive the BFRR from the working TRP-1. Another alternative could be that the UE would receive the BFRR from the failed TRP-2 transmitted using the newly identified beam. Further, along with the transmission of the BFRQ, new beam index and other information, the UE could also indicate to the receiving TRP whether the BFRQ, new beam index and other information are for this TRP or a different (coordinating) TRP by explicitly incorporating the failed TRP ID and/or implicitly sending a one-bit indicator (0—for this TRP, 1—for the other TRP). This design principle could be applied to all the embodiments/examples described in this disclosure.

As depicted in FIGS. 11A and 11B, the UE could initiate the BFR for the failed TRP after the UE has identified a new beam for the failed TRP. That is, the UE could transmit the BFRQ along with the new beam information to the failed TRP via CF PRACH such that the CF PRACH resource index is associated with the newly identified beam. Similarly, the UE could initiate the BFR procedure for the failed TRP with the working TRP after the UE has identified a new beam for the failed TRP. The UE could transmit the BFRQ along with the new beam information to the working TRP over various UL channels/signaling mediums, and the working TRP could pass along the received BFRQ and the new beam information to the failed TRP through backhaul.

Figure 15:
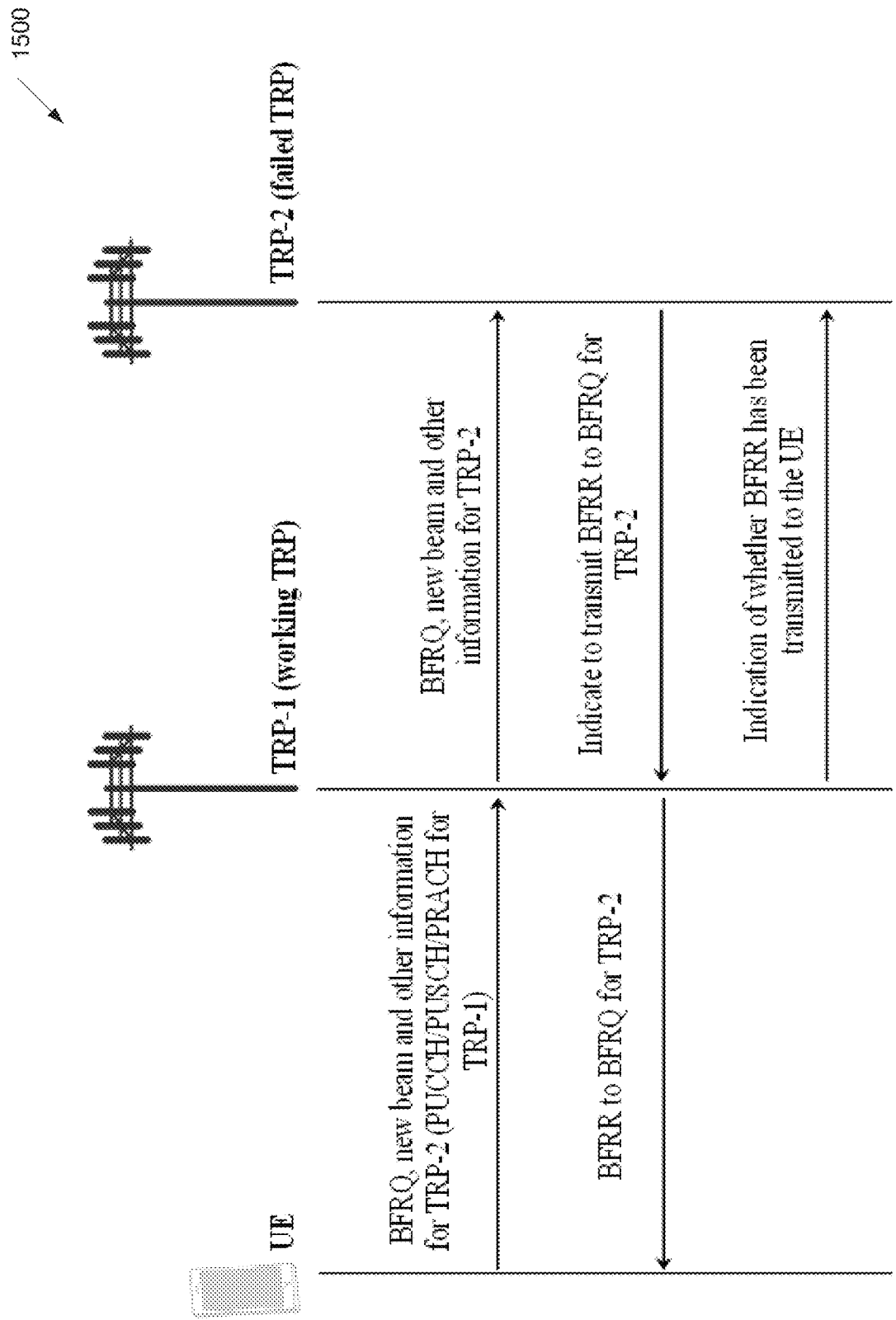
FIG. 15 illustrates yet an example TRP-specific or per TRP or partial beam failure recovery procedure in a multi-TRP system according to embodiments of the present disclosure.

FIG. 15 illustrates yet an example TRP-specific or per TRP or partial beam failure recovery procedure 1500 in a multi-TRP system according to embodiments of the present disclosure. An embodiment of the TRP-specific or per TRP or partial beam failure recovery procedure 1500 shown in FIG. 15 is for illustration only.

Even after the UE has identified the new beam for the failed TRP, the UE could still initiate the BFR procedure for the failed TRP with the working TRP rather than the failed TRP due to various reasons: (1) the working TRP has the most recent UL channels/resources to carry the BFRQ and the new beam information, (2) the working TRP has the most available UL channels/resources to carry the BFRQ and the new beam information, and (3) the propagation delay between the working TRP and the UE is smaller than that between the failed TRP and the UE.

Note that in FIG. 15, the BFR procedure is illustrated after the UE has identified a new beam for the failed TRP-2. Further, in FIG. 15, the UE would receive the BFRR from the working TRP-1. Another alternative could be that the UE would receive the BFRR from the failed TRP-2 transmitted using the newly identified beam.

Figure 16A:
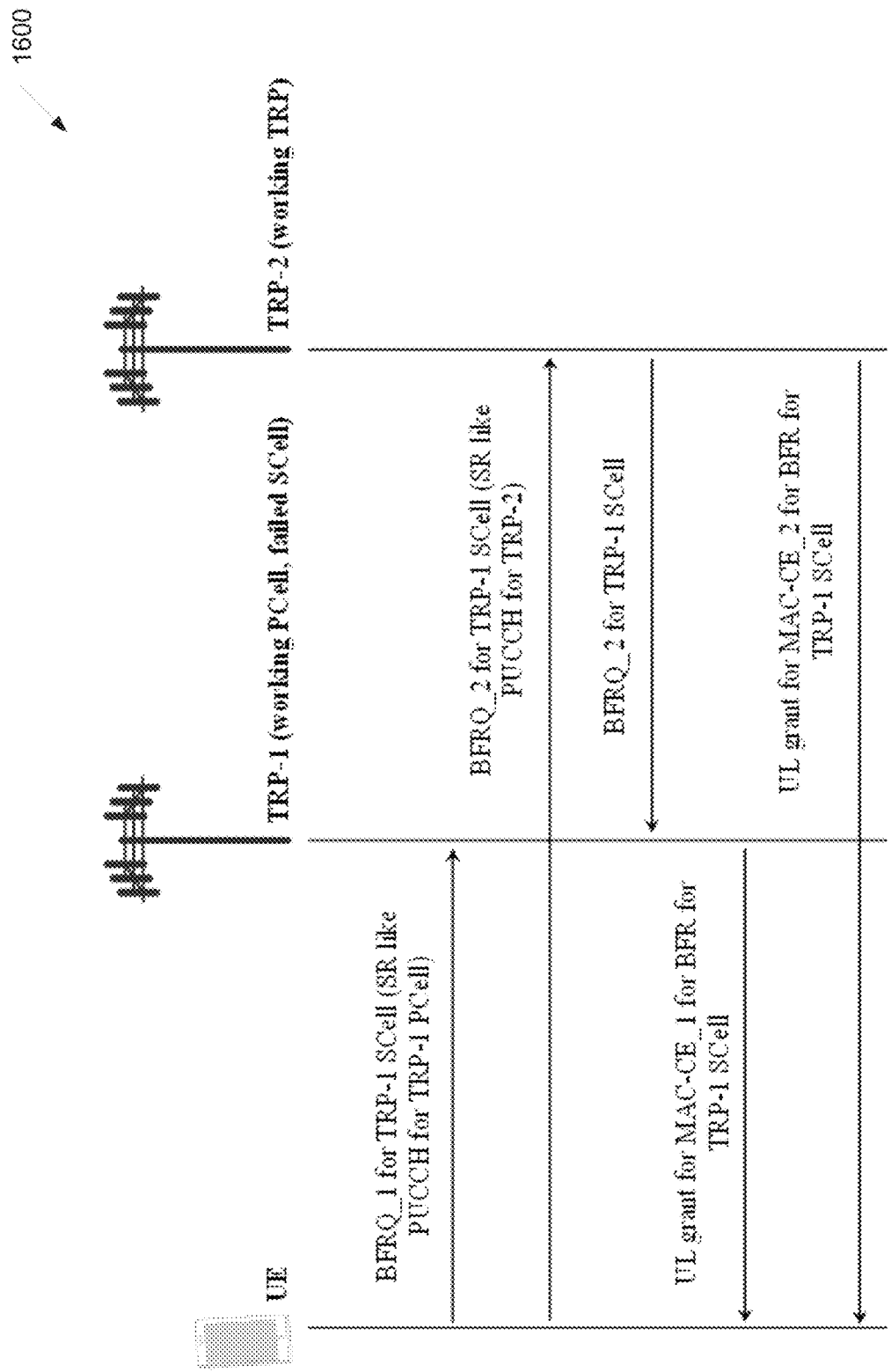
FIGS. 16A and 16B illustrate yet an example TRP-specific or per TRP or partial beam failure recovery procedure in a multi-TRP system according to embodiments of the present disclosure.
Figure 16B:
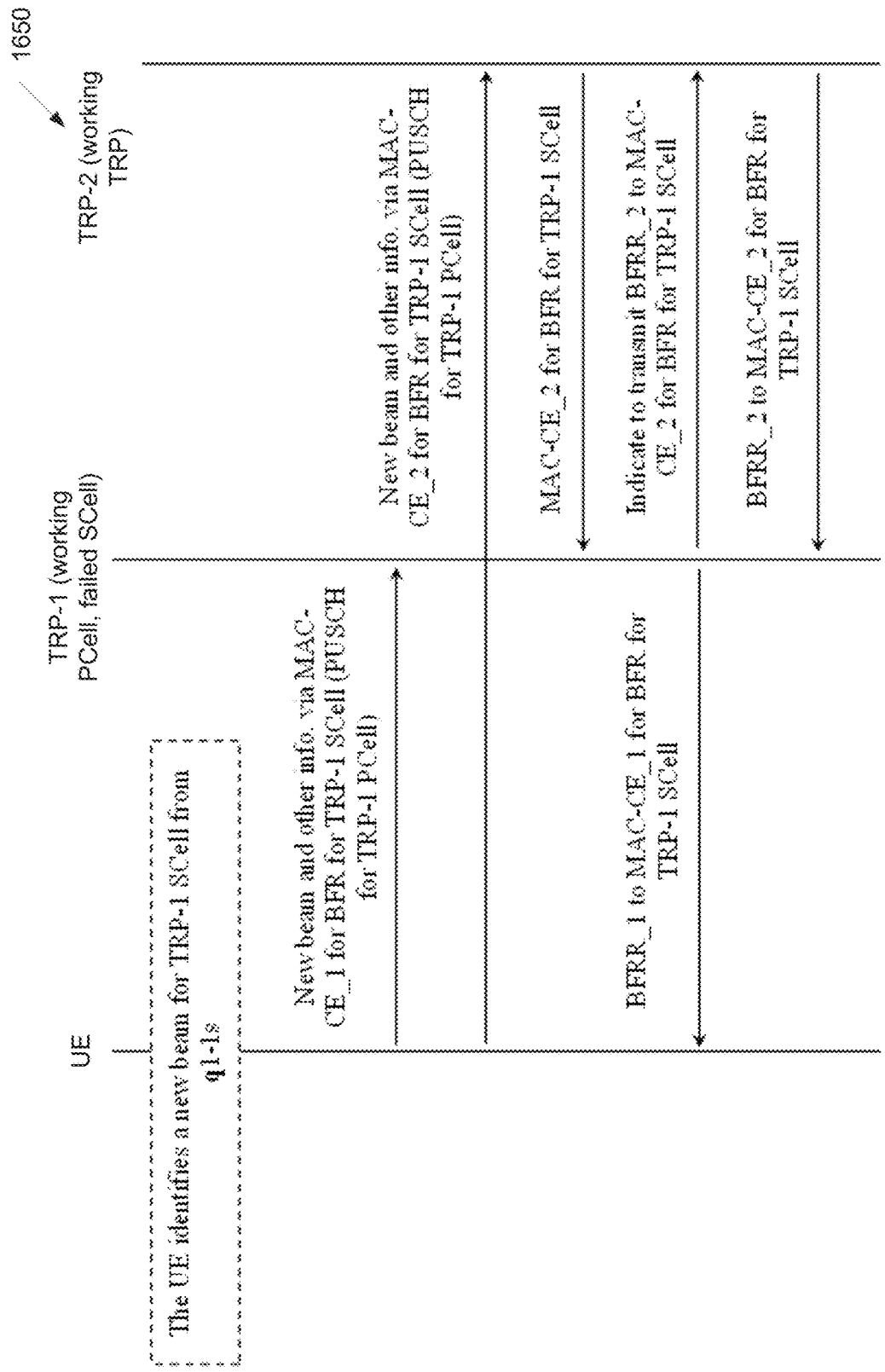

FIGS. 16A and 16B illustrate yet an example TRP-specific or per TRP or partial beam failure recovery procedure 1600 and 1650 in a multi-TRP system according to embodiments of the present disclosure. FIG. 16B is an example that is continued from FIG. 16A. Embodiments of the TRP-specific or per TRP or partial beam failure recovery procedure 1600 and 1650 shown in FIGS. 16A and 16B are for illustration only.

In FIGS. 16A and 16B, an example of the BFR procedure design for the failed TRP-1 SCell in FIG. 10 is provided assuming that TRP-1 PCell and TRP-2 are still working, and TRP-1 and TRP-2 are connected via ideal or close-to-ideal backhaul. The design procedures shown in FIGS. 16A and 16B are after the UE has declared/detected beam failure for TRP-1 SCell. As can be seen from FIGS. 16A and 16B that as both TRP-1 PCell and TRP-2 are working and ideal backhaul is assumed between TRP-1 and TRP-2, the UE could independently initiate the BFR procedure for the failed TRP-1 SCell with both TRP-1 PCell and TRP-2.

For instance, the UE could transmit two BFRQs for the failed TRP-1 SCell, one to TRP-1 PCell as a SR through its associated PUCCH (BFRQ_1), and the other to TRP-2 as a SR through its associated PUCCH (BFRQ_2). TRP-2 could then pass BFRQ_2 for TRP-1 SCell to TRP-1 PCell through backhaul. For another example, after the UE has identified a new beam for TRP-1 SCell, the UE could transmit the new beam information to TRP-1 PCell via MAC CE_1 on TRP-1 PCell's scheduled PUSCH, and the UE could also transmit the new beam information to TRP-2 via MAC CE_2 on TRP-2's scheduled PUSCH. TRP-2 could pass MAC CE_2 to TRP-1 PCell through backhaul.

Duplicating the same BFR message/signaling such as BFRQ and new beam index across different geographically non-co-located TRPs could improve the reliability of the BFR procedure. For instance, if TRP-1 PCell could not correctly receive BFRQ_1, it could still know that the beam failure between TRP-1 SCell and the UE has occurred and send the UL grant for MAC CE_1 to the UE because TRP-1 PCell could have received BFRQ_2 from TRP-2 through backhaul.

Duplicating/repeating the same BFR message/signaling across different coordinating TRPs, however, could be a source of signaling and resource overhead. Hence, one or more duplicates/repetitions of the same BFR message/signaling, e.g., BFRQ_2 in FIGS. 16A and 16B, could be omitted in the BFR procedure. Further, to facilitate the BFR procedure shown in FIGS. 16A and 16B, the UE could be configured by the network with a BFR process ID through high layer signaling. The UE could indicate the BFR process ID to the coordinating TRPs along with the transmission of the BFRQs, new beam information and etc. so that the network could handle the duplicates/repetitions of the same BFR message/signaling without ambiguity.

In one embodiment, TRP-specific/per TRP BFR for single-DCI based multi-TRP is provided.

In a single-DCI/PDCCH based multi-TRP system, the UE could only receive the PDCCHs from one of the coordinating TRP, referred to as the primary TRP in this disclosure. The UE could receive the PDSCHs from all the coordinating TRPs scheduled by the PDCCHs transmitted from the primary TRP. Further, it is assumed that the coordinating TRPs in a single-PDCCH based framework are connected with each other via ideal backhaul with zero latency.

Figure 17:
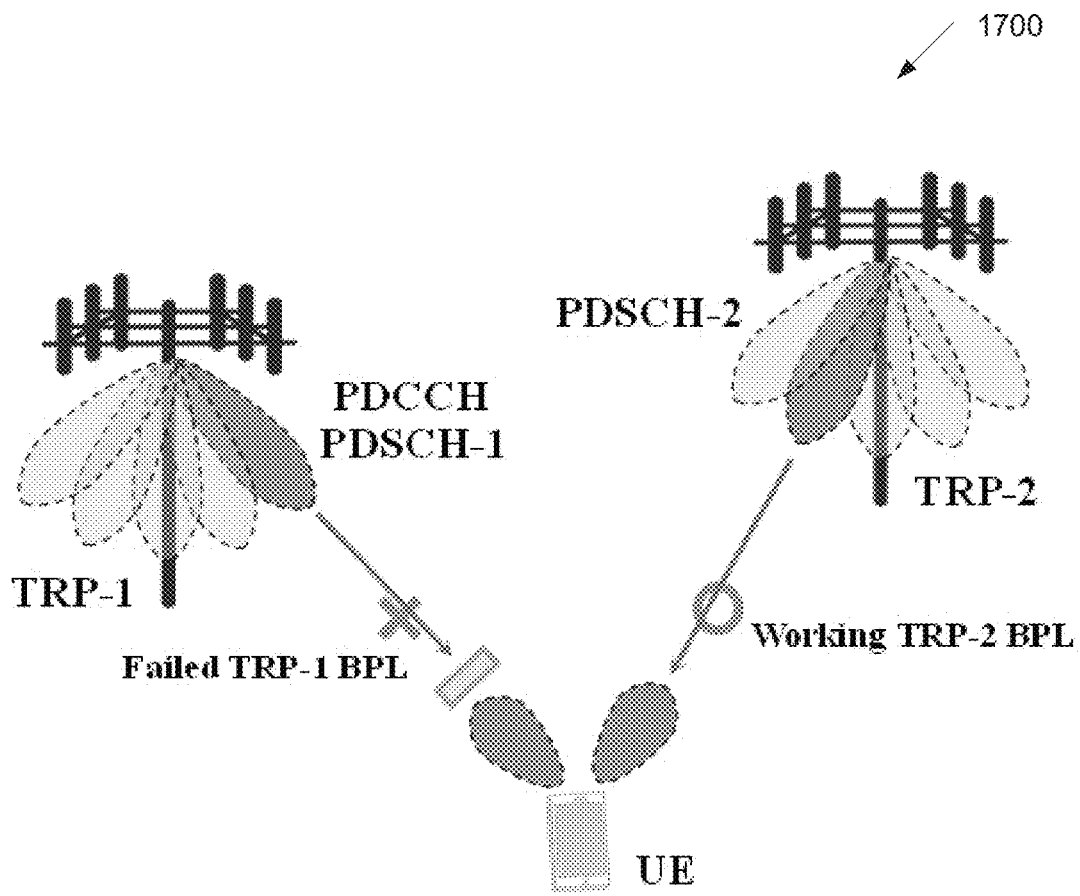
FIG. 17 illustrates an example TRP-specific or per TRP or partial beam failure in a single-PDCCH or single-DCI based multi-TRP system according to embodiments of the present disclosure.

FIG. 17 illustrates an example TRP-specific or per TRP or partial beam failure in a single-PDCCH or single-DCI based multi-TRP system 1700 according to embodiments of the present disclosure. An embodiment of the TRP-specific or per TRP or partial beam failure in a single-PDCCH or single-DCI based multi-TRP system 1700 shown in FIG. 17 is for illustration only.

In FIG. 17, an illustrative example of a single-PDCCH based multi-TRP system is presented. As can be seen from the example shown in FIG. 17, TRP-1 is the primary TRP transmitting the PDCCH to the UE. Further, for a single-PDCCH based multi-TRP system, the UE could only declare beam failure and perform BFR for the primary TRP. As shown in FIG. 17, due to the blockage, the UE could declare beam failure for TRP-1 because the received signal qualities of the BFD RSs from TRP-1 could fall below the predetermined threshold for a given period of time. The BPL(s) between the non-primary/secondary TRP-2 and the UE, however, could still work.

As indicated in FIG. 17, the UE could be configured by the network with a BFD RS beam set q0, a NBI RS beam set q1, a maximum number of BFI count maxBFIcount, a BFD timer BFDtimer, a BFR timer BFRtimer, a BFD threshold Qout, and a BFR threshold Qin for the primary TRP-1.

Different from the design examples shown in FIG. 14, FIG. 15, FIGS. 16A and 16B, and FIG. 17, TRP-2 does not have its own PDCCH. In this disclosure, it is assumed that the non-primary TRP could still have its own UL channels such as PUCCH/PUSCH, which are separately configured from those for the primary TRP. In contrast to the multi-PDCCH based design examples shown in FIG. 14, FIG. 15, FIGS. 16A and 16B, and FIG. 17, the UL resources such as PUCCH/PUSCH configured/scheduled for the non-primary TRP in the single-PDCCH based framework could be very limited and only used for transmitting essential UL information. Based on these system assumptions, several BFR procedures for the failed primary TRP in the single-PDCCH based multi-TRP system are developed and described as follows.

Figure 18A:
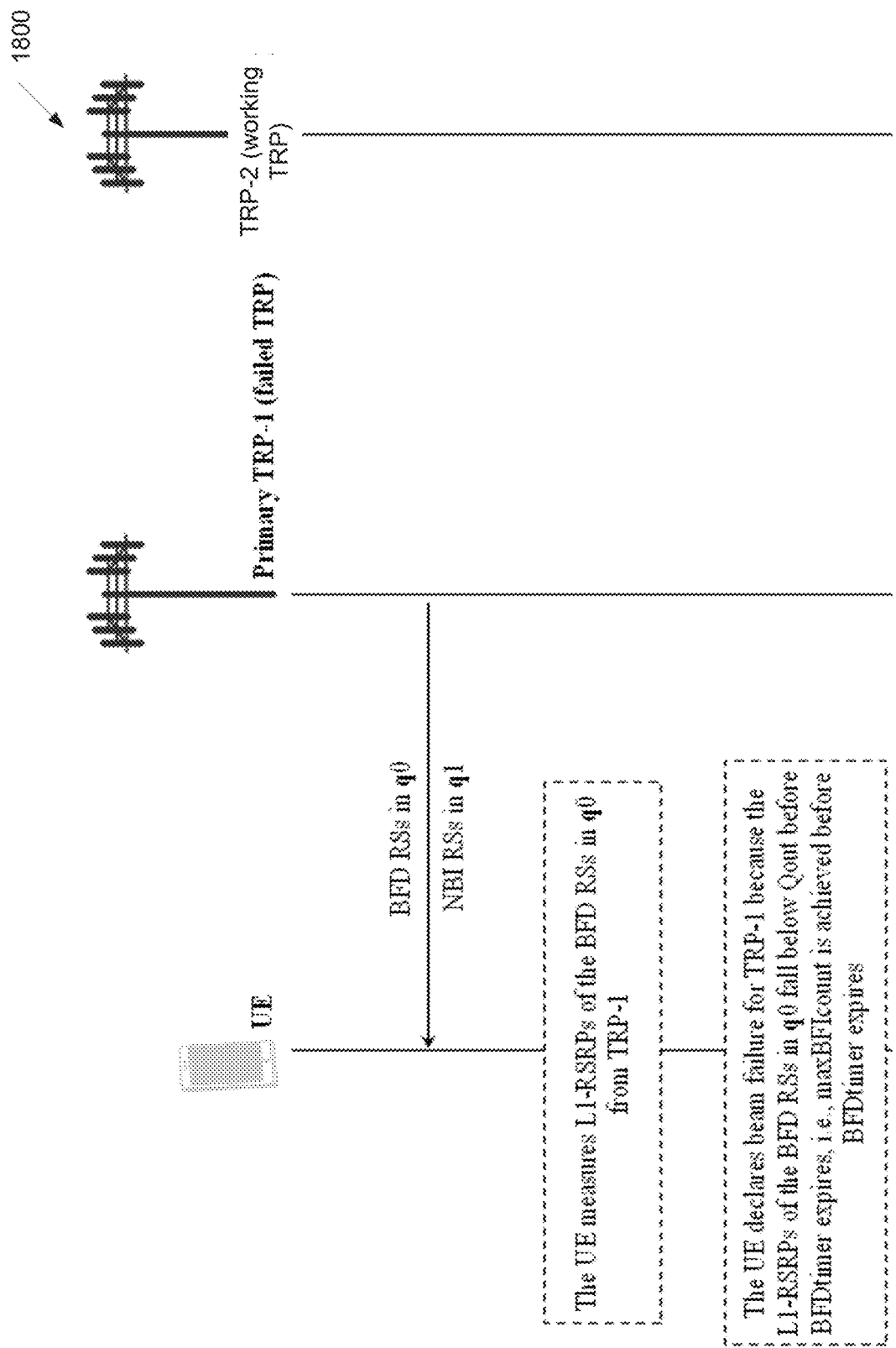
FIGS. 18A and 18B illustrate an example TRP-specific or per TRP or partial beam failure recovery procedure in a multi-TRP system according to embodiments of the present disclosure.
Figure 18B:
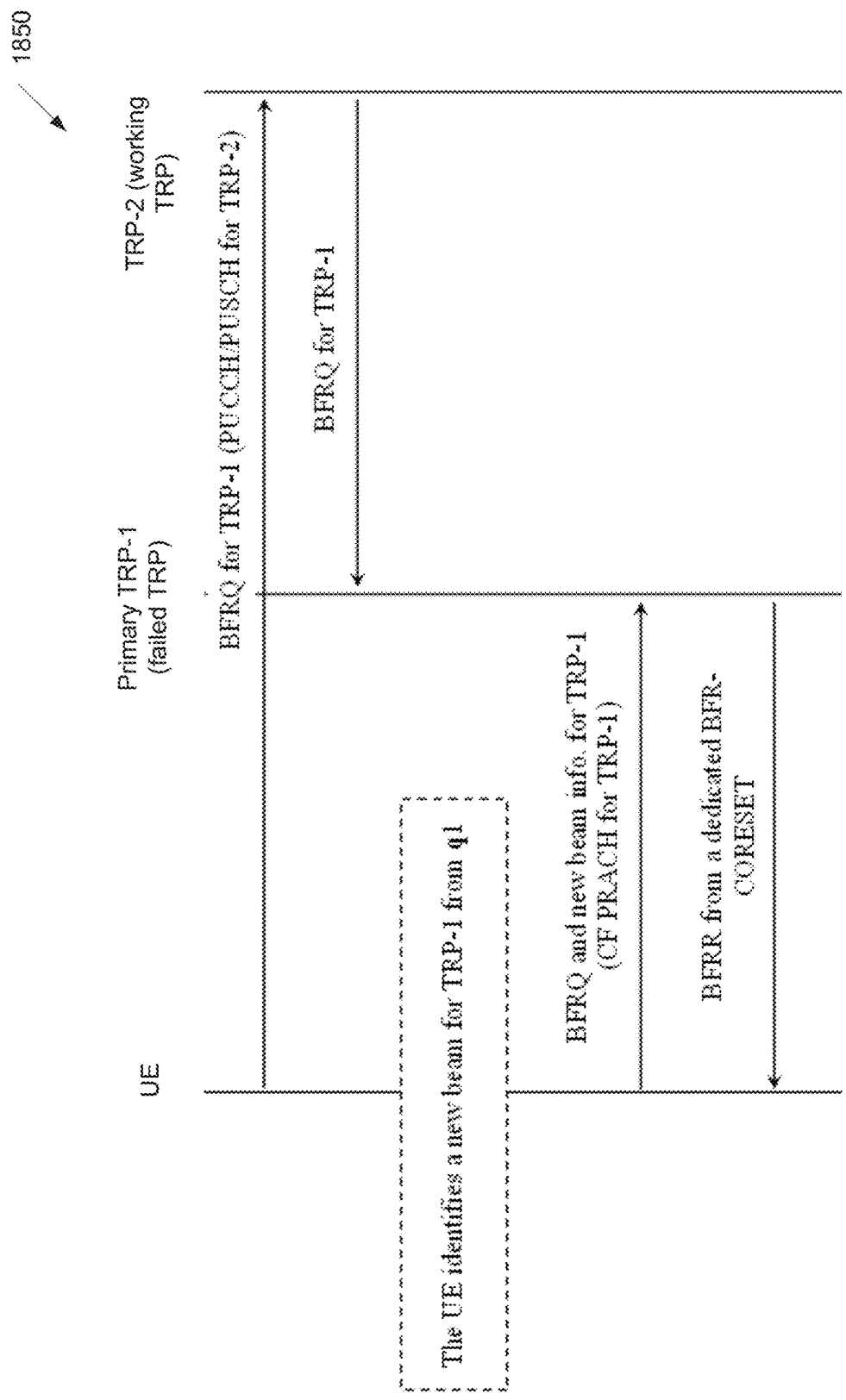

FIGS. 18A and 18B illustrate an example TRP-specific or per TRP or partial beam failure recovery procedure 1800 and 1850 in a multi-TRP system according to embodiments of the present disclosure. FIG. 18B is an example that is continued from FIG. 18A. Embodiments of the TRP-specific or per TRP or partial beam failure recovery procedure 1800 and 1850 shown in FIGS. 18A and 18B are for illustration only.

In FIGS. 18A and 18B, an example of BFR procedure design for the failed primary TRP in the single-PDCCH based multi-TRP system is presented. The UE could only receive the BFD RSs transmitted from the primary TRP, i.e., TRP-1 in this example, in the BFD RS beam set q0. The UE would measure the L1-RSRPs of the BFD RSs in q0, and if all of them fall below Qout, the UE would increment the BFI count. The UE would declare beam failure for TRP-1 if maxBFIcount is achieved before the timer BFDtimer expires.

As shown in FIGS. 18A and 18B, after declaring/detecting the beam failure for the primary TRP-1, the UE would transmit the BFRQ for TRP-1 to TRP-2. The UE could multiplex the BFRQ with the CSI report, HARQ/ACK, and/or other UCIs on the PUCCH associated with the working TRP-2. Alternatively, the UE could also transmit the BFRQ for TRP-1 through the MAC CE on the PUSCH associated with the working TRP-2 assuming that there are available scheduled PUSCH resources. TRP-2 could then indicate the BFRQ for TRP-1 to TRP-1 through the ideal backhaul. Upon receiving the BFRQ, the primary TRP-1 could know that the beam failure between the primary TRP-1 and the UE has occurred, and the UE would transmit the new beam index and other information through the CF PRACH resource in a later phase. With such prior knowledge, TRP-1 could well prepare to detect/decode the corresponding CF PRACH resource(s) and/or take other necessary actions to ensure that the BFR procedure could succeed.

After the UE has identified a new beam for TRP-1, the UE would transmit the BFRQ, the new beam index and other necessary information to TRP-1 through the configured CF PRACH resource(s) for TRP-1. The UE could receive the BFRR to the BFRQ from TRP-1 from a dedicated BFR-CORESET. These procedures are similar to those presented in FIGS. 11A and 11B.

For the single-PDCCH based multi-TRP system, leveraging the available UL resources of the non-primary TRP to transmit the BFR messages/signaling for the failed primary TRP could be more beneficial under the CA framework, in which both PCell and SCell(s) could be deployed at the primary TRP.

Figure 19:
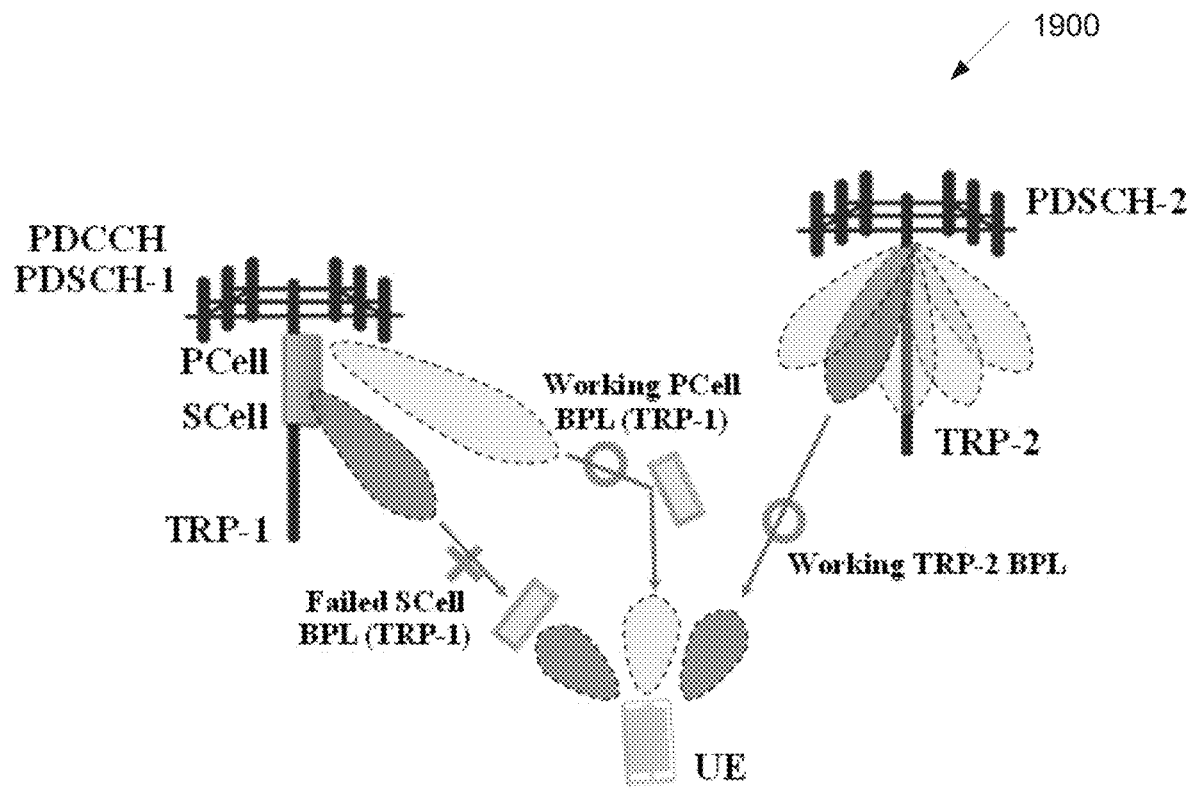
FIG. 19 illustrates another example TRP-specific or per TRP or partial beam failure in a single-PDCCH or single-DCI based multi-TRP system according to embodiments of the present disclosure.

FIG. 19 illustrates another example TRP-specific or per TRP or partial beam failure in a single-PDCCH or single-DCI based multi-TRP system 1900 according to embodiments of the present disclosure. An embodiment of the TRP-specific or per TRP or partial beam failure in a single-PDCCH or single-DCI based multi-TRP system 1900 shown in FIG. 19 is for illustration only.

Figure 20A:
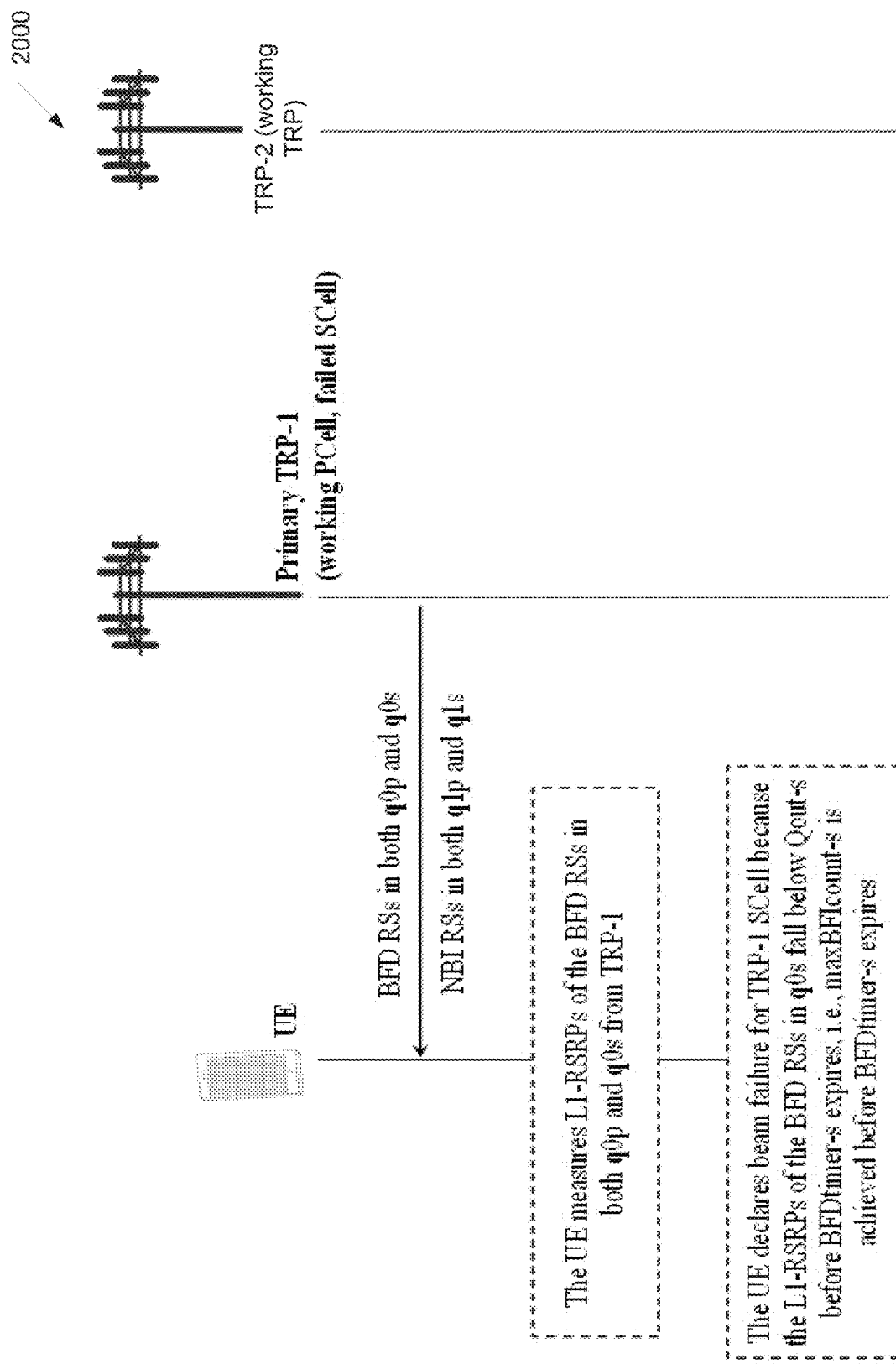
FIGS. 20A and 20B illustrate an example TRP-specific or per TRP or partial beam failure recovery procedure in a multi-TRP system according to embodiments of the present disclosure.
Figure 20B:
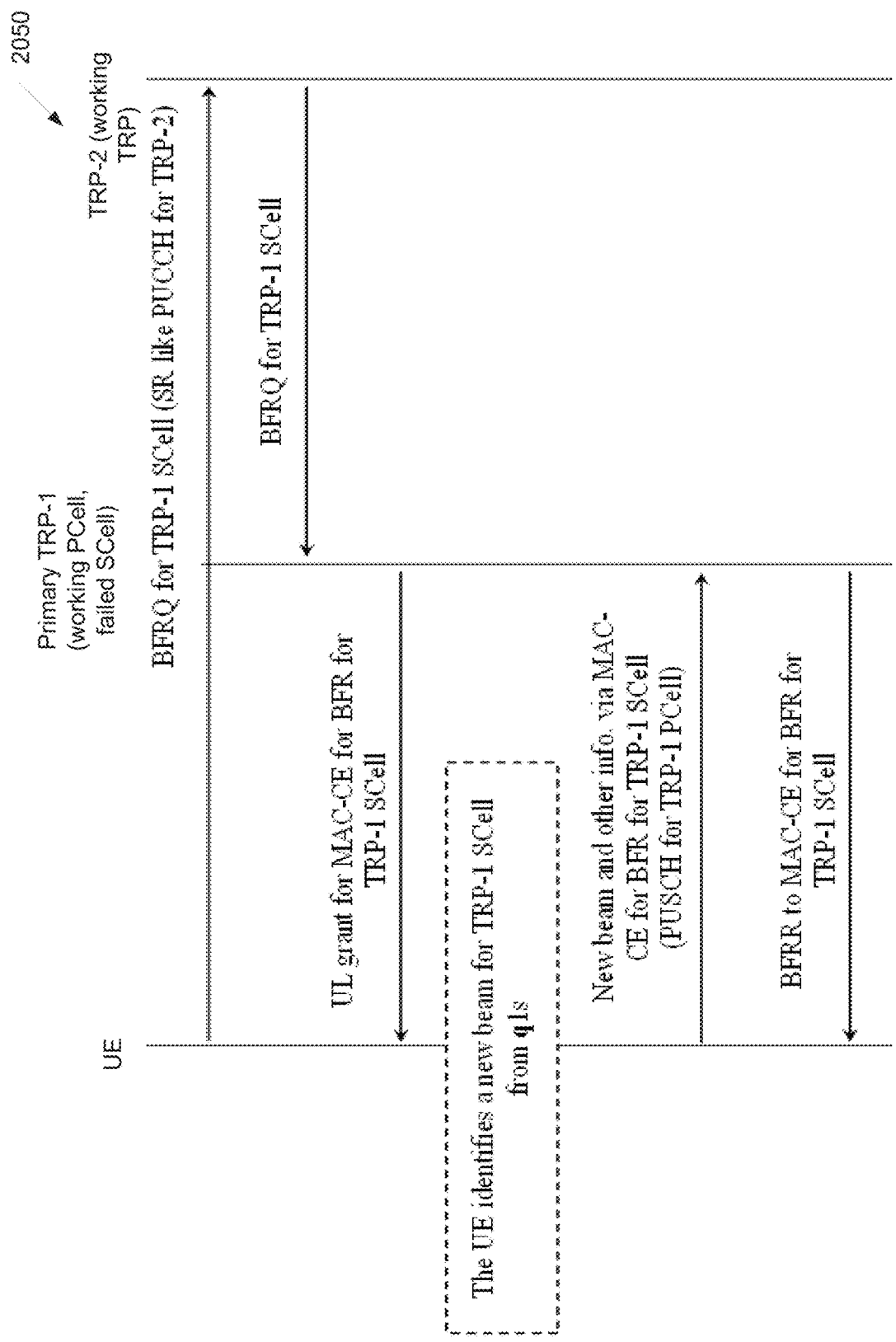

FIGS. 20A and 20B illustrate an example TRP-specific or per TRP or partial beam failure recovery procedure 2000 and 2050 in a multi-TRP system according to embodiments of the present disclosure. FIG. 20B is an example that is continued from FIG. 20A. Embodiments of the TRP-specific or per TRP or partial beam failure recovery procedure 2000 and 2050 shown in FIGS. 20A and 20B are for illustration only.

In FIGS. 20A and 20B, an example of the BFR procedure designed for the multi-TRP setting in FIG. 19 is presented. As can be seen from FIGS. 20A and 20B, the UE would transmit the BFRQ for TRP-1 SCell to TRP-2 as a SR like signaling through TRP-2's PUCCH. TRP-2 would then pass the BFRQ for TRP-1 SCell to TRP-1 PCell through the ideal backhaul. In this example, the SR would request TRP-1 PCell's PUSCH resources to carry the potential new beam information identified by the UE.

In FIGS. 20A and 20B, transmitting the BFRQ for the failed TRP-1 SCell to TRP-2 rather than to TRP-1 PCell could be due to various reasons such that the PUCCH resources for TRP-2 would come first, and/or the propagation delay between TRP-2 and the UE is smaller than that between TRP-1 and the UE. In the example shown in FIGS. 20A and 20B, after the UE has identified a new beam for the failed TRP-1 SCell, the UE would transmit the new beam index and other necessary information to TRP-1 PCell through MAC CE on the scheduled PUSCH resources for TRP-1 PCell.

Note that other design options such as transmitting the new beam index and other necessary information to TRP-2 through its PUSCH, transmitting both the BFRQ and the new beam information to TRP-2 through its PUCCH and PUSCH, repeating the transmissions of the BFRQ and the new beam information across both TRP-1 PCell and TRP-2 (similar to FIGS. 16A and 16B) and etc. are also possible, depending on the availability of the UL resources for TRP-1 PCell and TRP-2 and whether the SR is to request the PUSCH resources for TRP-1 PCell or TRP-2 or both. The basic design principles discussed in this disclosure would apply to these design options as well.

In one embodiment, partial BFR for multi-TRP is provided.

As shown in FIGS. 11A and 11B, FIGS. 13A and 13B, FIG. 14, FIG. 15, and FIGS. 16A and 16B, the BFR procedures are developed on a per TRP basis for the multi-PDCCH based multi-TRP system. That is, both the BFD RS beam set and the NBI RS beam set are defined per TRP, and the UE could initiate the TRP-specific BFR process if a given TRP's BFD RSs are failed, and the UE could identify one or more new beams for the given TRP. The TRP-specific BFR could be seen as one type, or a special case of partial BFR for the multi-PDCCH based multi-TRP system, if a full BFR is defined as: all the BFD RSs from all the coordinating TRPs are failed. In addition to the TRP-specific BFR, another type of partial BFR could be defined such that the BFD RSs (NBI RSs) in a (virtual) BFD RS beam set ((virtual) NBI RS beam set) are from different coordinating TRPs. Further, different from the TRP-specific BFR, in which the UE would identify one or more new beams for the failed TRP, the UE in the partial BFR design could identify one or more new beams for each of the coordinating TRPs.

Figure 21A:
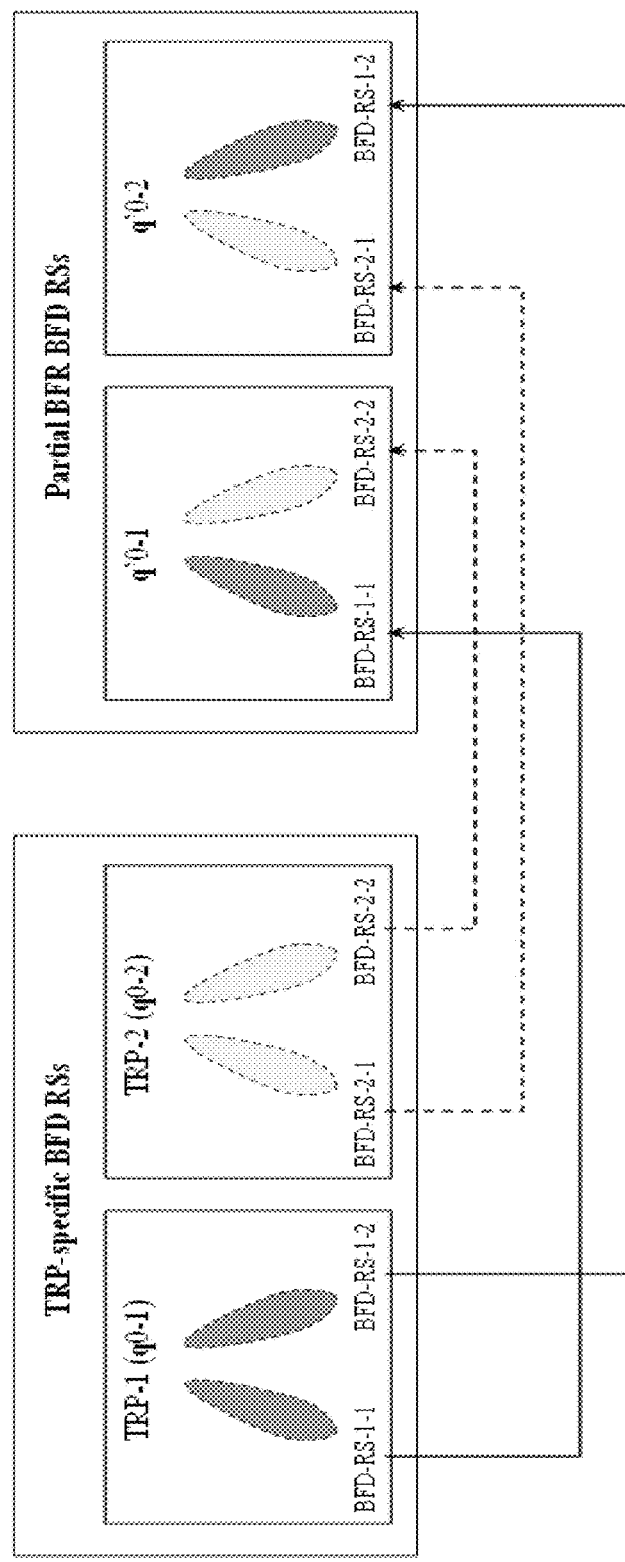
FIG. 21A illustrates an example configuration of BFD RSs for TRP-specific or per TRP or partial beam failure recovery according to embodiments of the present disclosure.

FIG. 21A illustrates an example configuration of BFD RSs for TRP-specific or per TRP or partial beam failure recovery 2100 according to embodiments of the present disclosure. An embodiment of the configuration of BFD RSs for TRP-specific or per TRP or partial beam failure recovery 2100 shown in FIG. 21A is for illustration only.

In FIG. 21A, conceptual examples of BFD RSs configurations for both TRP-specific BFR and partial BFR are presented. In the TRP-specific BFR design, the BFD RS beam set for TRP-1 (q0_1) contains two BFD RSs, i.e., BFD-RS-1-1 and BFD-RS-1-2, and the BFD RS beam set for TRP-2 (q0_1) contains two BFD RSs, i.e., BFD-RS-2-1 and BFD-RS-2-2. As shown on the RHS in FIG. 21, virtual BFD RS beams sets are defined for the partial BFR design such that a first virtual BFD RS beam set (q'0-1) could contain BFD-RS-1-1 from TRP-1 (q0-1) and BFD-RS-2-2 from TRP-2 (q0-2), and a second virtual BFD RS beam set (q'0-2) could contain BFD-RS-1-2 from TRP-1 (q0-1) and BFD-RS-2-1 from TRP-2 (q0-2).

Figure 21B:
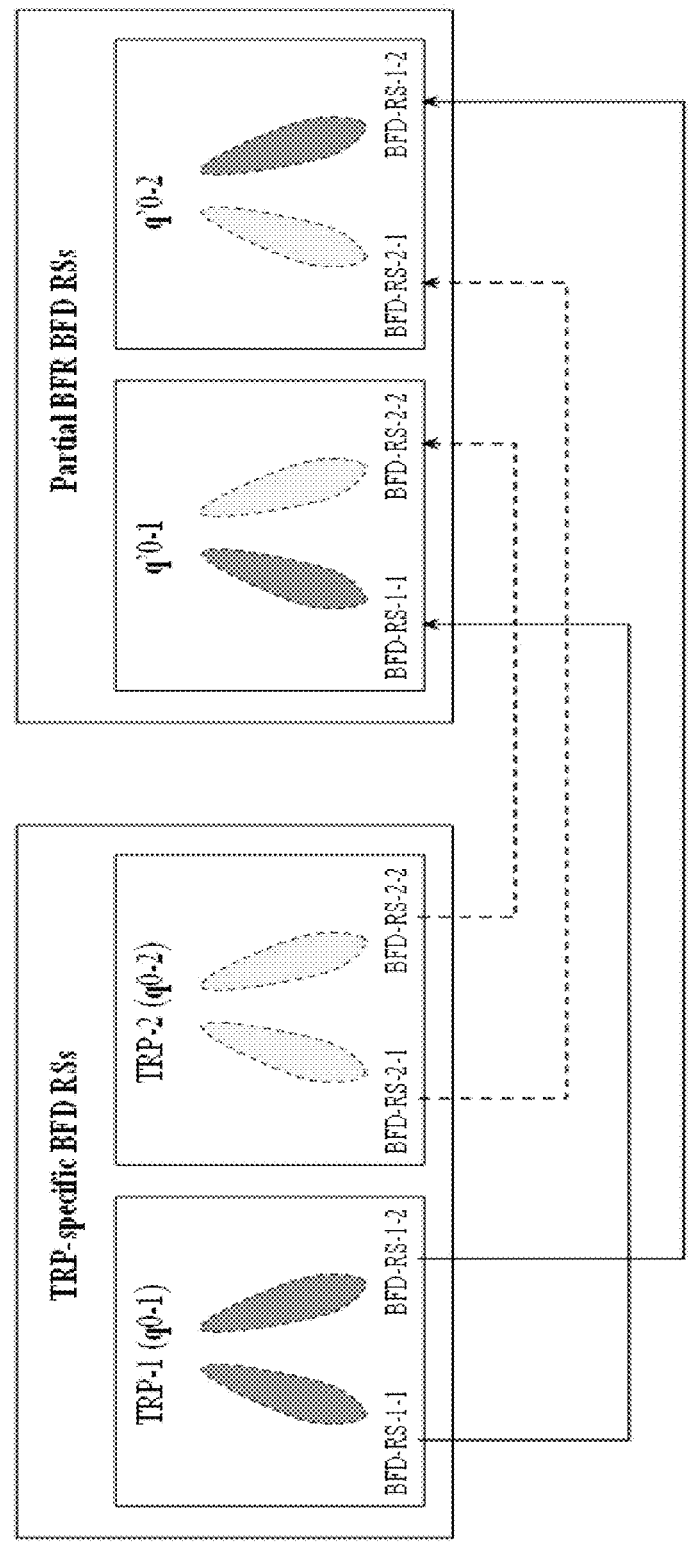
FIG. 21B illustrates an example configuration of NBI RSs for TRP-specific or per TRP or partial beam failure recovery according to embodiments of the present disclosure.

FIG. 21B illustrates an example configuration of NBI RSs for TRP-specific or per TRP or partial beam failure recovery 2150 according to embodiments of the present disclosure. An embodiment of the configuration of NBI RSs for TRP-specific or per TRP or partial beam failure recovery 2150 shown in FIG. 21B is for illustration only.

Similar design principles could be applied to the configurations of the NBI RSs for the partial BFR as well. As can be seen from the examples shown in FIG. 22, a first virtual NBI RS beam set (q'1-1) for partial BFR could contain NBI-RS-1-1 from TRP-1 (q1-1) and NBI-RS-2-2 from TRP-2 (q1-2), and a second NBI RS beam set (q'1-2) for partial BFR could contain NBI-RS-1-2 from TRP-1 (q1-1) and NBI-RS-2-1 from TRP-2 (q1-2).

Further, as can be seen from TABLE 2, the BFD threshold/timer, the BFR threshold/timer and the maximum number of BFI count could all be defined on the basis of virtual BFD RS beam set/NBI RS beam set. For example, BFD-timer'-1 is defined for the virtual BFD RS beam set q'0-1, and BFDtimer'-2 is defined for the virtual BFD RS beam set q'0-2. That is, BFD-RS-1-1 and BFD-RS-1-2 could correspond to two different BFD RS timers, though they are transmitted from the same TRP-1. The UE could be configured by the network with the parameters shown in TABLE 2 via higher layer signaling such as RRC signaling. For instance, the UE could be configured/indicated by the network about the rules of constructing the virtual BFD/RS beam sets and how they would be mapped to the coordinating TRPs.

TABLE 2

| BFR parameters for partial BFR | | |
|---|---|---|
| | q'0-1, q'1-1 | q'0-2, q'1-2 |
| Maximum number of BFI count | maxBFIcount'-1 | maxBFIcount'-2 |
| BFD timer | BFDtimer'-1 | BFDtimer'-2 |
| BFR timer | BFRtimer'-1 | BFRtimer'-2 |
| BFD thresholds | Qout'-1 | Qout'-2 |
| BFR thresholds | Qin'-1 | Qin'-2 |

Figure 22A:
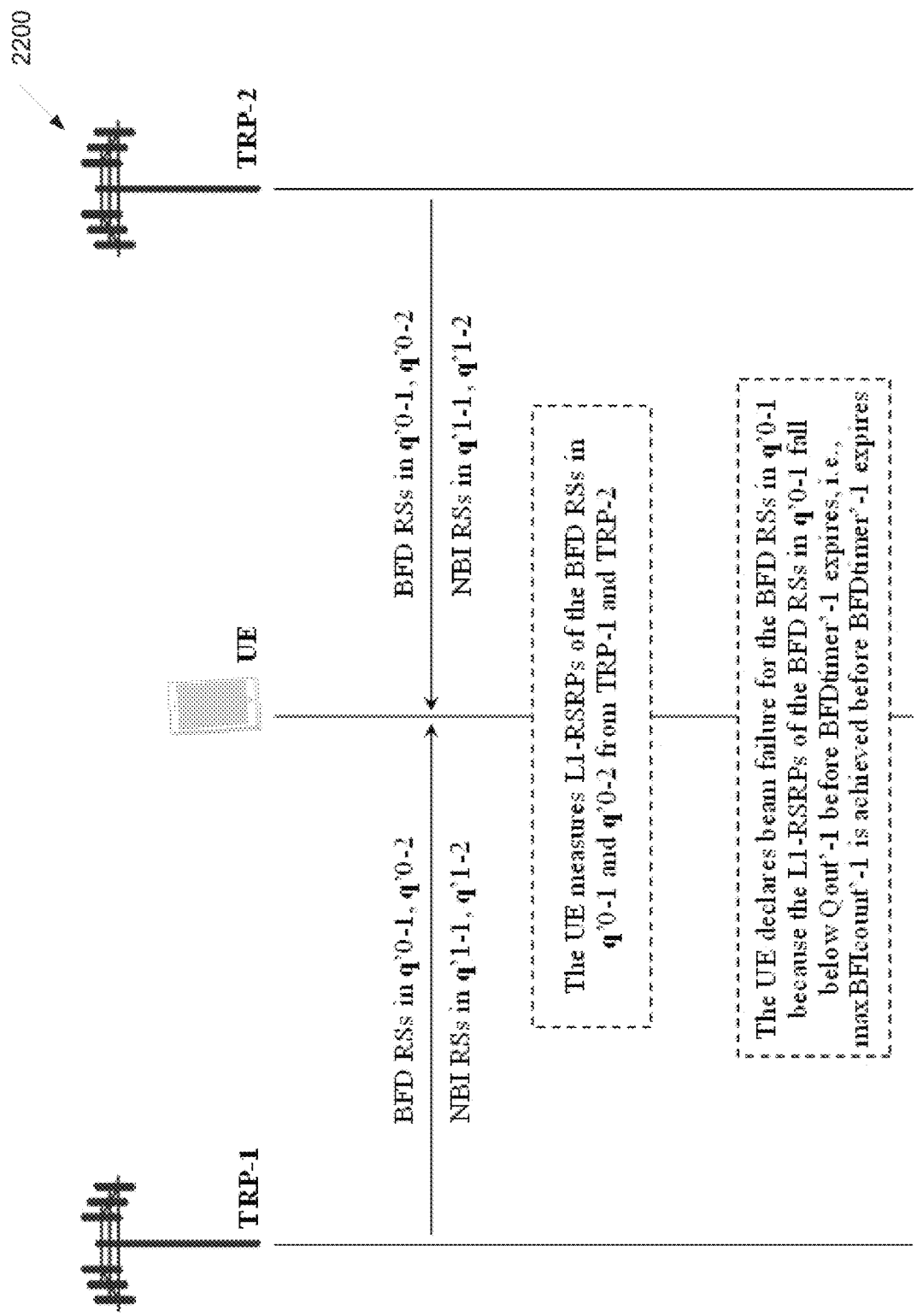
FIGS. 22A and 22B illustrate an example TRP-specific or per TRP or partial beam failure recovery procedure in a multi-TRP system according to embodiments of the present disclosure.
Figure 22B:
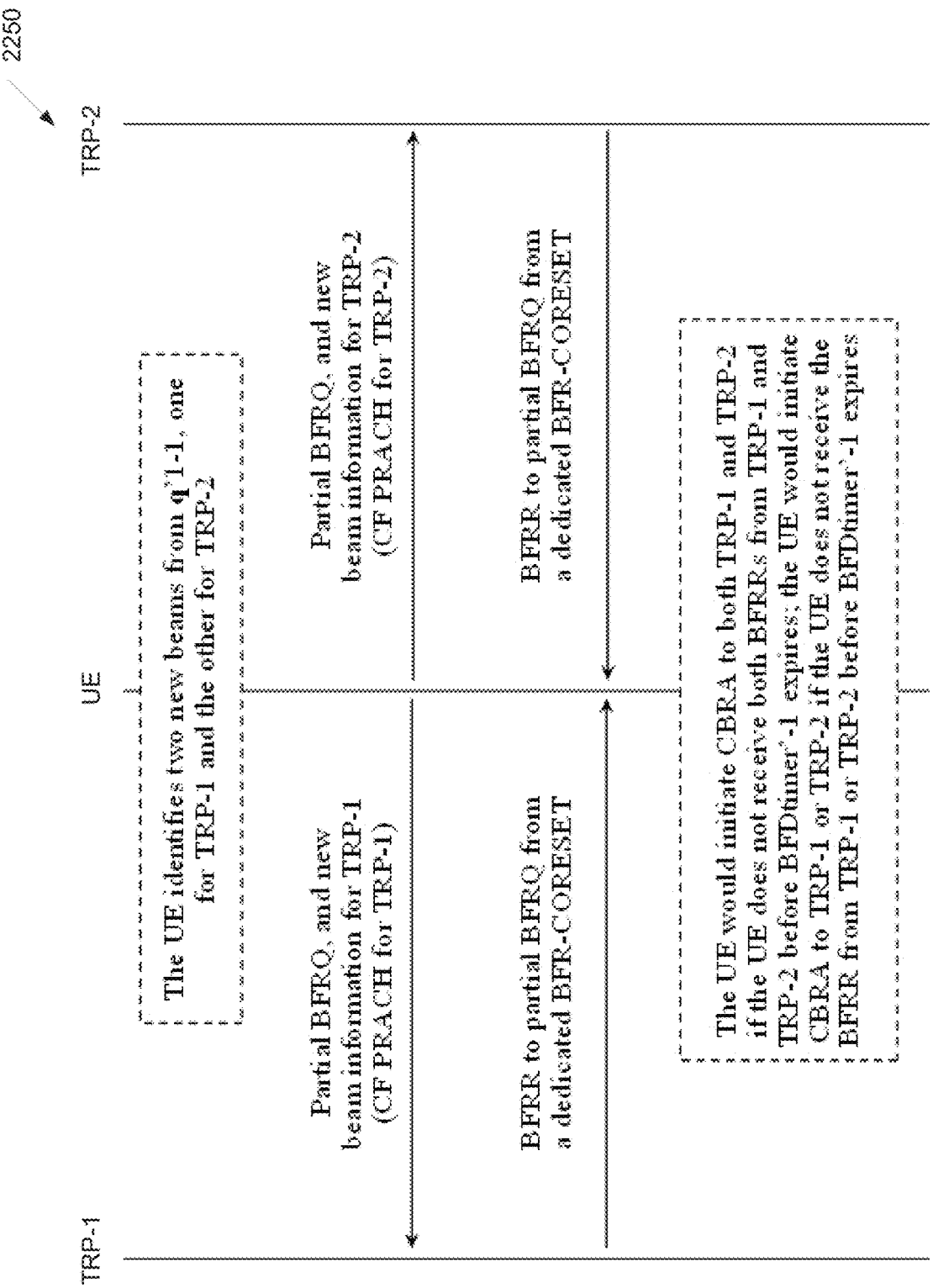

FIGS. 22A and 22B illustrate an example TRP-specific or per TRP or partial beam failure recovery procedure 2200 and

2250 in a multi-TRP system according to embodiments of the present disclosure. FIG. 22B is an example that is continued from FIG. 22A. Embodiments of the TRP-specific or per TRP or partial beam failure recovery procedure 2200 and 2250 shown in FIGS. 22A and 22B are for illustration only.

In FIGS. 22A and 22B, a design example of the partial BFR procedure for the multi-PDCCH based multi-TRP system under the non-CA setting is presented. As can be seen from FIGS. 22A and 22B, the UE would measure the L1-RSRPs of all the BFD RSs in the virtual BFD RS beam sets. If the L1-RSRPs of the BFD RSs in a virtual BFD RS beam set (e.g., q'0_1 in FIGS. 22A and 22B) fall below the configured threshold (Qout'-1 in FIGS. 22A and 22B) before the BFD timer (BFDtimer'-1 in FIGS. 22A and 22B) expires, the UE would declare beam failure for the virtual BFD RS beam set. The UE would then measure the L1-RSRPs of the NBI RSs in the corresponding virtual NBI RS beam set (q'1-1 in FIG. 22) and determine two NBI RSs, and therefore, two new beams one for each coordinating TRP, whose L1-RSRPs are beyond Qin'-1.

After identifying the new beams, the UE would send two BFRQs for partial BFR to both TRP-1 and TRP-2 through the configured CF PRACH resources for the two TRPs, though the beam failure event is only for a single virtual BFD RS beam set. Along with the transmission of the BFRQs, the UE would also indicate to the coordinating TRPs the newly selected beams for them, which are associated with the indices of the CF PRACH resources. For instance, the UE would transmit the BFRQ for partial BFR and the new beam information for TRP-1 through the corresponding CF PRACH resource for TRP-1, and the BFRQ for partial BFR and the new beam information for TRP-2 through the corresponding CF PRACH resource for TRP-2.

After sending the BFRQs to the coordinating TRPs, the UE would start to monitor a dedicated CORESET/search space for BFRR from each of the coordinating TRPs. Each coordinating TRP would transmit a dedicated BFR-CORESET (addressed to the UE-specific C-RNTI) to the UE through the new beam. As shown in FIGS. 22A and 23B, if the UE could detect valid UE-specific DCIs in the dedicated CORESETs for BFRR from both TRP-1 and TRP-2, the UE would assume that the BFRQs have been successfully received by both of the coordinating TRPs, and the UE would complete the partial BFR process. Otherwise, if the UE could not receive the BFRR from either of the coordinating TRPs (e.g., from TRP-1) before the corresponding BFR timer expires (e.g., BFRtimer'-1), the UE would initiate a CBRA process to the corresponding TRP (e.g., to TRP-1). If the UE could not receive the BFRR from any of the coordinating TRPs before the BFR timer expires, the UE would initiate the CBRA processes to reconnect to both TRPs.

The partial BFR procedure depicted in FIGS. 22A and 22B can be extended to other system settings and/or deployment scenarios such as full BFR for the multi-PDCCH based multi-TRP system, partial BFR for the single-PDCCH based multi-TRP system, partial BFR for the multi-PDCCH based multi-TRP system under the CA setting. For instance, to support the full BFR for the multi-PDCCH based multi-TRP system, the UE could be configured by the network with only one virtual BFD (NBI) RS beam set containing all BFD (NBI) RSs from all the coordinating TRPs.

In one embodiment, UE-initiated BFR for multi-TRP is provided.

Figure 24:
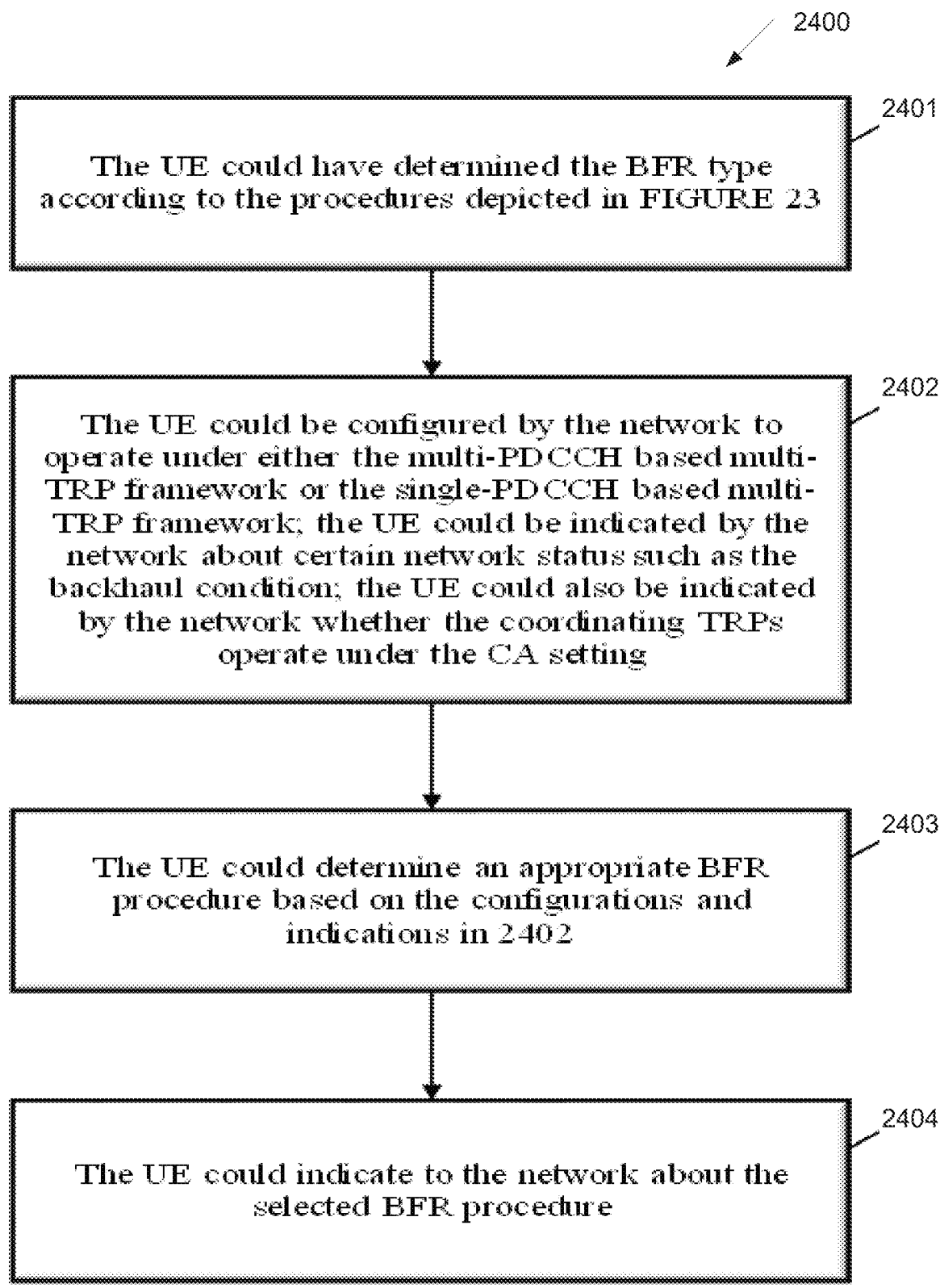
FIG. 24 illustrates a flowchart of a method for UE-initiated BFR procedure determination for TRP-specific or per TRP or partial beam failure recovery in a multi-TRP system according to embodiments of the present disclosure.

Rather than configured/indicated by the network, the UE could proactively select an appropriate BFR type from various potential BFR types such as TRP-specific/per TRP BFR, partial BFR or full BFR for the multi-TRP system. The UE could determine the appropriate BFR type based on various factors such as the UE's prediction/assessment of the channel conditions, UE's moving speed, UE's orientation change and etc. In FIG. 24, an example of the UE-initiated BFR type selection for the multi-TRP system is presented.

Figure 23:
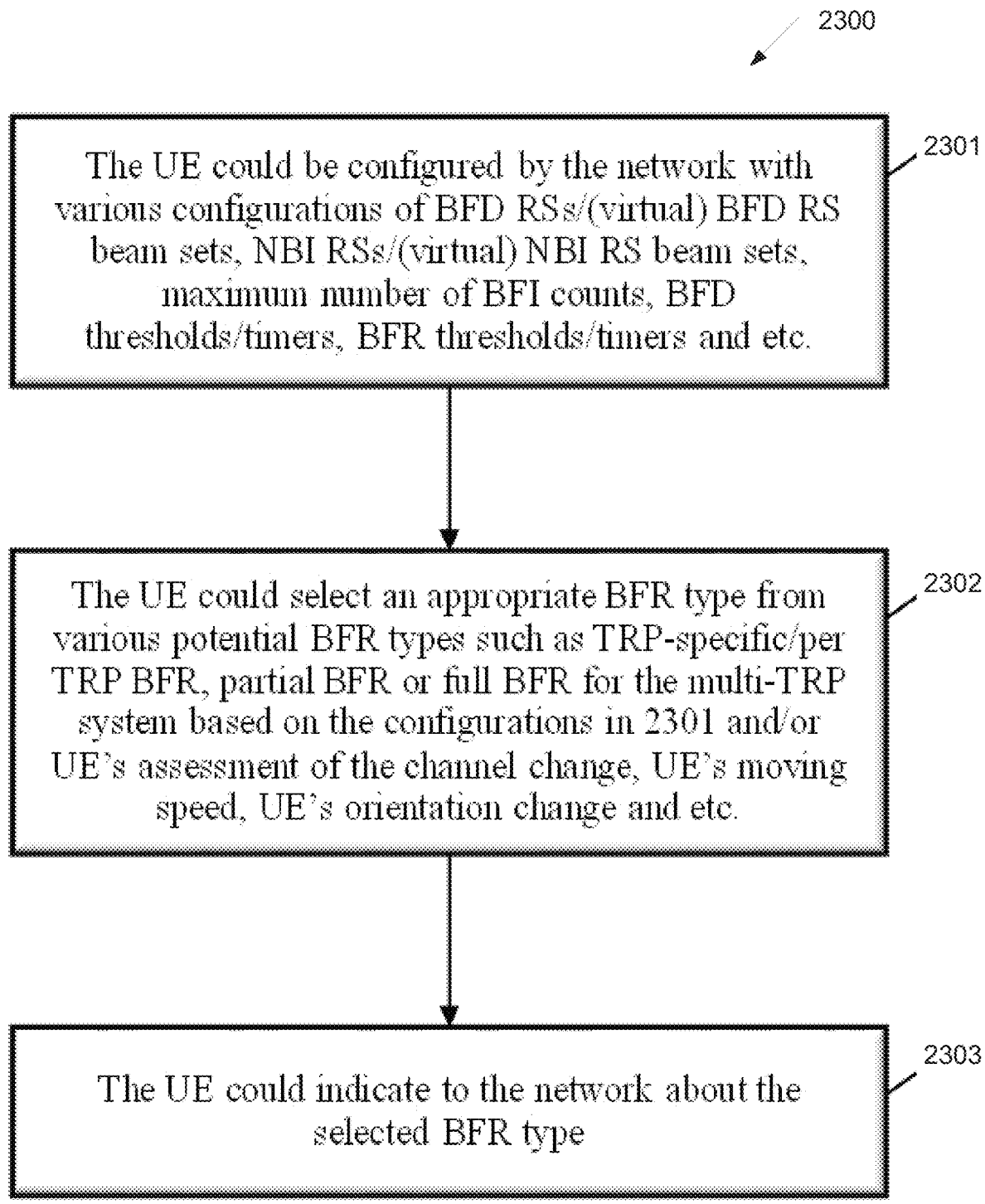
FIG. 23 illustrates a flowchart of a method for UE-initiated BFR type selection for TRP-specific or per TRP or partial beam failure recovery in a multi-TRP system according to embodiments of the present disclosure.

FIG. 23 illustrates a flowchart of a method 2300 for UE-initiated BFR type selection for TRP-specific or per TRP or partial beam failure recovery in a multi-TRP system according to embodiments of the present disclosure. The method 2300 as may be performed by a UE (e.g., 111-116 as illustrated in FIG. 1). An embodiment of the method 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions.

As illustrated in FIG. 23, in 2301, the UE could be configured by the network with various configurations of BFD RSs/(virtual) BFD RS beam sets, NBI RSs/(virtual) NBI RS beam sets, maximum number of BFI counts, BFD thresholds/timers, BFR thresholds/timers, and etc. For instance, the UE could be explicitly indicated by the network about the mapping relationships between the BFD/NBI RSs and the coordinating TRPs. For another example, the UE could also be indicated by the network about the rules of constructing the virtual BFD/NBI RS beam sets for potential partial BFR procedure triggering/firing.

In 2302, the UE could determine an appropriate BFR type from various potential BFR types such as TRP-specific/per TRP BFR, partial BFR and full BFR for the multi-TRP system. As described before, the selection of the appropriate BFR type could be based on the configurations in 2301 and/or UE's assessment/prediction of the channel condition, UE's moving speed, UE's orientation change and etc. For example, the UE could first measure the L1-RSRPs of all the BFD RSs from all the coordinating TRPs. The UE could hypothetically evaluate/assess the measured L1-RSRPs for both the TRP-specific BFR (given the mapping relationship between the BFD RSs and the coordinating TRPs) and the partial BFR (given the rules of constructing the virtual BFD RS beam sets). Based on the evaluation/assessment, the UE could determine one BFR type and indicate to the network about the selected BFR type (in step 2303) along with the transmission of other BFR messages/signaling.

Similar to the determination of the BFR type, the UE could also determine an appropriate BFR procedure from various BFR procedures such as those developed in FIGS. 11A and 11B, FIGS. 13A and 13B, FIG. 14, FIG. 15, FIGS. 16A and 16B, FIGS. 18A and 18B, FIGS. 20A and 20B, and FIGS. 22A and 22B for the multi-TRP system.

FIG. 24 illustrates a flowchart of a method 2400 for UE-initiated BFR procedure determination for TRP-specific or per TRP or partial beam failure recovery procedure in a multi-TRP system according to embodiments of the present disclosure. The method 2400 as may be performed by a UE (e.g., 111-116 as illustrated in FIG. 1). An embodiment of the method 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions.

In FIG. 24, an example of the UE-initiated BFR procedure determination for the multi-TRP system is provided. As illustrated in FIG. 24, in 2401, the UE could have already determined the BFR type for the multi-TRP system. The BFR type could correspond to TRP-specific/per TRP BFR, partial BFR or full BFR, and the determination procedures could follow those described in FIG. 23.

In 2402, the UE could be configured by the network with various system settings and/or deployment scenarios such as whether the UE would operate under the multi-PDCCH or the single-PDCCH based multi-TRP system and/or whether carrier aggregation is assumed for one or more coordinating TRPs. The UE could also be indicated by the network about certain network status/condition such as the backhaul condition (ideal backhaul or non-ideal backhaul) between the coordinating TRPs.

In 2403, the UE would determine an appropriate BFR procedure from various potential BFR procedures based on the configurations and/or indications in 2402. The potential BFR procedures could correspond to those presented in FIGS. 11A and 11B, FIGS. 13A and 13B, FIG. 14, FIG. 15, FIGS. 16A and 16B, FIGS. 18A and 18B, FIGS. 20A and 20B, and FIGS. 22A and 22B in the present disclosure.

For instance, if the UE operates under the multi-PDCCH based framework with ideal backhaul and CA setting, the UE could select the procedure presented in FIGS. 16A and 16B as the candidate BFR procedure. For another example, if the UE operates under the single-PDCCH based framework with ideal backhaul and non-CA setting, the UE could determine the procedure developed in FIGS. 18A and 18B as the candidate BFR procedure.

As illustrated in FIG. 25, in 2504, the UE could indicate to the network about the selected BFR procedure along with the transmission of other BFR messages/signaling.

For illustrative purposes the steps of this algorithm are described serially, however, some of these steps may be performed in parallel to each other. The above operation diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method of a user equipment (UE) in a wireless communication system, the method comprising:
   receiving (i) two beam failure detection (BFD) reference signal (RS) resource sets including a first BFD RS resource set and a second BFD RS resource set and (ii) two new beam identification (NBI) RS sets including a first NBI RS set and a second NBI RS set;
   performing a beam failure recovery in case of beam failure detection;
   incrementing a beam failure instance (BFI) counter corresponding to each of the two BFD RS resource sets; and
   initiating a random access procedure after a beam failure report (BFR) is triggered for the two BFD RS resource sets,
   wherein the first BFD RS resource set is associated with the first NBI RS set and the second BFD RS resource set is associated with the second NBI RS set, and
   wherein a BFI counter is configured per BFD RS resource set.

2. The method of claim 1, wherein the first BFD RS resource set and the second BFD RS resource set are determined by the UE to be configured as quasi colocation (QCL)-typeD RSs in transmission configuration indication (TCI) sates for one or more control resource sets (CORESETs) associated with a CORESETPoolIndex value.

3. The method of claim 2, wherein:
   the first BFD RS resource set is associated with a CORESETPoolIndex value 0, and
   the second BFD RS resource set is associated with a CORESETPoolIndex value 1.

4. The method of claim 1, further comprising:
   if the BFI counter reaches a maxBFIcount, triggering the BFR for the first BFD RS resource set or the second BFD RS resource set corresponding to the BFI counter.

5. The method of claim 1, further comprising:
   resetting the BFI counter corresponding to each of the two BFD RS resource sets if a BFD timer expires.

6. A user equipment (UE) performed in a wireless communication system, the UE comprising:
   a transceiver configured to receive (i) two beam failure detection (BFD) reference signal (RS) resource sets including a first BFD RS resource set and a second BFD RS resource set and (ii) two new beam identification (NBI) RS sets including a first NBI RS set and a second NBI RS set; and
   a processor operably coupled with the transceiver, the processor and configured to:
     perform a beam failure recovery in case of beam failure detection,
     increment a beam failure instance (BFI) counter corresponding to each of the two BFD RS resource sets, and
     initiate a random access procedure if a beam failure report (BFR) is triggered for the two BFD RS resource sets,
   wherein the first BFD RS resource set is associated with the first NBI RS set and the second BFD RS resource set is associated with the second NBI RS set, and
   wherein a BFI counter is configured per BFD RS resource set.

7. The UE of claim 6, wherein the first BFD RS resource set and the second BFD RS resource set are determined by the UE to be configured as quasi colocation (QCL)-typeD RSs in transmission configuration indication (TCI) sates for one or more control resource sets (CORESETs) associated with a CORESETPoolIndex value.

8. The UE of claim 7, wherein:
   the first BFD RS resource set is associated with a CORESETPoolIndex value 0, and
   the second BFD RS resource set is associated with a CORESETPoolIndex value 1.

9. The UE of claim 6, wherein the processor is further configured to, if the BFI counter reaches maxBFIcount, trigger the BFR for the first BFD resource RS set or the second BFD RS resource set corresponding to the BFI counter.

10. The UE of claim 6, wherein the processor is further configured to reset the BFI counter corresponding to each of the two BFD RS resource sets if a BFD timer expires.

11. A base station performed in a wireless communication system, the base station comprising:
- a transceiver configured to transmit (i) two beam failure detection (BFD) reference signal (RS) resource sets including a first BFD resource RS set and a second BFD resource RS set and (ii) two new beam identification (NBI) RS sets including a first NBI RS set and a second NBI RS set; and
- a processor operably coupled with the transceiver, the processor configured to perform a beam failure recovery in case of beam failure detection, wherein a beam failure instance (BFI) counter corresponding to each of the two BFD RS resource sets is incremented, and
- wherein a random access procedure is initiated after a beam failure report (BFR) is triggered for the two BFD RS resource sets,
- wherein the first BFD resource RS set is associated with the first NBI RS set and the second BFD resource RS set is associated with the second NBI RS set, and
- wherein a BFI counter is configured per BFD RS resource set.

12. The base station of claim 11, wherein the first BFD resource RS set and the second BFD resource RS set are determined by a user equipment to be configured as quasi colocation (QCL)-typeD RSs in transmission configuration indication (TCI) sates for one or more control resource sets (CORESETs) associated with a CORESETPoolIndex value.

13. The base station of claim 12, wherein:
- the first BFD resource RS set is associated with a CORESETPoolIndex value 0, and
- the second BFD resource RS set is associated with a CORESETPoolIndex value 1.

* * * * *